US012533778B2

(12) United States Patent
Mokha et al.

(10) Patent No.: US 12,533,778 B2
(45) Date of Patent: Jan. 27, 2026

(54) POWERED FASTENER DRIVER

(71) Applicant: MILWAUKEE ELECTRIC TOOL CORPORATION, Brookfield, WI (US)

(72) Inventors: Kirat S. Mokha, Milwaukee, WI (US); Ryan A. Khatib, Waukesha, WI (US); Logan M. Hietpas, Glendale, WI (US); Jeremy J. Keifenheim, West Bend, WI (US); David A. Bierdeman, New Berlin, WI (US); Jason M. Julius, Waukesha, WI (US); Rosalie C. Phillips, Milwaukee, WI (US); Ivan N. Zozulya, Waukesha, WI (US); Jacob N. Zimmerman, Pewaukee, WI (US); Alex D. Servais, Slinger, WI (US); Mitchell T. Neuhoff, Waukesha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/808,705

(22) Filed: Aug. 19, 2024

(65) Prior Publication Data

US 2024/0408731 A1 Dec. 12, 2024

Related U.S. Application Data

(63) Continuation-in-part of application No. 18/452,065, filed on Aug. 18, 2023, which is a (Continued)

(51) Int. Cl.

*B25C 1/00* (2006.01)
*B25C 1/04* (2006.01)
*B25C 1/06* (2006.01)

(52) U.S. Cl.

CPC ................ *B25C 1/047* (2013.01); *B25C 1/06* (2013.01)

(58) Field of Classification Search

CPC .... B25C 1/04; B25C 5/16; B25C 1/00; B25C 1/006; B25C 1/041; B25C 1/047; B25C 1/06; B25C 1/08; B25C 5/1637

(Continued)

(56) References Cited

U.S. PATENT DOCUMENTS 3,198,412 A 8/1965 Roosa
3,496,840 A 2/1970 Wandel et al.

(Continued)

FOREIGN PATENT DOCUMENTS

CN 2587598 Y 11/2003
CN 109623736 A 4/2019

(Continued)

OTHER PUBLICATIONS

Ridgid, "18V Brushless 21 Degree Framing Nailer," available at <https://www.ridgid.com/us/en/18v-brushless-21-degree-framing-nailer> web page visited Mar. 9, 2023 (6 pages).

(Continued)

*Primary Examiner* — Jacob A Smith
(74) *Attorney, Agent, or Firm* — Michael Best & Friedrich LLP

(57) ABSTRACT

A powered fastener driver including a housing, a cylinder, a piston movable within the cylinder from a TDC position to a BDC position, a driver blade attached to the piston for movement therewith along a driving axis from the TDC position toward the BDC position for driving a fastener into a workpiece, a lifter operable to move the piston and driver blade, in unison, from the BDC position toward the TDC position, a drive unit operably coupled to the lifter, and a printed circuit board (PCB) positioned within the housing.

(Continued)

The PCB receives electrical current from the battery pack and includes power switches for commutating the motor. The PCB defines a length and a width, and a vibration attenuating damper is positioned between the housing and the printed circuit board. The damper is positioned along the length of the PCB and is configured to support the PCB within the housing.

7 Claims, 50 Drawing Sheets

Related U.S. Application Data continuation-in-part of application No. 18/178,104, filed on Mar. 3, 2023.

(60) Provisional application No. 63/664,909, filed on Jun. 27, 2024, provisional application No. 63/391,491, filed on Jul. 22, 2022, provisional application No. 63/316,510, filed on Mar. 4, 2022.

(58) Field of Classification Search
USPC .......................................... 227/127, 130, 156
See application file for complete search history.

(56) References Cited

U.S. PATENT DOCUMENTS

| | | | |
|---|---|---|---|
| 3,524,576 | A | 8/1970 | Bader |
| 3,858,780 | A | 1/1975 | Perkins et al. |
| 4,509,669 | A | 4/1985 | Elliesen |
| 4,609,135 | A | 9/1986 | Elliesen |
| 4,932,480 | A | 6/1990 | Golsch |
| 5,025,971 | A | 6/1991 | Schafer et al. |
| 5,441,192 | A | 8/1995 | Sugita et al. |
| 5,626,274 | A | 5/1997 | Shkolnikov et al. |
| 5,683,024 | A | 11/1997 | Eminger et al. |
| 5,772,098 | A | 6/1998 | Crutcher |
| 6,149,046 | A | 11/2000 | Ho et al. |
| 6,199,739 | B1 | 3/2001 | Mukoyama et al. |
| 6,834,788 | B2 | 12/2004 | Popovich et al. |
| 6,899,260 | B2 | 5/2005 | Sun |
| 6,913,179 | B1 | 7/2005 | Chen |
| 6,966,476 | B2 | 11/2005 | Jalbert |
| 6,966,477 | B1 | 11/2005 | Chien-Kuo et al. |
| 7,021,511 | B2 | 4/2006 | Popovich et al. |
| 7,086,573 | B1 | 8/2006 | Wen |
| 7,104,432 | B2 | 9/2006 | Sun |
| 7,131,563 | B2 | 11/2006 | Wen |
| 7,134,586 | B2 | 11/2006 | McGee et al. |
| 7,137,186 | B2 | 11/2006 | Wojcicki et al. |
| 7,455,207 | B2 | 11/2008 | Wojcicki et al. |
| 7,686,199 | B2 | 3/2010 | Gross et al. |
| 7,699,201 | B2 | 4/2010 | Hagan et al. |
| 7,726,536 | B2 | 6/2010 | Gross et al. |
| 7,866,521 | B2 | 1/2011 | Gross et al. |
| 7,896,212 | B2 | 3/2011 | Uejima et al. |
| 7,922,054 | B2 | 4/2011 | Cole, Jr. |
| 7,950,556 | B2 | 5/2011 | Hagan |
| 7,975,777 | B2 | 7/2011 | Krondorfer et al. |
| 7,980,439 | B2 | 7/2011 | Akiba et al. |
| 8,006,881 | B2 | 8/2011 | Arata et al. |
| 8,051,919 | B2 | 11/2011 | Hagan et al. |
| 8,052,021 | B2 | 11/2011 | Wu |
| 8,083,116 | B2 | 12/2011 | Liang |
| 8,104,658 | B2 | 1/2012 | Yu |
| 8,231,039 | B2 | 7/2012 | Buck et al. |
| 8,292,143 | B2 | 10/2012 | Lee et al. |
| 8,336,748 | B2 | 12/2012 | Hlinka et al. |
| 8,393,512 | B2 | 3/2013 | Tanimoto et al. |
| 8,544,561 | B2 | 10/2013 | Aihara |
| 8,746,526 | B2 | 6/2014 | Hlinka et al. |
| D713,705 | S | 9/2014 | Mina et al. |
| 8,833,626 | B2 | 9/2014 | Perron et al. |
| 9,221,161 | B2 | 12/2015 | Miller et al. |
| 9,469,021 | B2 | 10/2016 | Gregory et al. |
| 9,486,904 | B2 | 11/2016 | Gregory et al. |
| 9,498,871 | B2 | 11/2016 | Gregory et al. |
| 9,636,811 | B2 | 5/2017 | Segura |
| 9,643,305 | B2 | 5/2017 | Gregory et al. |
| 9,649,755 | B2 | 5/2017 | Gregory et al. |
| 9,662,777 | B2 | 5/2017 | Pomeroy et al. |
| 9,664,045 | B2 | 5/2017 | Mina et al. |
| 9,701,001 | B2 | 7/2017 | Fleischer et al. |
| 9,724,812 | B2 | 8/2017 | Scabin et al. |
| 9,827,658 | B2 | 11/2017 | Gregory et al. |
| 9,827,659 | B2 | 11/2017 | Matsuno |
| 10,004,503 | B2 | 6/2018 | Huang |
| 10,022,848 | B2 * | 7/2018 | Gross ........................ B25F 5/00 |
| 10,173,310 | B2 | 1/2019 | Wyler et al. |
| 10,464,197 | B2 | 11/2019 | McNeill et al. |
| 10,569,403 | B2 | 2/2020 | Namouz |
| 10,589,409 | B2 | 3/2020 | Scabin et al. |
| 10,632,600 | B2 | 4/2020 | Pomeroy et al. |
| 10,632,601 | B2 | 4/2020 | Pomeroy et al. |
| 10,654,154 | B2 | 5/2020 | Schnell et al. |
| 10,710,227 | B2 | 7/2020 | Pomeroy et al. |
| 10,759,029 | B2 | 9/2020 | Schnell et al. |
| 10,800,021 | B2 | 10/2020 | Tanaka |
| 10,821,585 | B2 | 11/2020 | Kabbes et al. |
| 10,843,317 | B2 | 11/2020 | Sato et al. |
| 10,875,166 | B2 | 12/2020 | Ueda |
| 10,888,981 | B2 | 1/2021 | Gregory et al. |
| 10,898,994 | B2 | 1/2021 | Carrier et al. |
| 10,946,506 | B1 | 3/2021 | Ueda |
| 11,072,058 | B2 | 7/2021 | Wyler et al. |
| 11,110,576 | B2 | 9/2021 | Namouz |
| 11,179,836 | B2 | 11/2021 | Gregory et al. |
| 11,224,960 | B2 | 1/2022 | Garces et al. |
| 11,446,802 | B2 | 9/2022 | Rux |
| 2003/0121948 | A1 | 7/2003 | Hsien |
| 2005/0194419 | A1 * | 9/2005 | Smolinski ............... B25C 1/047 227/156 |
| 2008/0164295 | A1 | 7/2008 | Wu et al. |
| 2010/0243286 | A1 | 9/2010 | Hoshino et al. |
| 2013/0320063 | A1 | 12/2013 | Gregory et al. |
| 2013/0320064 | A1 | 12/2013 | Gregory et al. |
| 2015/0174748 | A1 | 6/2015 | Furuta et al. |
| 2015/0202755 | A1 * | 7/2015 | Tanji ......................... B25C 1/04 227/130 |
| 2016/0368126 | A1 | 12/2016 | Liu et al. |
| 2018/0001453 | A1 | 1/2018 | Jaskot et al. |
| 2018/0126527 | A1 * | 5/2018 | Pomeroy ................... B25C 1/04 |
| 2019/0039219 | A1 | 2/2019 | Suarez |
| 2019/0314967 | A1 | 10/2019 | Garces et al. |
| 2019/0375084 | A1 | 12/2019 | Bierdeman et al. |
| 2020/0114500 | A1 | 4/2020 | Bierdeman et al. |
| 2020/0130157 | A1 | 4/2020 | Rux |
| 2020/0164498 | A1 | 5/2020 | Wechselberger et al. |
| 2020/0189081 | A1 | 6/2020 | Yang et al. |
| 2020/0215672 | A1 | 7/2020 | Pomeroy et al. |
| 2020/0230791 | A1 | 7/2020 | Pomeroy et al. |
| 2020/0391365 | A1 | 12/2020 | Tanaka |
| 2020/0398413 | A1 | 12/2020 | Tanaka |
| 2021/0016424 | A1 | 1/2021 | Kabbes et al. |
| 2021/0031347 | A1 | 2/2021 | Sato et al. |
| 2021/0031351 | A1 | 2/2021 | Tanaka |
| 2021/0107125 | A1 | 4/2021 | Gregory et al. |
| 2021/0197352 | A1 | 7/2021 | Ueda |
| 2021/0237249 | A1 | 8/2021 | Fischer et al. |
| 2021/0299833 | A1 | 9/2021 | Zimmerman et al. |
| 2021/0299837 | A1 | 9/2021 | Garces et al. |
| 2021/0347022 | A1 | 11/2021 | Leathrum et al. |
| 2021/0347025 | A1 | 11/2021 | Wyler et al. |
| 2021/0347026 | A1 | 11/2021 | Wyler et al. |
| 2021/0362311 | A1 | 11/2021 | Garces et al. |
| 2021/0387318 | A1 | 12/2021 | Ueda |
| 2022/0388136 | A1 | 12/2022 | Rux |

(56) References Cited

U.S. PATENT DOCUMENTS

| | | | |
|---|---|---|---|
| 2023/0278177 | A1 | 9/2023 | Julius et al. |
| 2023/0390906 | A1 | 12/2023 | Julius et al. |

FOREIGN PATENT DOCUMENTS

| | | | |
|---|---|---|---|
| CN | 110253505 | A | 9/2019 |
| CN | 212763319 | U | 3/2021 |
| DE | 102015205172 | A1 | 9/2016 |
| EP | 0100105 | A2 | 2/1984 |
| JP | 6852570 | B2 | 3/2021 |
| WO | WO2010038834 | A1 | 4/2010 |
| WO | WO2011010634 | A1 | 1/2011 |
| WO | WO2018056325 | A1 | 3/2018 |
| WO | WO2020248531 | A1 | 12/2020 |

OTHER PUBLICATIONS

Nail Gun Depot, "Learn How the Senco Fusion System Operates," video available at <https://www.youtube.com/watch?v=tmJgRfptn40> video published to YouTube Feb. 21, 2017 (1 page).

* cited by examiner

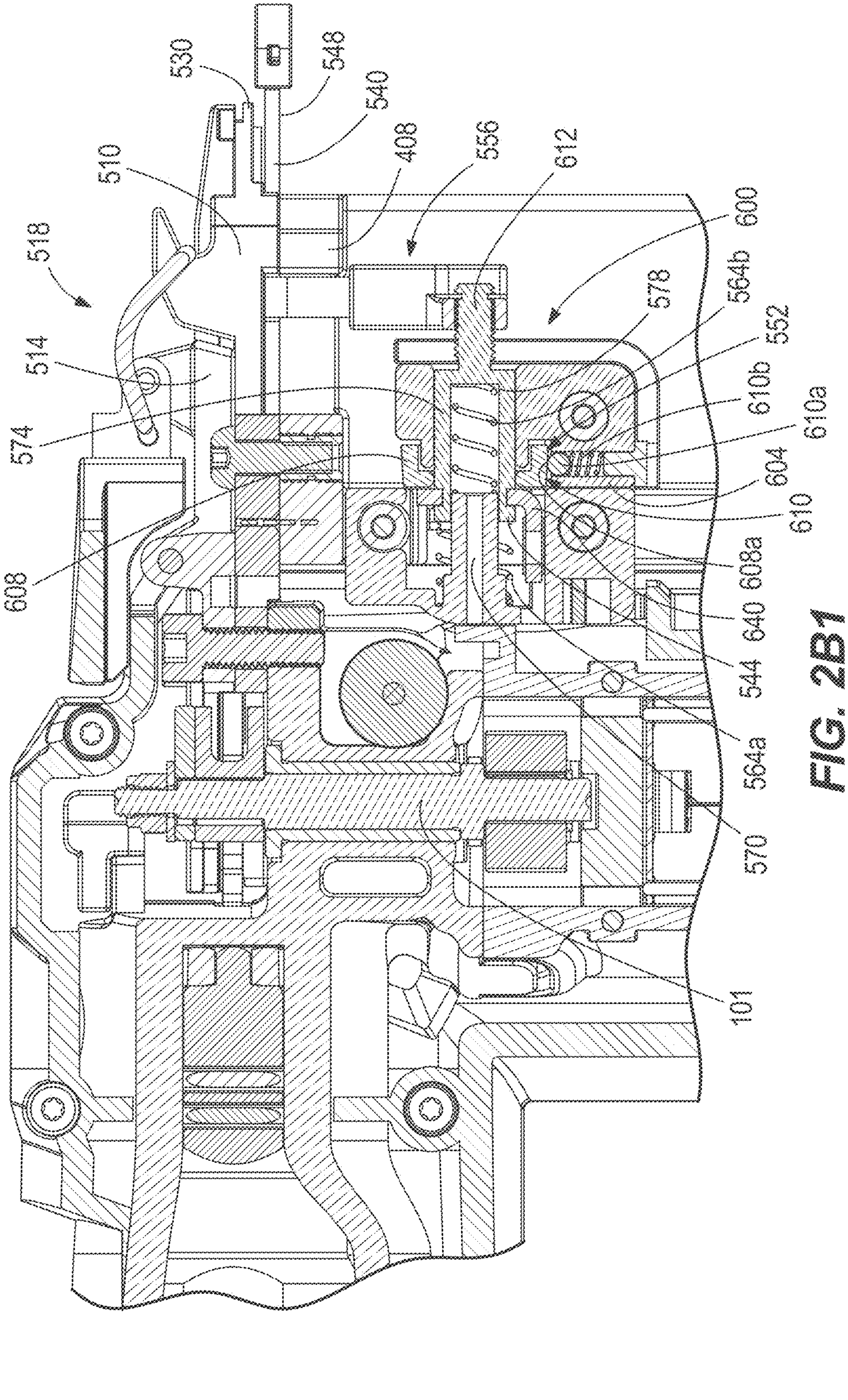
*FIG. 2B1*

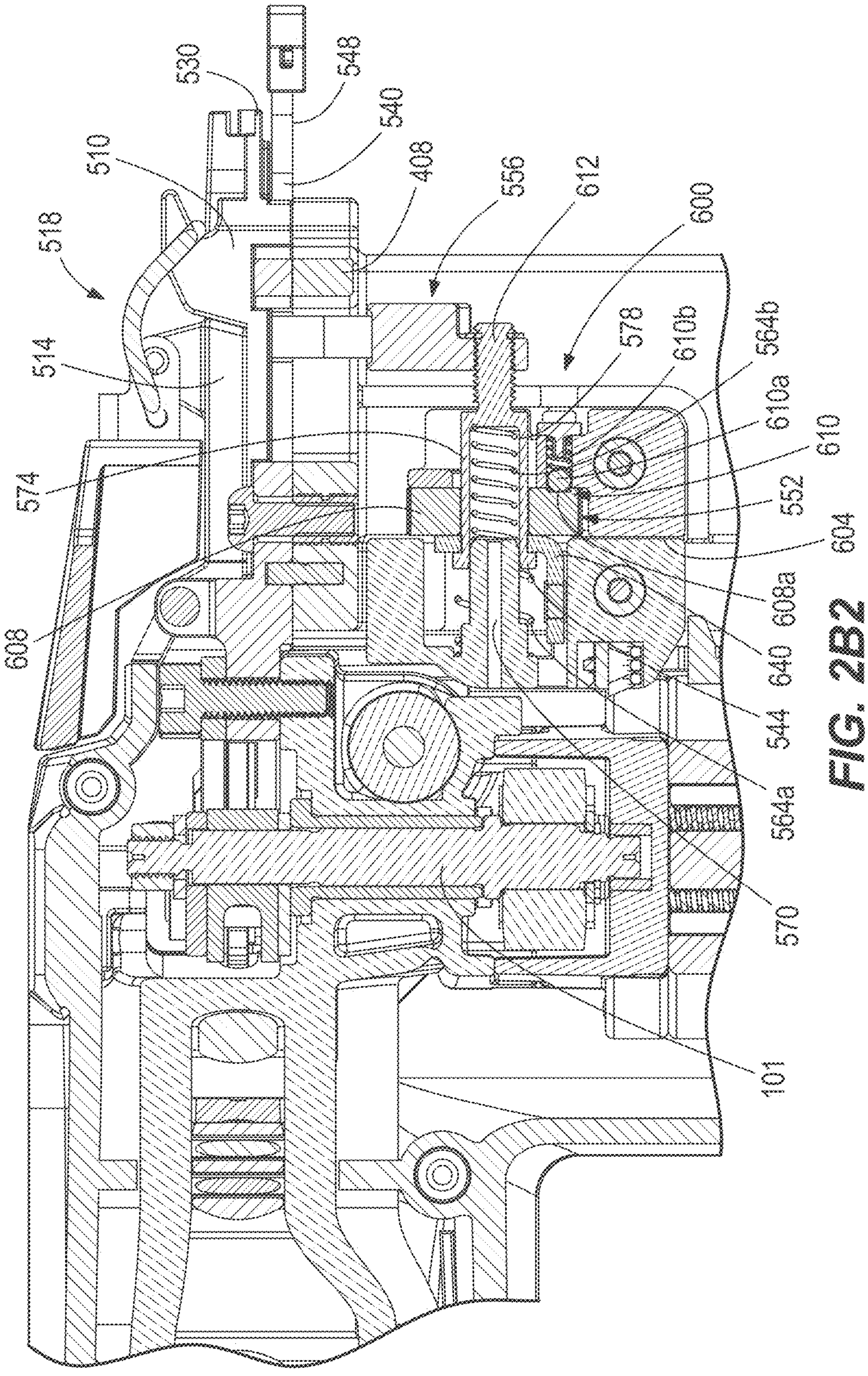
FIG. 2B2

POWERED FASTENER DRIVER

CROSS-REFERENCE TO RELATED APPLICATIONS

This application claims priority to U.S. Provisional Patent Application No. 63/664,909 filed on Jun. 27, 2024. This application is also a continuation-in-part of U.S. patent application Ser. No. 18/452,065 filed on Aug. 18, 2023, now U.S. Pat. No. 12,434,367, which is a continuation-in-part of U.S. patent application Ser. No. 18/178,104 filed on Mar. 3, 2023, now U.S. Pat. No. 12,459,091, which claims priority to U.S. Provisional Patent Application No. 63/391,491 filed on Jul. 22, 2022, and to U.S. Provisional Patent Application No. 63/316,510 filed on Mar. 4, 2022, the entire contents of all of which are incorporated herein by reference.

FIELD OF THE INVENTION

The present invention relates to powered fastener drivers, and more specifically to gas spring-powered fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art (e.g., compressed air generated by an air compressor, electrical energy, a flywheel mechanism, etc.), but often these designs are met with power, size, and cost constraints.

SUMMARY OF THE INVENTION

In some aspects, the techniques described herein relate to a powered fastener driver including: a housing defining a cylinder support portion, a drive unit support portion, and a handle portion that is spaced apart from the drive unit support portion, the handle portion configured to removably couple a battery pack thereto; a cylinder within the cylinder support portion; a piston movable within the cylinder from a top-dead-center (TDC) position to a driven or bottom-dead-center (BDC) position; a driver blade attached to the piston for movement therewith along a driving axis from the TDC position toward the BDC position for driving a fastener into a workpiece; a lifter operable to move the piston and driver blade, in unison, from the BDC position toward the TDC position; a drive unit supported by the drive unit support portion and operably coupled to the lifter, the drive unit including a brushless direct current (BLDC) motor; a user interface supported by the housing; and a printed circuit board positioned within the housing and positioned between the drive unit support portion and the handle portion, the printed circuit board receiving electrical current from the battery pack and including a plurality of power switches for commutating the motor and an electronic processor for controlling the user interface and receiving inputs therefrom.

In some aspects, the techniques described herein relate to a powered fastener driver including: a housing defining a cylinder support portion, a drive unit support portion, and a handle portion that is spaced apart from the drive unit support portion, the handle portion configured to removably couple a battery pack thereto; a cylinder within the cylinder support portion; a piston movable within the cylinder from a top-dead-center (TDC) position to a driven or bottom-dead-center (BDC) position; a driver blade attached to the piston for movement therewith along a driving axis from the TDC position toward the BDC position for driving a fastener into a workpiece; a lifter operable to move the piston and driver blade, in unison, from the BDC position toward the TDC position; a drive unit supported by the drive unit support portion and operably coupled to the lifter, the drive unit including a brushless direct current (BLDC) motor; and a printed circuit board positioned within the housing, the printed circuit board receiving electrical current from the battery pack and including a plurality of power switches for commutating the motor, the printed circuit board defining a length and a width, and a vibration attenuating damper positioned between the housing and the printed circuit board, wherein the damper is positioned along the length of the printed circuit board and configured to support the printed circuit board within the housing.

In some aspects, the techniques described herein relate to a powered fastener driver including: a housing defining a cylinder support portion, a drive unit support portion, and a handle portion that is spaced apart from the drive unit support portion, the handle portion configured to removably couple a battery pack thereto; a cylinder within the cylinder support portion; a piston movable within the cylinder from a top-dead-center (TDC) position to a driven or bottom-dead-center (BDC) position; a driver blade attached to the piston for movement therewith along a driving axis from the TDC position toward the BDC position for driving a fastener into a workpiece; a lifter operable to move the piston and driver blade, in unison, from the BDC position toward the TDC position; a drive unit supported by the drive unit support portion and operably coupled to the lifter, the drive unit including a brushless direct current (BLDC) motor; a printed circuit board positioned within the housing and including a first end, a second end opposite the first end, a first side, and a second side opposite the first side, the printed circuit board receiving electrical current from the battery pack and including a plurality of power switches for commutating the motor; and a vibration attenuating damper positioned between the housing and the printed circuit board, the damper configured to support the printed circuit board within the housing, wherein at least one of the first end and the second end of the printed circuit board is received in a channel of the housing, and wherein at least one of the first side and the second side of the printed circuit board is received in a channel of the damper.

Other features and aspects of the invention will become apparent by consideration of the following detailed description and accompanying drawings.

BRIEF DESCRIPTION OF THE DRAWINGS

FIG. 2B1 is a cross-sectional view of the gas spring-powered fastener driver of FIG. 1 along line 2B1-2B1 of FIG. 2A.

FIG. 2B2 is a cross-sectional view of another gas spring-powered fastener drive of FIG. 1 along the line 2B1-2B1 of FIG. 2A.

Figure 1:
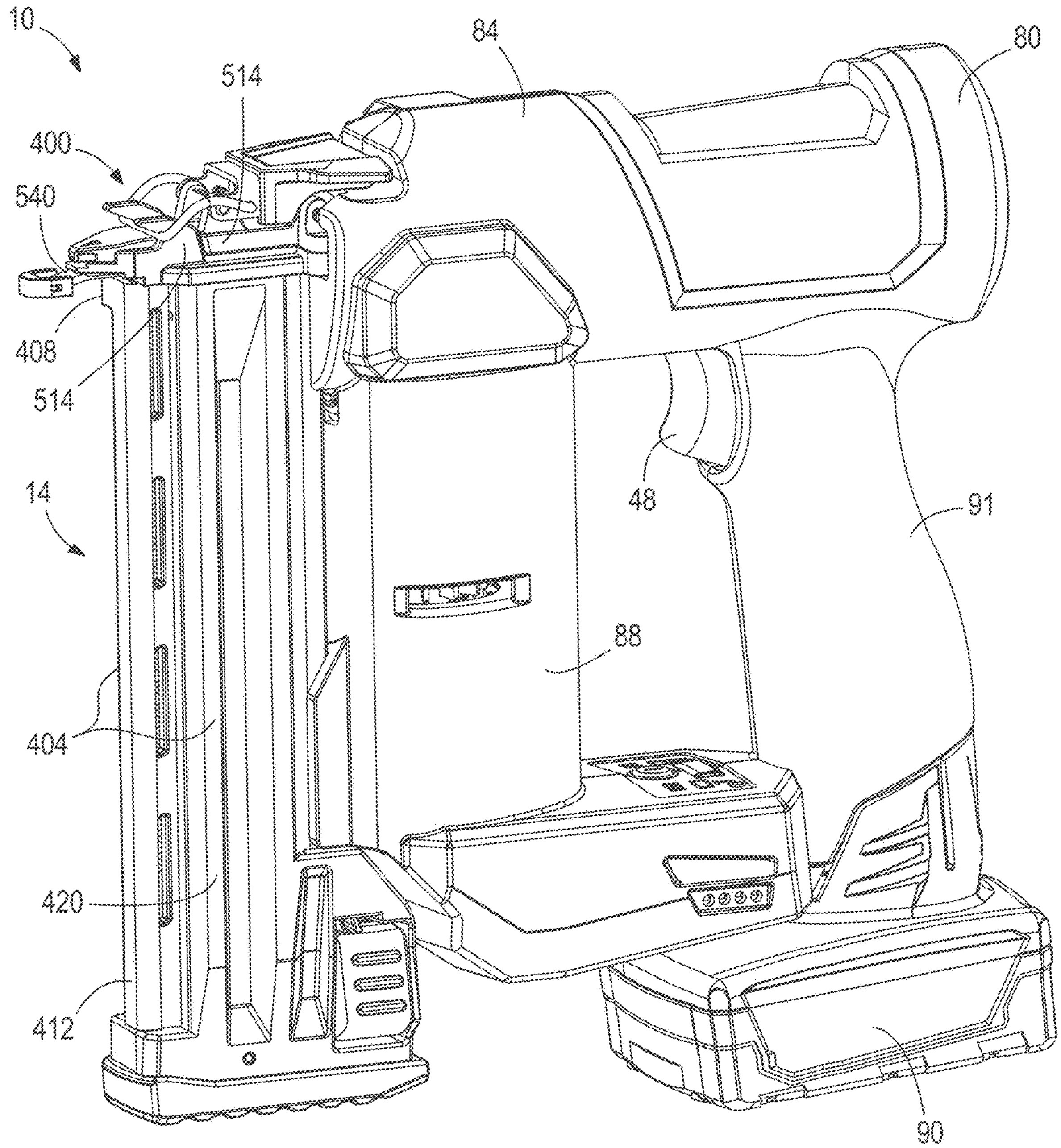
FIG. 1 is a perspective view of a gas spring-powered fastener driver including a magazine and a workpiece contact assembly in accordance with an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Additionally, unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations, for example, collectively. To reiterate, those electronic processors and processing may be distributed.

DETAILED DESCRIPTION

With reference to FIGS. 1-6, a gas spring-powered fastener driver 10 is operable to drive fasteners (e.g., nails, tacks, staples, etc.) held within a magazine 14 into a workpiece. The fastener driver 10 includes an inner cylinder 18 and a moveable piston 22 positioned within the cylinder 18 (FIGS. 6A, 7A, 7B). With reference to FIGS. 6A-7B, the fastener driver 10 further includes a driver blade 26 that is attached to the piston 22 and moveable therewith. The fastener driver 10 does not require an external source of air pressure, but rather includes an outer storage chamber cylinder 30 of pressurized gas in fluid communication with the cylinder 18. In the illustrated embodiment, the cylinder 18 and moveable piston 22 are positioned within the storage chamber cylinder 30. The driver 10 further includes a fill valve (not shown) coupled to the storage chamber cylinder 30. When connected with a source of compressed gas, the fill valve permits the storage chamber cylinder 30 to be refilled with compressed gas if any prior leakage has occurred. The fill valve may be configured as a Schrader valve, for example.

Figure 6A:
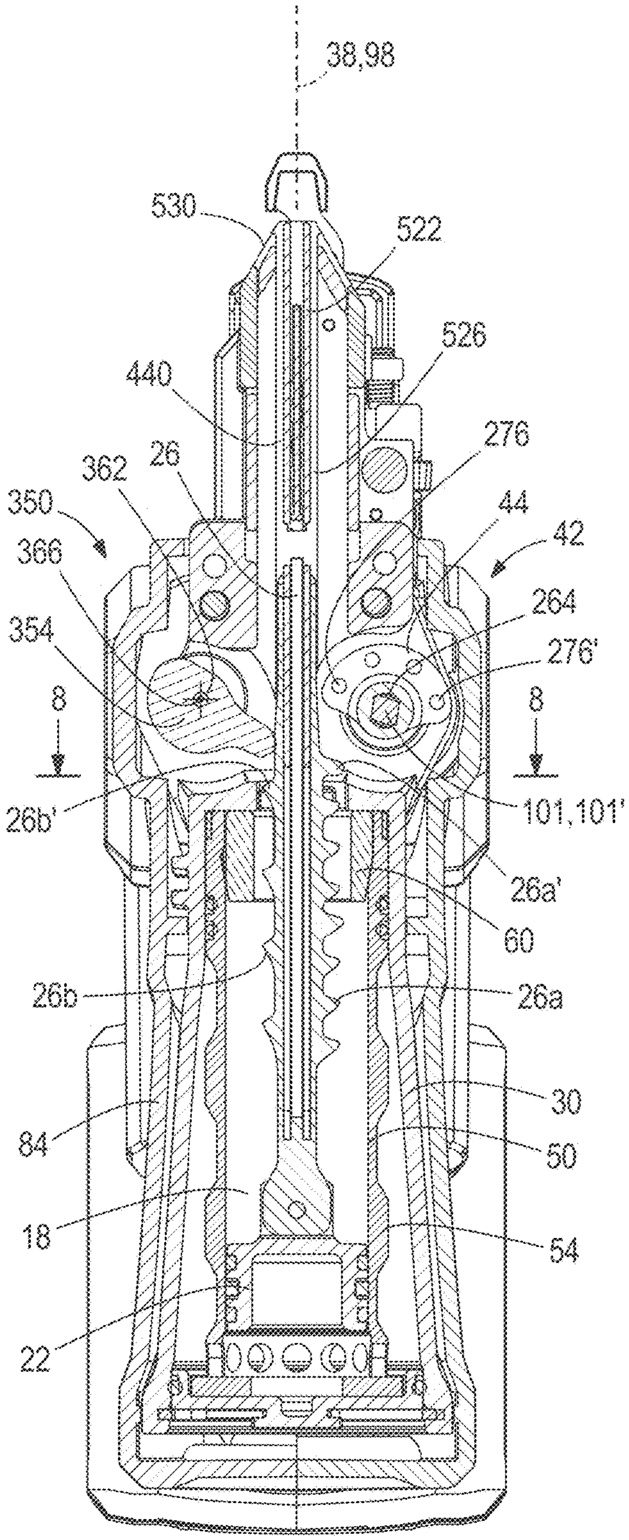
FIG. 6A is a cross-sectional view of the gas spring-powered fastener driver of FIG. 1 along line 6A-6A shown in FIG. 2A, which shows, among other features, a storage chamber cylinder, a cylinder, a piston having a first configuration, a driver blade, and a bumper.
Figure 6B:
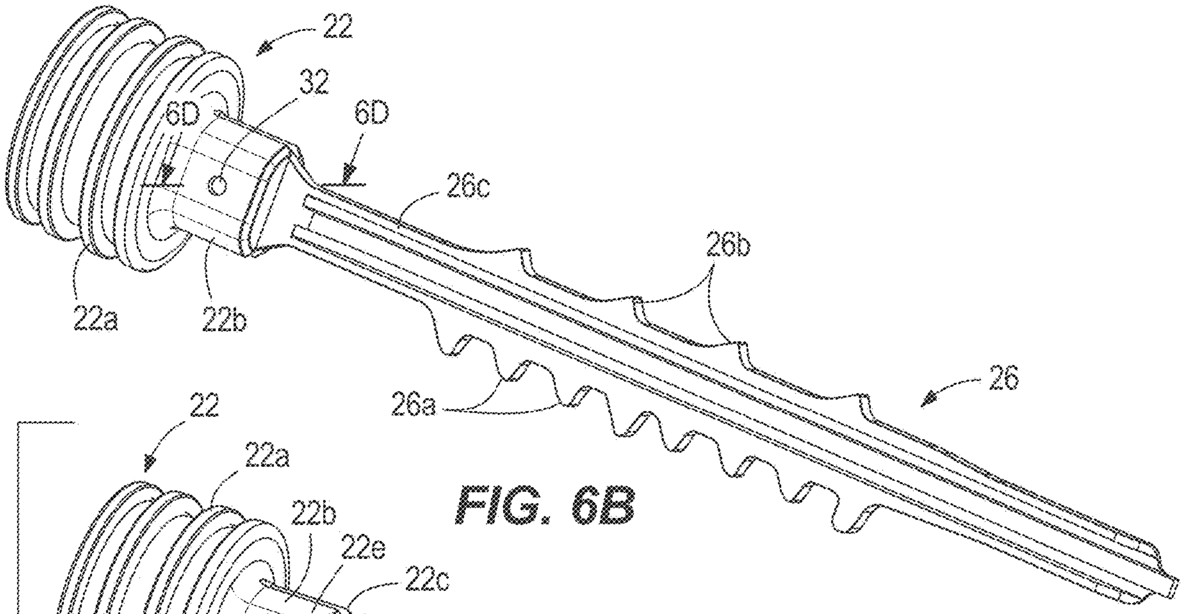
FIG. 6B is a perspective view of the piston and the driver blade of FIG. 6A.
Figure 6C:
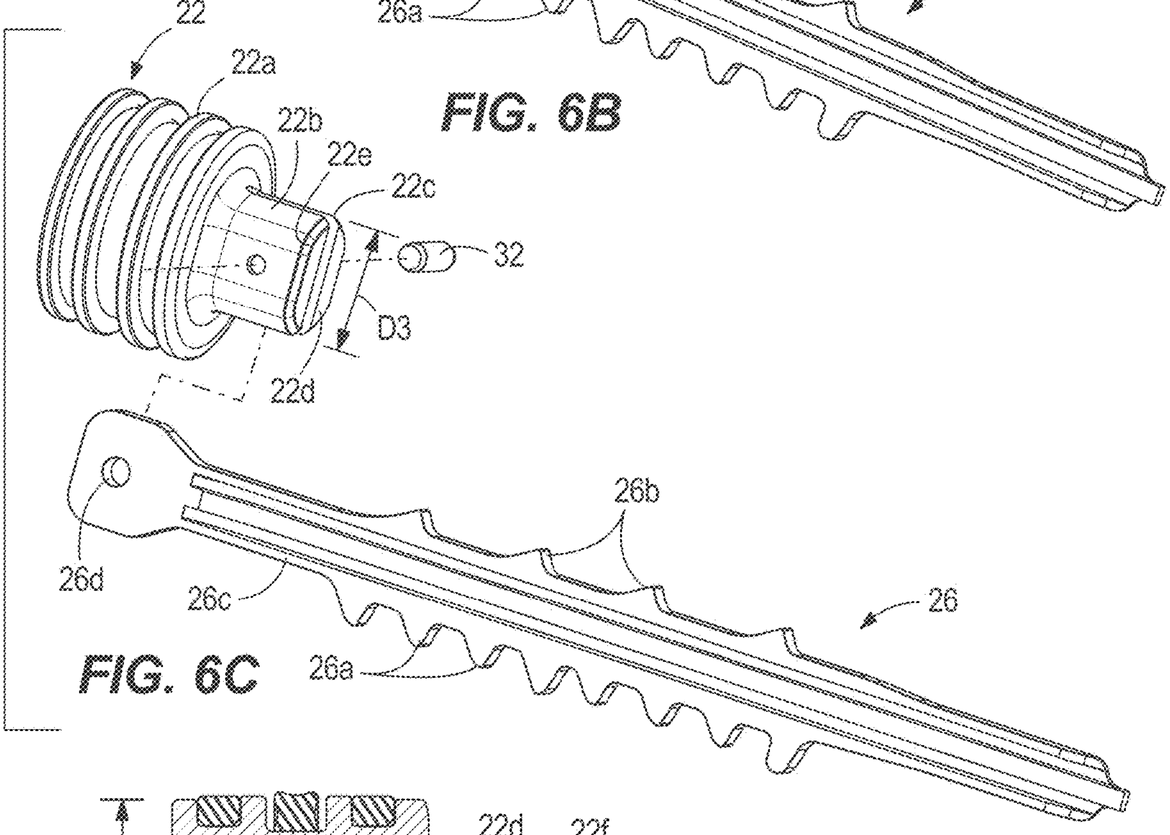
FIG. 6C is an exploded view of the piston and the driver blade of FIG. 6A.
Figure 6D:
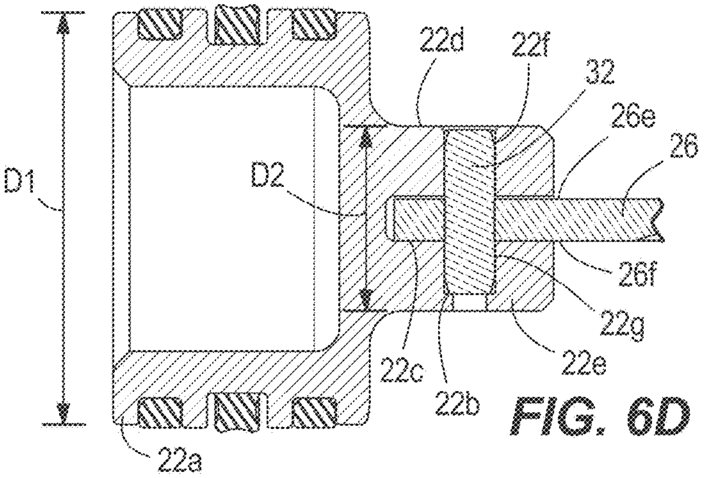
FIG. 6D is a cross-sectional view of the piston and the driver blade of FIG. 6A along the line 6D-6D of FIG. 6B.
Figure 6E:
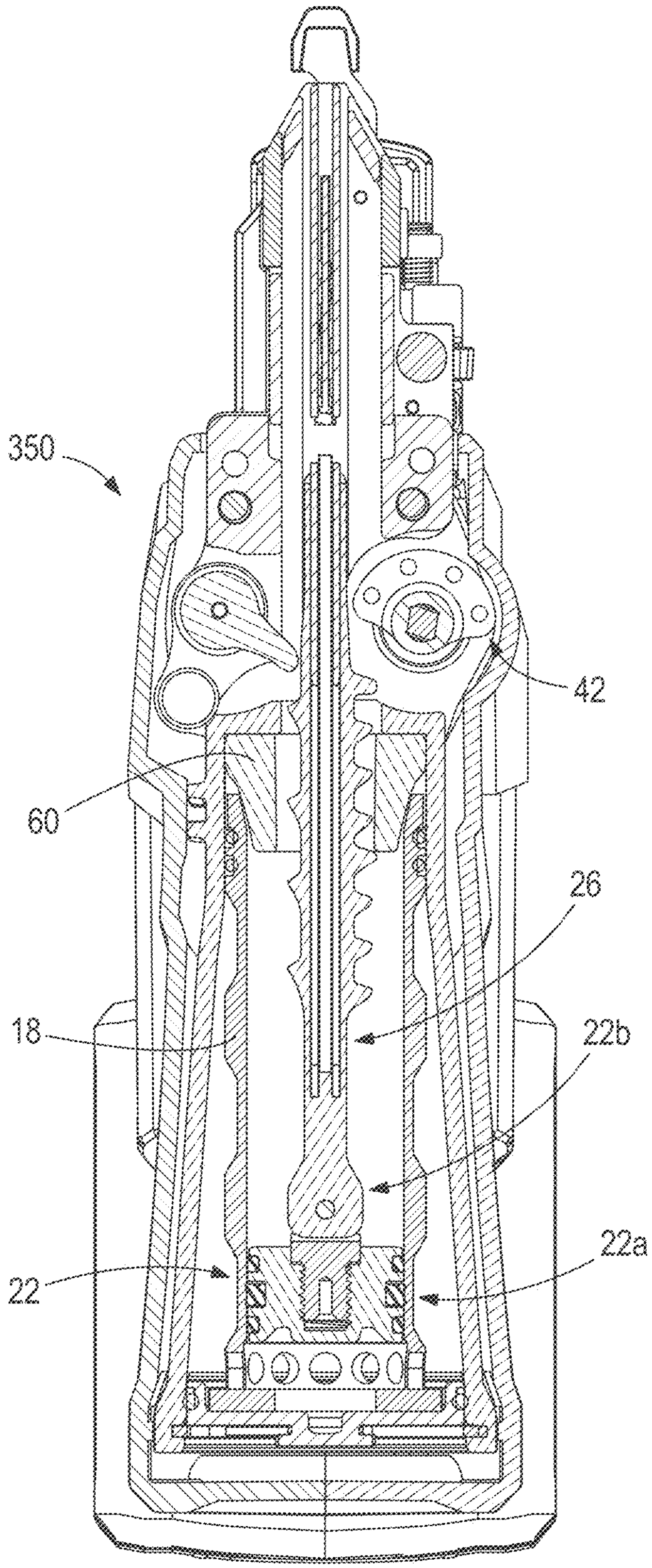
FIG. 6E is a cross-sectional view of the gas spring-powered fastener driver of FIG. 1 along line 6E-6E shown in FIG. 2A, which shows, among other features, a storage chamber cylinder, a cylinder, a piston having a second configuration, a driver blade, and a bumper.

As shown in FIGS. 6A and 6B and discussed below, the driver blade 26 has a body 26*c*, lifting teeth 26*a* extending from one side of the body 26*c*, and latching teeth 26*b* extending from an opposite side of the body 26*c*. In the illustrated embodiment, the body 26*c* of the driver blade 26 has a first surface and a second surface opposite the first surface. Each of the lifting teeth 26*a* has a first surface and a second surface opposite the first surface, and each of the latching teeth 26*b* has a first surface and a second surface opposite the first surface. The first surface of the body 26*c*, each of the first surfaces of the lifting teeth 26*a*, and each of the first surfaces of the latching teeth 26*b* are positioned in a first plane 26*e* (FIG. 6D). The second surface of the body 26*c*, each of the second surfaces of the lifting teeth 26*a*, and each of the second surfaces of the latching teeth 26*b* are positioned in a second plane 26*f* (FIG. 6E). In other embodiments, such as that shown in FIGS. 6H-6J, the latching teeth 26*b* may not be not be in the first and second planes, but may be positioned between the first and second planes. An aperture 26*d* extends through the body 26*c* between the first surface and the second surface. Accordingly, the aperture 26*d* is oriented perpendicular to both the first plane and the second plane.

In the embodiment of FIGS. 6A-6D, the piston 22 includes a first portion 22*a* and a second portion 22*b* that is integrally formed with the first portion 22*a*. The first portion 22*a* is substantially cylindrical and has a first diameter D1 (FIG. 6D), while the second portion 22*b* is substantially ovular and has a first dimension D2 (FIG. 6D) and a second dimension D3 (FIG. 6C) that is less than the first dimension D1. In the embodiment of FIGS. 6A-6D, the first diameter D1 measures approximately 1.0 inches (or approximately 24 mm), the first dimension D2 measures approximately 0.5 inches (approximately 13 mm), and the second dimension D3 measures approximately 0.4 inches (or approximately 10 mm). As used herein, "approximately" means plus or minus 0.2 inches (or approximately 5 mm). The second portion 22*b* includes a slot 22*c* that extends therethrough. The slot 22*c* bifurcates the second portion 22*b* thereby defining a first leg 22*d* and a second leg 22*e* on opposite sides of the slot 22*c*. The first leg 22*d* includes an aperture 22*f*, and the second leg 22*e* includes a bore 22*g* (FIG. 6D). The aperture 22*f* is aligned with (e.g., coincident with) the bore 22*g*. The diameters of the aperture 22*f* and the bore 22*g* are approximately 0.12 inches (or approximately 3.05 mm). The slot 22*c* is sized and shaped to receive the driver blade 26 such that the aperture 26*d* is aligned with (e.g., coincident with) the aperture 22*f* and bore 22*g* of the second portion 22*b*. A pin 32 is received within the aligned apertures 26*d*, 22*f* and bore 22*g* to couple the piston 22 to the driver blade 26. The pin 32 is substantially cylindrical and has a diameter of approximately 0.116 in (or approximately 2.95 mm). In the embodiment of FIGS. 6A-6D, the piston 22 is constructed of a first material (e.g., aluminum) and the driver blade 26 and the pin 32 are constructed from a second material (e.g., steel). In other embodiments, the piston 22, the driver blade 26, and the pin 32 may be constructed from the same second material (e.g., steel).

Figure 6F:
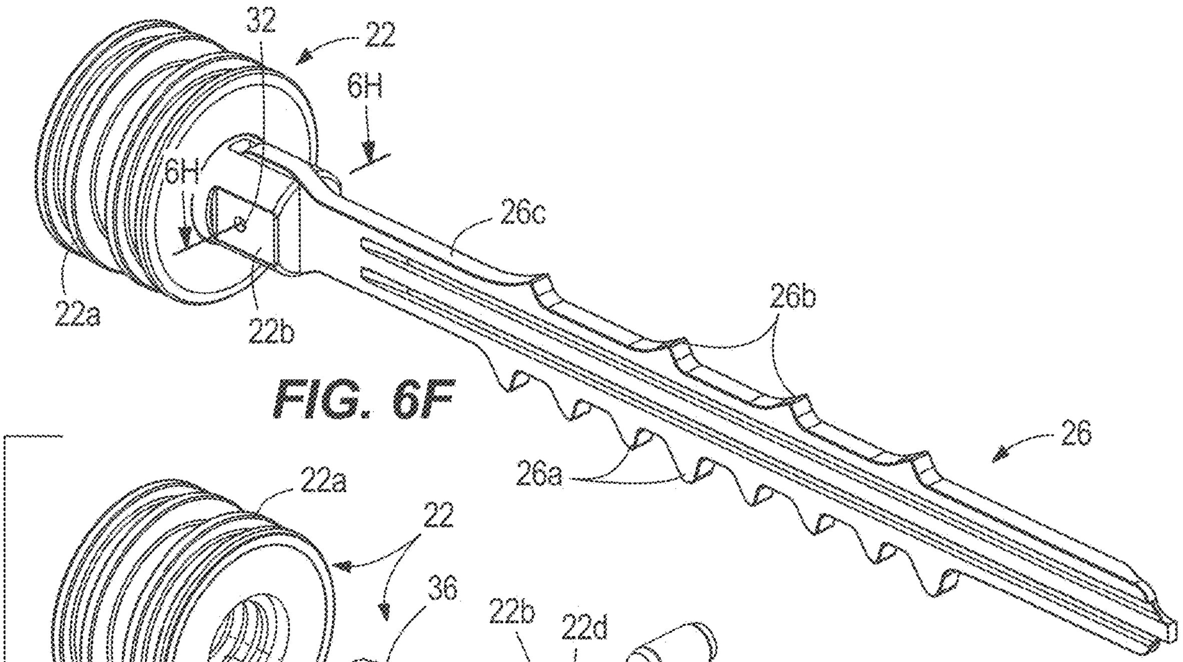
FIG. 6F is a perspective view of the piston and the driver blade of FIG. 6E.
Figure 6G:
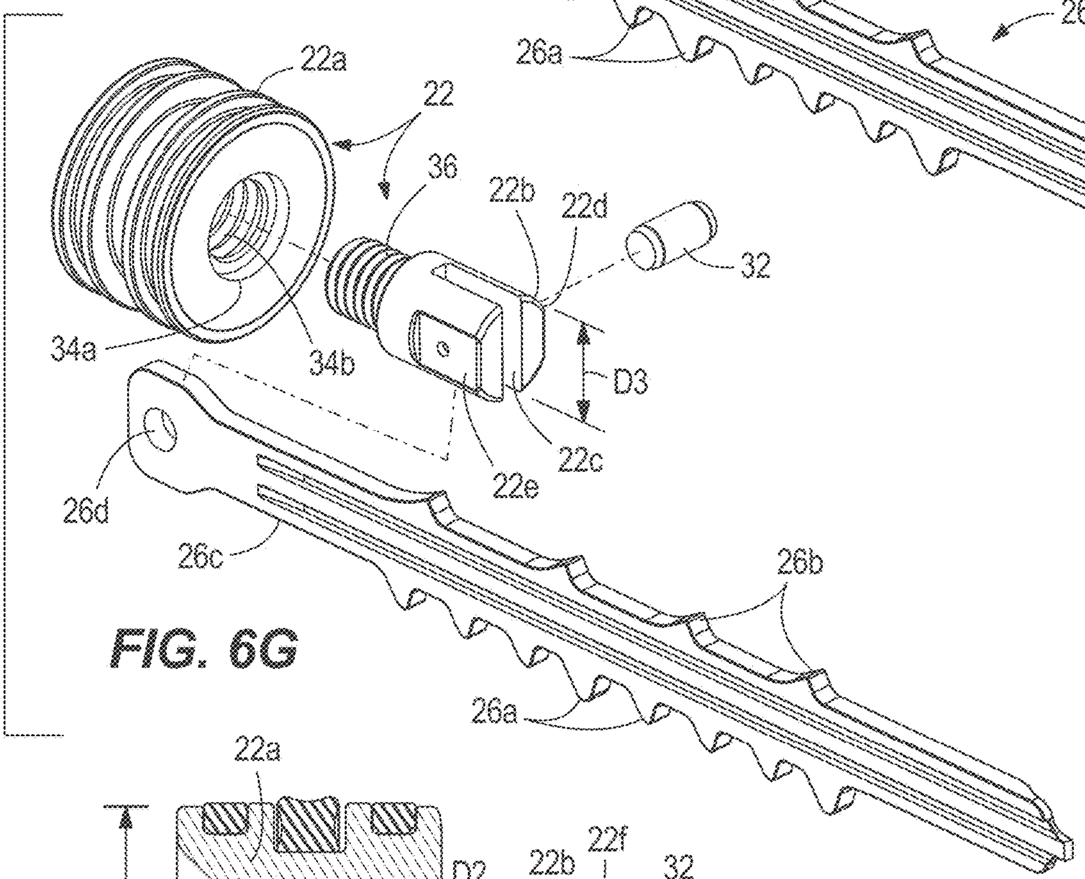
FIG. 6G is an exploded view of the piston and the driver blade of FIG. 6E.

In the embodiment of FIGS. 6E-6G, the piston 22 has a different configuration than that of the piston 22 of FIGS. 6A-6D. Therefore, only the differences between the piston 22 of FIGS. 6E-6G and the piston 22 of FIGS. 6A-6D will be discussed. In the embodiment of FIGS. 6E-6G, the first portion 22*a* and the second portion 22*b* are distinct components that are threadably coupled to one another. To this end, the first portion 22*a* includes a recess 34*a* positioned in one end and a threaded bore 34*b* extending from the recess 34*a* at least partially through the first portion 22*a*. The recess 34*a* circumscribes the threaded bore 34*b*. The second portion 22*b* has a threaded projection 36 extending therefrom. The second portion 22*b* is coupled to the first portion 22*a* via the threaded engagement therebetween. Specifically, the threaded projection 36 is configured to be matingly coupled within the threaded bore 34*b*. When coupled, the second portion 22*b* is seated in the recess 34*a* of the first portion 22*a*. In the embodiment of FIGS. 6E-6G, the first portion 22*a* of the piston 22 is constructed of a first material (e.g., aluminum) and second portion 22*b* of the piston 22, the driver blade 26, and the pin 32 are constructed from a second material (e.g., steel). In other embodiments, both the first and second portions 22*a*, 22*b* of the piston 22, the driver blade 26, and the pin 32 may be constructed from the same second material (e.g., steel). In the illustrated embodiment, a central longitudinal axis extending through the threaded bore 34*b* is aligned with a central longitudinal axis of the first portions 22*a*. Accordingly, a central longitudinal axis extending through the second portion 22*b* is also aligned with the central longitudinal axis of the first portion 22*a* and the central longitudinal axis of the first portion 22*a* extends centrally through the slot 22*c*. In other embodiments, the central longitudinal axis extending through the threaded bore 34*b* may be offset relative to the central longitudinal axis of the first portion 22*a*. In such case, the central longitudinal axis extending through the second portion 22*b* may also be offset relative to the central longitudinal axis of the first portion 22*a* such that the central longitudinal axis of the first portion 22*a* does not extend centrally through the slot 22*c*.

The piston 22 of FIGS. 6E-6G is similarly sized to the piston 22 of FIGS. 6A-6D. Therefore, in the embodiment of FIGS. 6E-6G, like the embodiment of FIGS. 6A-6D, the first diameter D1 measures approximately 1.0 inch (or approximately 24 mm), the first dimension D2 measures approximately 0.5 inch (or approximately 13 mm), the second dimension D3 measures 0.4 inch (or approximately 10 mm), the diameters of aperture 22*f* and bore 22*g* measure approximately 0.12 inch (or approximately 3.05 mm), and the diameter of the pin measures approximately 0.116 inch (or approximately 2.95 mm).

Figure 6H:
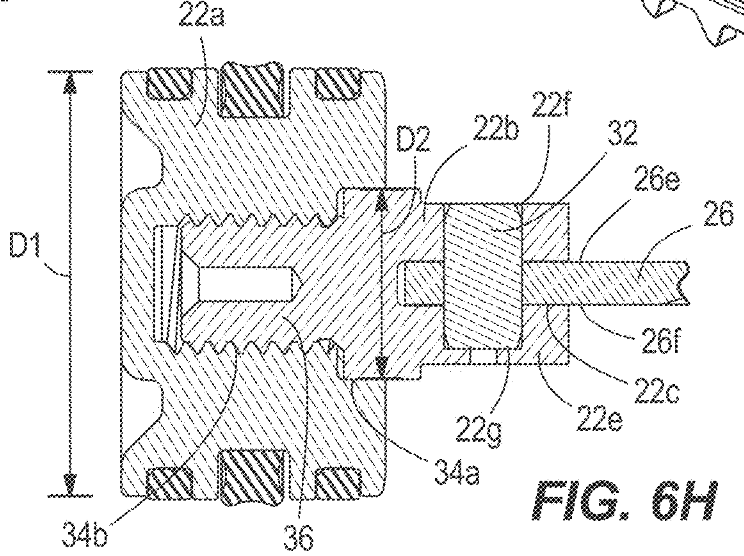
FIG. 6H is a cross-sectional view of the piston and the driver blade of FIG. 6A along the line 6H-6H of FIG. 6F.
Figure 6I:
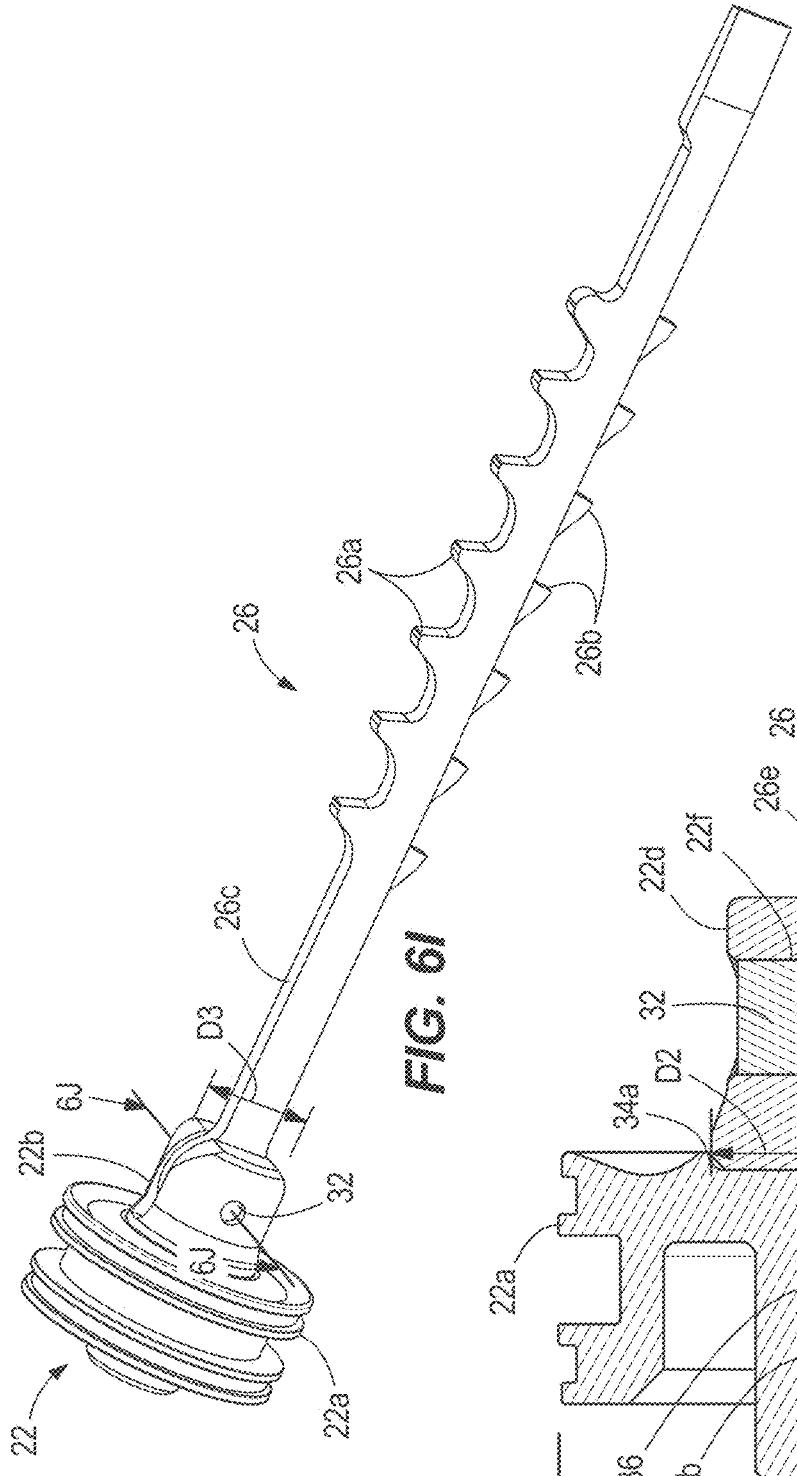
FIG. 6I is a perspective view of another piston and another driver blade having a similar configuration to that of FIG. 6E.
Figure 6J:
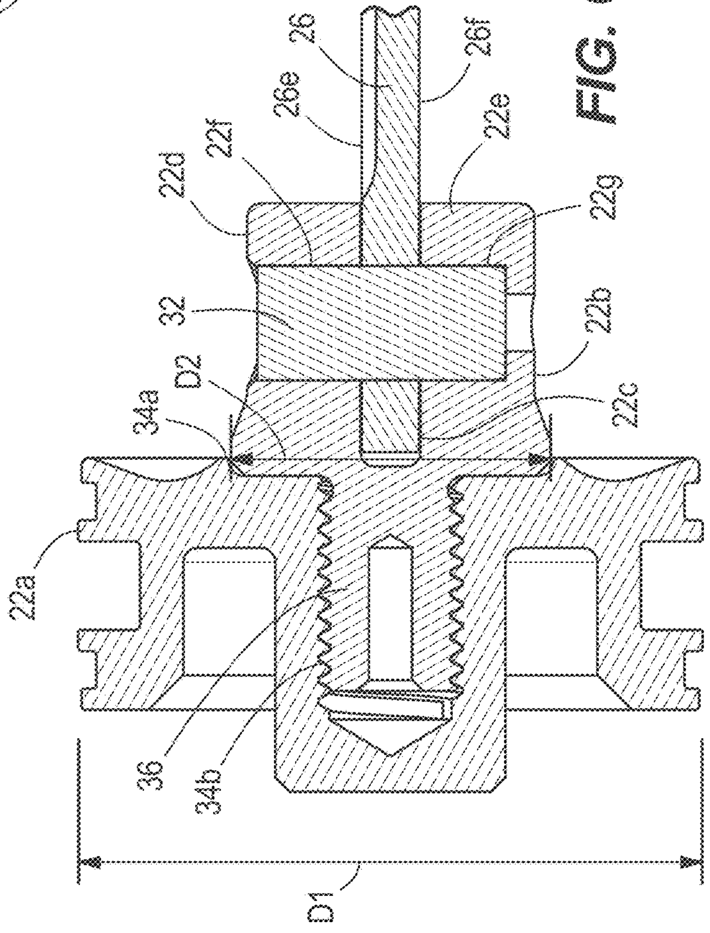
FIG. 6J is a cross-sectional view of the piston and the driver blade of FIG. 6A along the line 6J-6J of FIG. 6I.
Figure 7A:
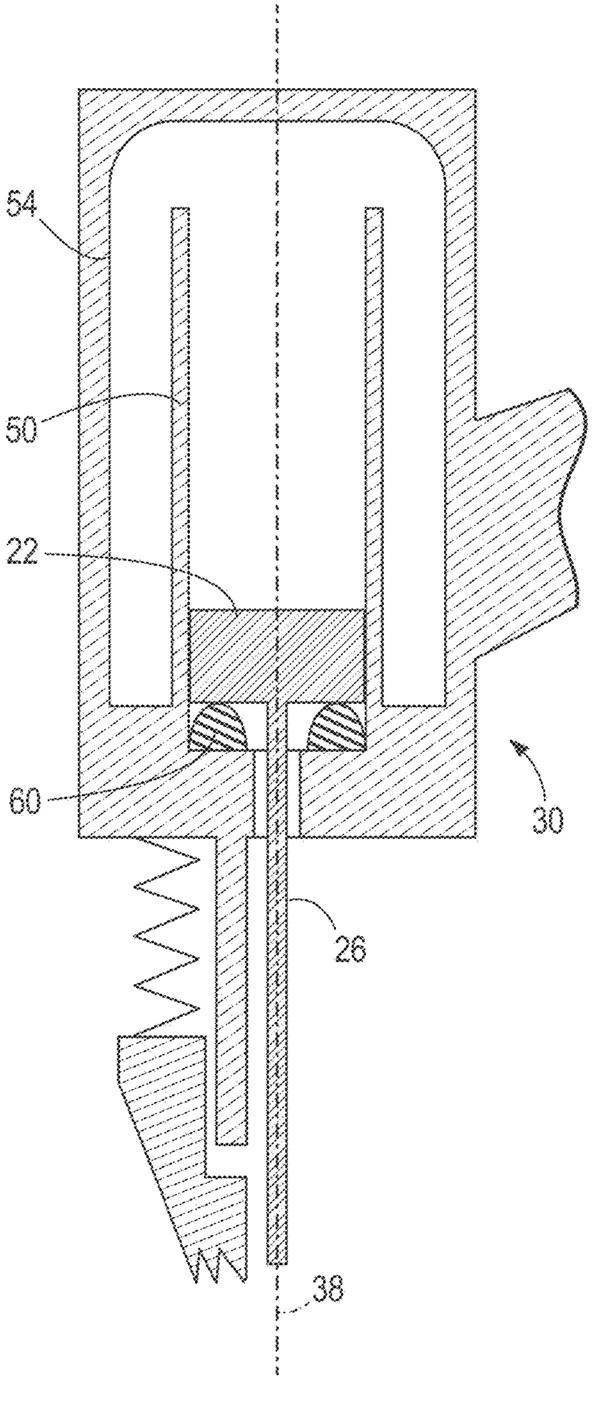
FIG. 7A is a schematic view of the gas spring-powered fastener driver of FIG. 1, illustrating a driver blade in a driven or bottom-dead-center position.
Figure 7B:
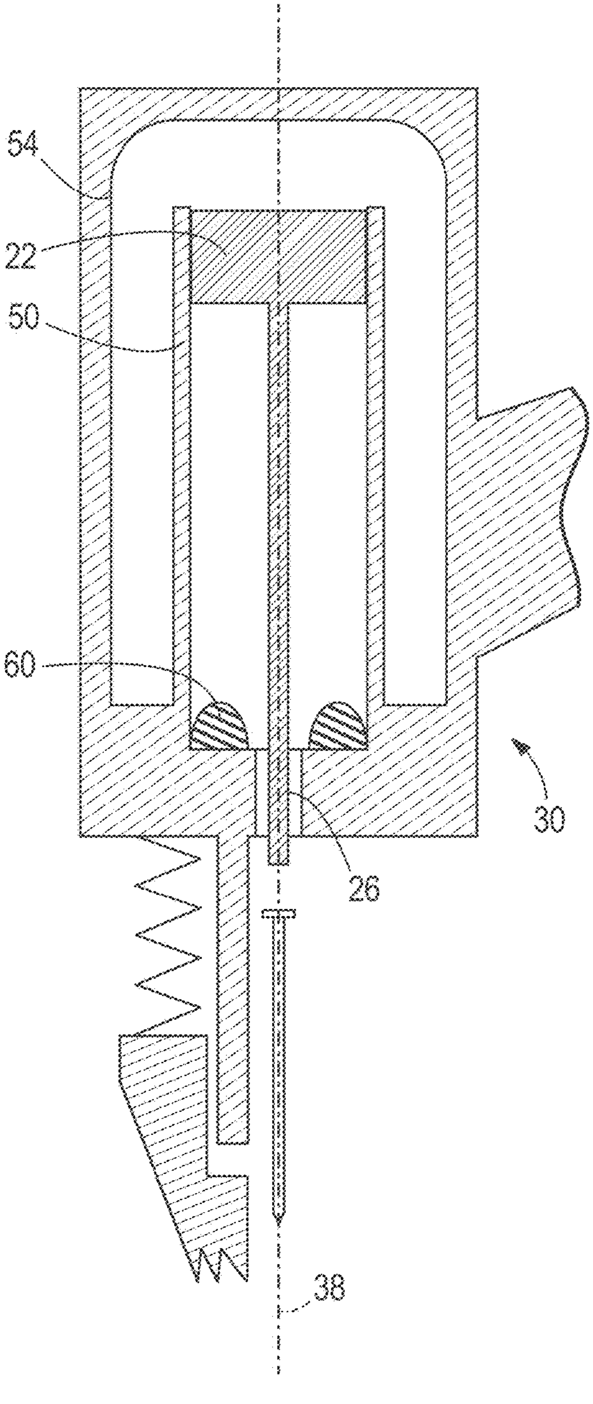
FIG. 7B is a schematic view of the gas spring-powered fastener driver of FIG. 1, illustrating a driver blade in a top-dead-center position prior to actuation.

However, the piston 22 and driver blade 26 of FIGS. 6E-6G may be suitable for larger powered fastener driver, as well, and therefore may have other dimensions (e.g., larger dimensions), as shown in FIGS. 6H-6J. In the embodiment of FIGS. 6H-6J, the first diameter measures approximately 1.7 inch (or approximately 43 mm), the first dimension D2 measures approximately 0.8 inch to 0.9 inch (or approximately 20 mm to 22.3 mm), the second dimension D3 measures approximately 1.1 inch (or approximately 28 mm), the diameters of the aperture 22*f* and bore 22*g* measure approximately 0.18 inch (or approximately 4.5 mm), and the diameter of the pin 32 measures approximately 0.18 inch (or approximately 4.5 mm). As noted above, the pin 32 is pressed into the bore 22*g*.

With reference to FIGS. 6A-7B, the cylinder 18 and the driver blade 26 define a driving axis 38. During a driving cycle, the driver blade 26 and piston 22 are moveable between a top-dead-center (TDC) position (FIG. 7B) and a driven or bottom-dead-center (BDC) position (FIG. 7A). The fastener driver 10 further includes a lifting assembly 42 (FIGS. 3, 4, 6, and 11-13), which has a lifter 44 (FIG. 6A) that is powered by a motor 46 (FIGS. 3, 4, 11-12) and that moves the driver blade 26 from the driven position to the TDC position.

In operation, the lifting assembly 42 drives the piston 22 and the driver blade 26 toward the TDC position by energizing the motor 46. As the piston 22 and the driver blade 26 are driven toward the TDC position, the gas above the piston 22 and the gas within the storage chamber cylinder 30 is compressed. Prior to reaching the TDC position, the motor 46 is deactivated and the piston 22 and the driver blade 26 are held in a ready position, which is located between the TDC position and the BDC position (e.g., the driven position), until being released by user activation of a trigger 48 (FIG. 1). When released, the compressed gas above the piston 22 and within the storage chamber cylinder 30 drives the piston 22 and the driver blade 26 to the driven position, thereby driving a fastener into the workpiece. The illustrated fastener driver 10 therefore operates on a gas spring principle utilizing the lifting assembly 42 and the piston 22 to further compress the gas within the cylinder 18 and the storage chamber cylinder 30. Further detail regarding the structure and operation of the fastener driver 10 is provided below.

With reference to FIGS. 6A-7B, the storage chamber cylinder 30 surrounds the cylinder 18. The cylinder 18 has an annular inner wall 50 configured to guide the piston 22 and driver blade 26 along the driving axis 38 to compress the gas in the storage chamber cylinder 30. The storage chamber cylinder 30 has an annular outer wall 54 circumferentially surrounding the inner wall 50. As such, the cylinder 18 is configured to be axially secured to the storage chamber cylinder 30.

With reference to FIG. 6A, the driver 10 includes a bumper 60 positioned beneath the piston 22 for stopping the piston 22 at the driven position (FIG. 7A) and absorbing the impact energy from the piston 22. The bumper 60 is configured to distribute the impact force of the piston 22 uniformly throughout the bumper 60 as the piston 22 is rapidly decelerated upon reaching the driven position (i.e., the bottom dead center position). The bumper 60 may be formed from any suitable elastic material (e.g., rubber). It is contemplated that a piston 22 that is constructed all or partially from a stronger material, such as steel (as discussed above), may survive the high impacts that result from a cold fire event. This is because when the tool gets cold the bumper 60 increases in stiffness and instead of a soft rubber that absorbs the impact, the bumper 60 no longer compresses as much, absorbs less energy, and causes a higher stress through the piston 22. A steel piston 22, with its higher strength, can withstand this impact better than an aluminum piston 22.

As shown in FIGS. 9A-9G, in the illustrated embodiments, the bumper 60 may have an asymmetric shape and include an asymmetric opening 62 extending therethrough. The bumper 60 defines a first bumper plane 60*a* and a second bumper plane 60*b* that is perpendicular to the first bumper plane 60*a*. The driving axis 38 extends in the second bumper plane 60*b*. In the illustrated embodiments, the bumper 60 includes an upper portion with a first perimeter dimension and a lower portion with a second perimeter dimension that is larger than the first perimeter dimension. In the illustrated embodiment, the opening 62 is generally ovular. As shown, the opening 62 is asymmetric across the first bumper plane 60*a*, and symmetric across the second bumper plane 60*b*, which is perpendicular to the driving axis 38 and the first bumper plane 60*a*. In other embodiments, the opening 62 may be asymmetrical about both the first and second bumper planes 60*a*, 60*b*. Additionally, the opening 62 has a height H1 extending along the first bumper plane 60*a* and a width W1 extending along the second bumper plane 60*b*. As shown, the width W1 that is greater than the height H1. In the illustrated embodiments, a slot 30*a* extending through the storage chamber cylinder 30 that accommodates the blade has a height H2 and a width W2. As shown in the illustrated embodiments, the width W2 of the slot 30*a* is substantially similar to the width W1 of the opening 62, but the height H2 of the slot 30*a* is much smaller than a height H1 of the opening 62. In some embodiments, the height H2 of the slot 30*a* is half or less than half the height H1 of the opening 62.

Figure 8:
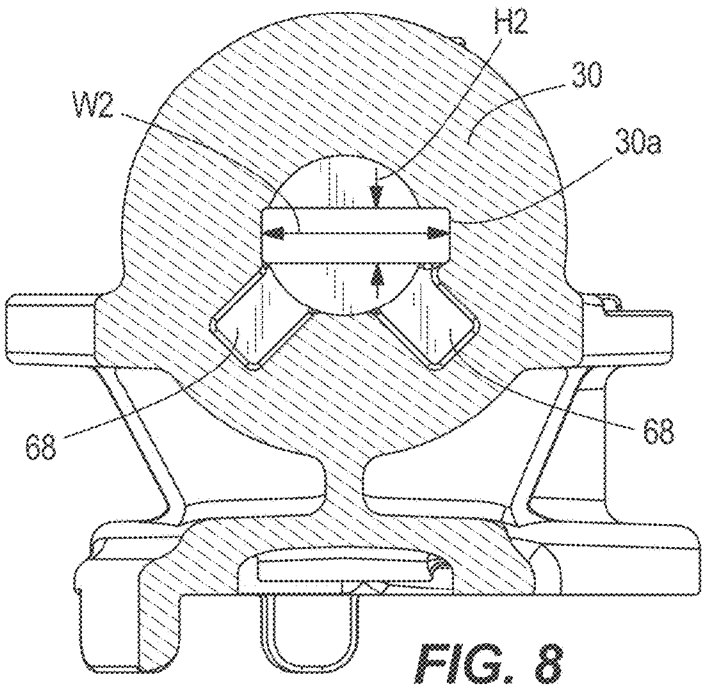
FIG. 8 is a cross-sectional view of a portion of the storage chamber cylinder of FIG. 6A along line 8-8 shown in FIG. 6A.
Figure 9A:
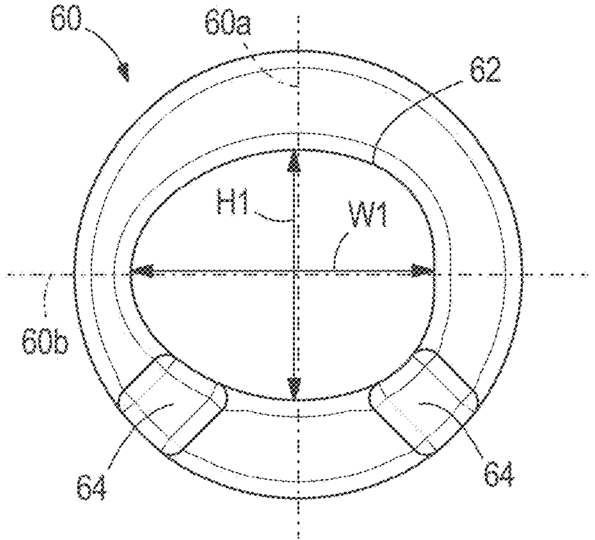
FIG. 9A is a lower end view of the bumper of FIG. 6A, according to one embodiment.
Figure 9B:
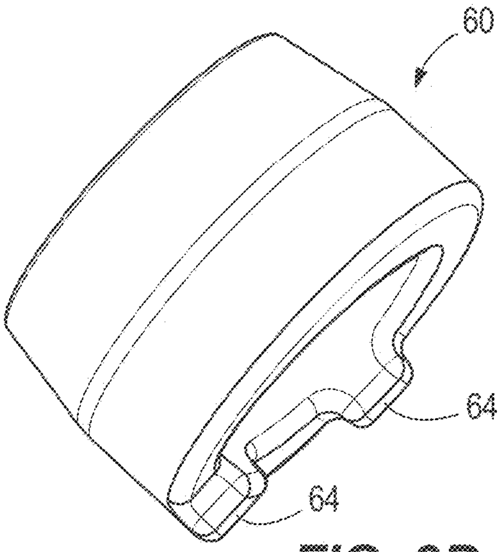
FIG. 9B is a perspective view of the bumper of FIG. 9A.
Figure 9C:
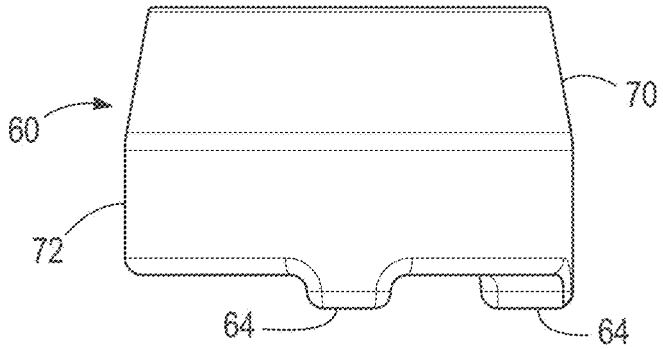
FIG. 9C is a side view of the bumper of FIG. 9A.
Figure 9D:
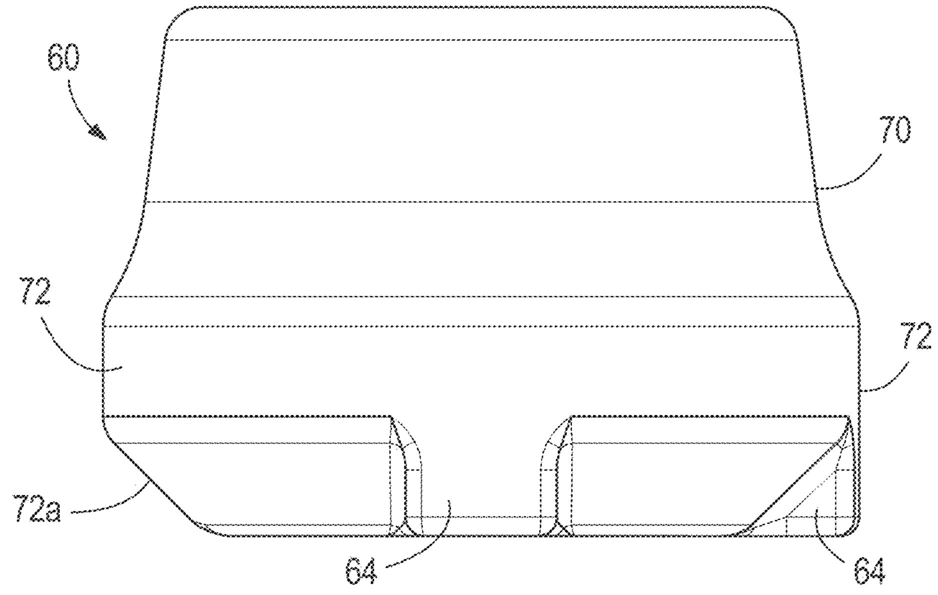
FIG. 9D is a side view of a bumper that may be usable with the gas-spring powered fastener of FIG. 1, according to another embodiment.
Figure 9E:
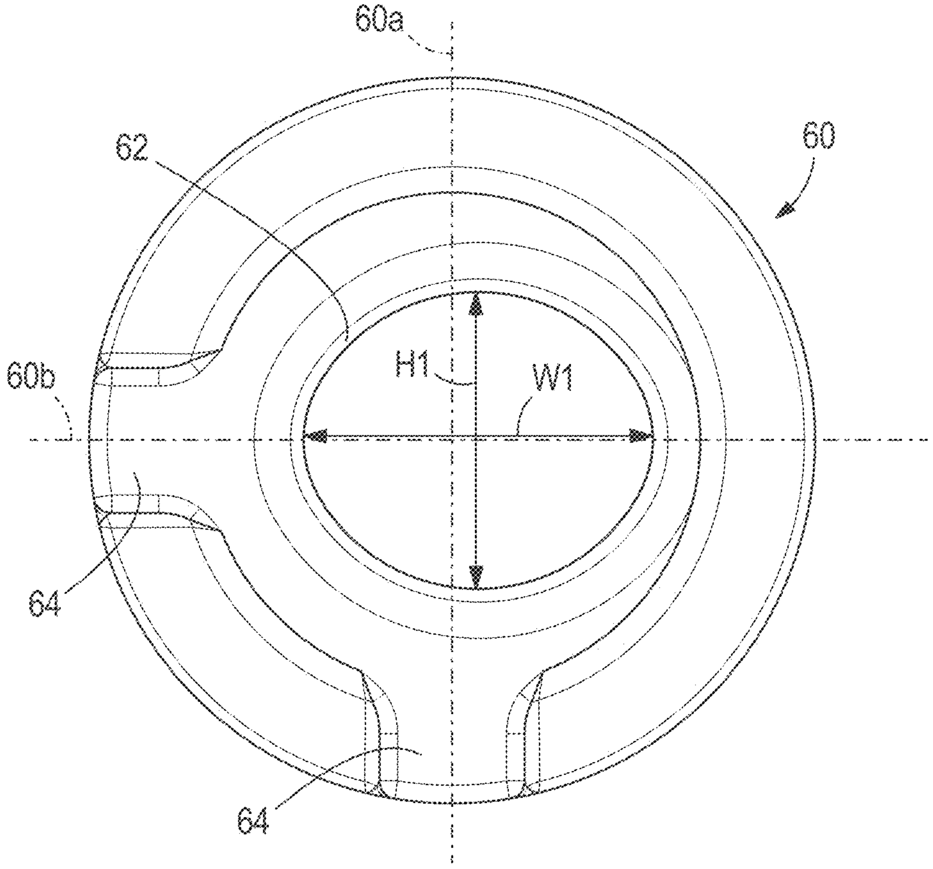
FIG. 9E is a lower end view of the bumper of FIG. 9D.
Figure 9F:
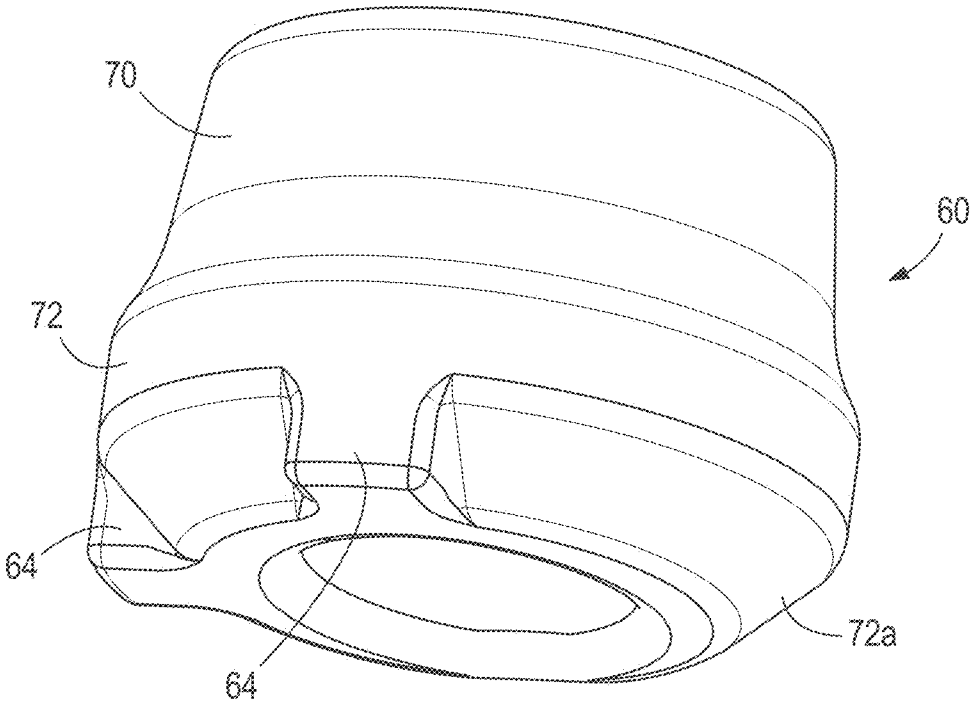
FIG. 9F is a perspective view of the bumper of FIG. 9D.
Figure 9G:
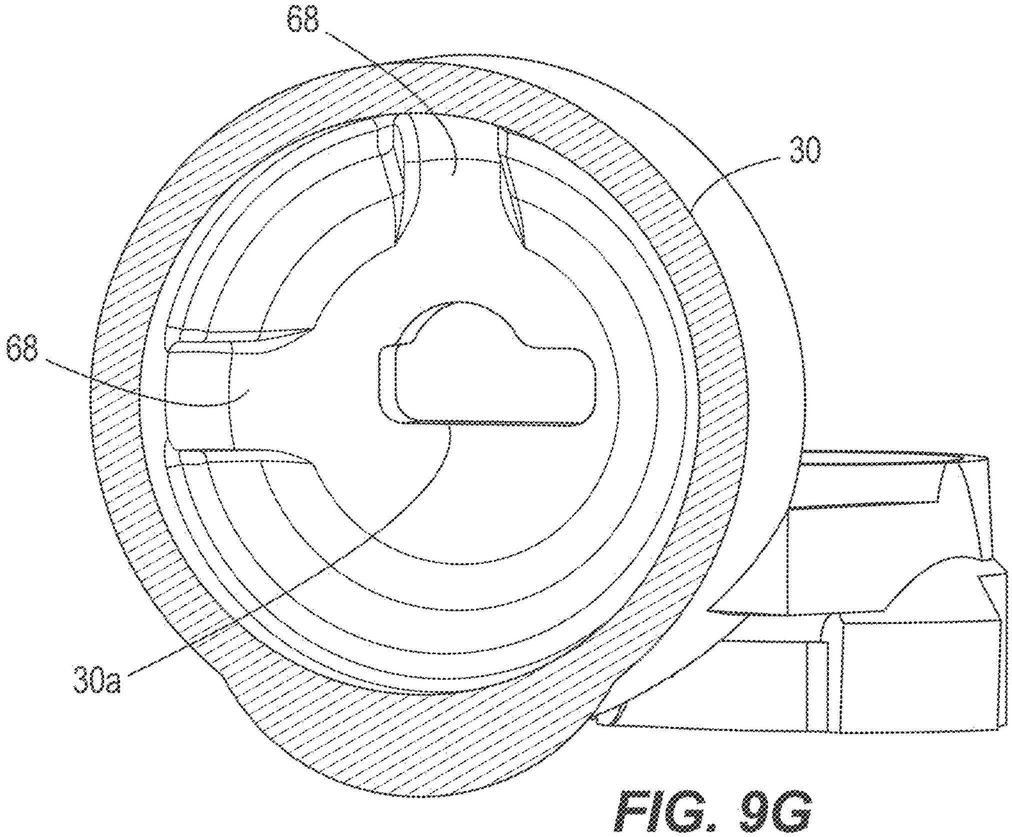
FIG. 9G is a cross-sectional view of a portion of a storage chamber cylinder that may be useable with bumper of FIG. 9D.
Figure 9H:
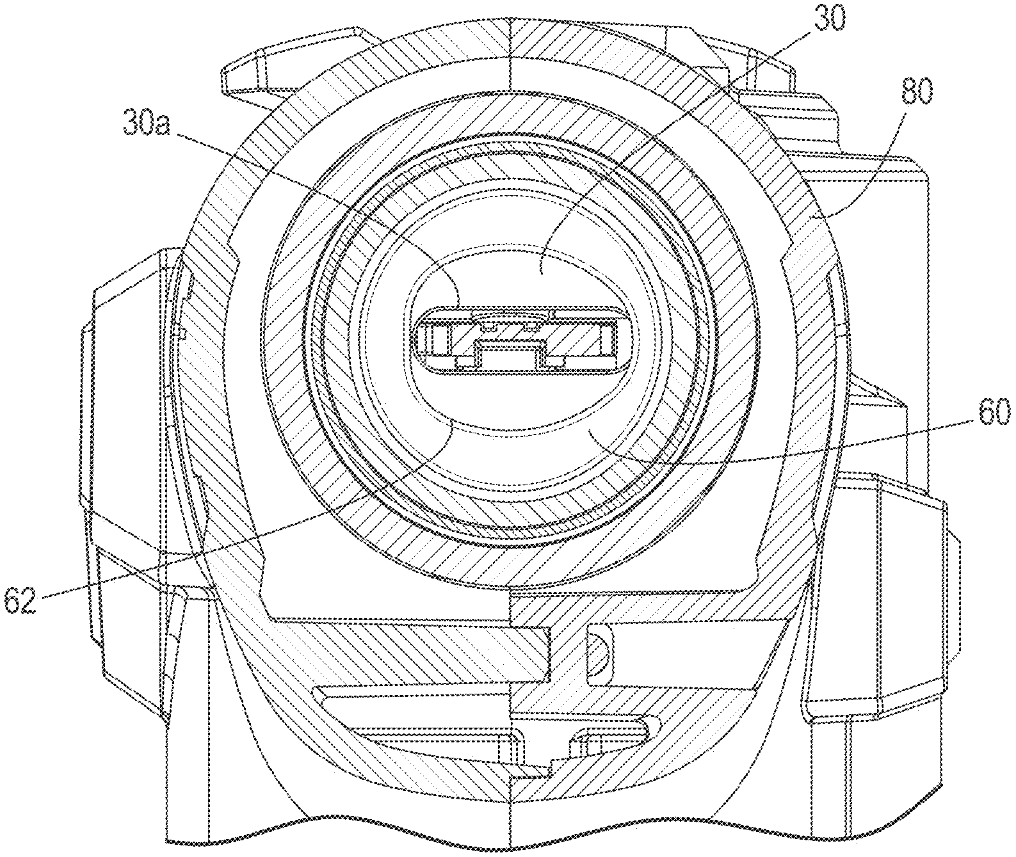
FIG. 9H is a cross-sectional view of the powered fastener driver of FIG. 1 along the line 9H-9H of FIG. 3 illustrating the storage chamber cylinder having another confirmation and the bumper having another configuration.
Figure 9I:
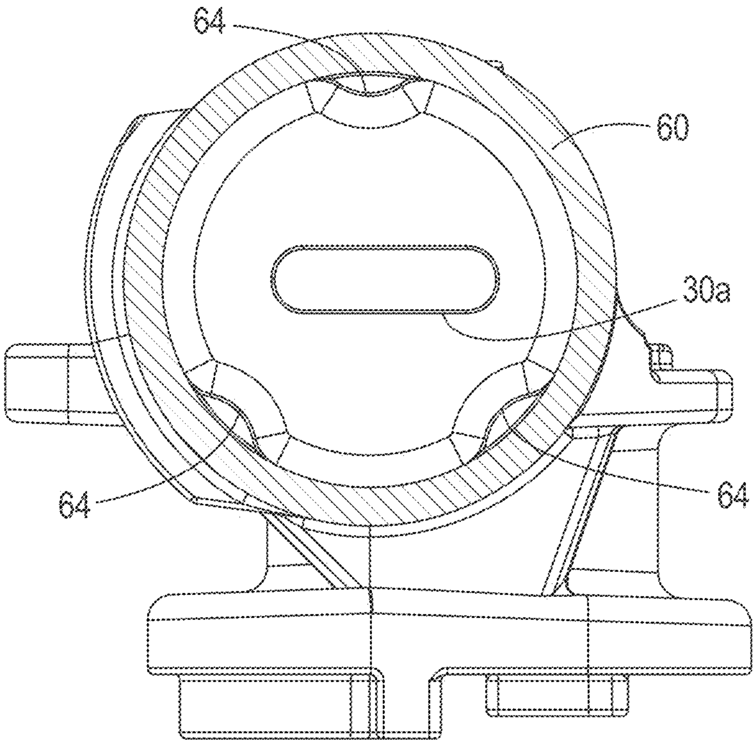
FIG. 9I a cross-sectional view of the storage chamber cylinder of FIG. 9H along the line 9H-9H of FIG. 3.
Figure 9J:
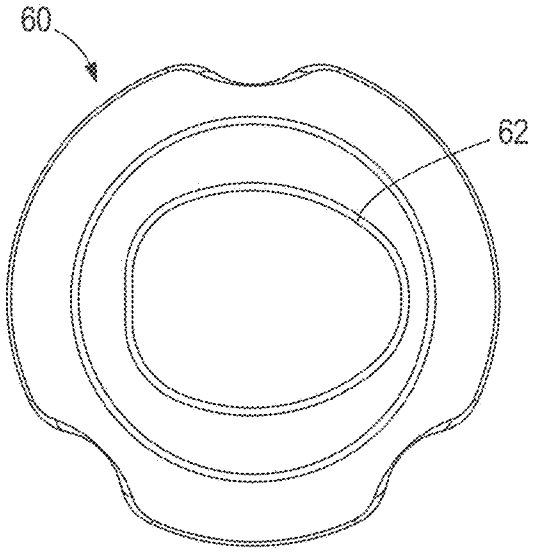
FIG. 9J is an upper end view of the bumper of FIG. 9H.
Figure 9K:
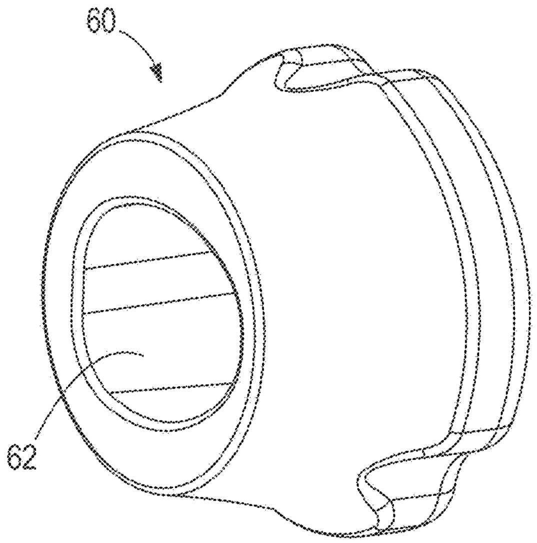
FIG. 9K is a perspective view of the bumper of FIG. 9H.
Figure 9L:
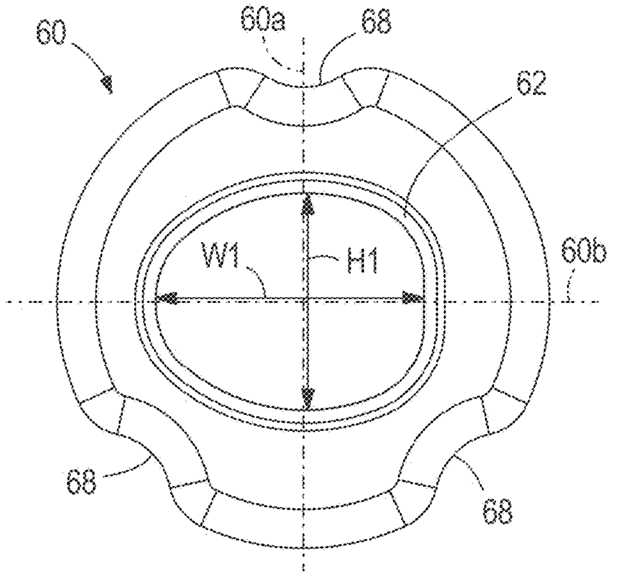
FIG. 9L is a lower end view of the bumper of FIG. 9H.
Figure 9M:
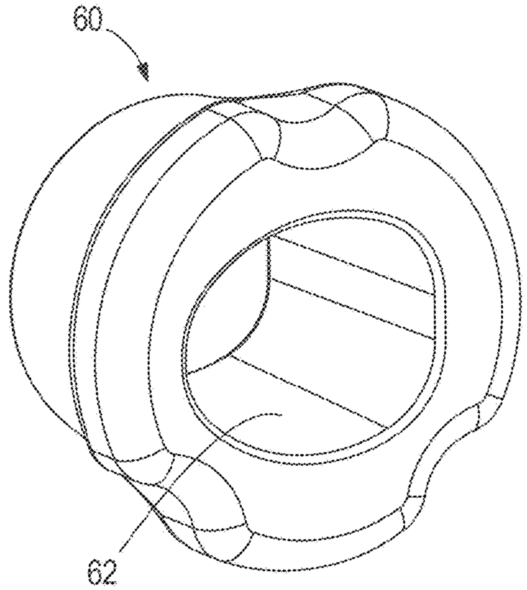
FIG. 9M is another perspective view of the bumper of FIG. 9H.

In the embodiments illustrated in FIGS. 8-9G, the bumper 60 may include a key 64 (e.g., a male component) that is configured to be received in a complementary keyway 68 (e.g., a female component) of the storage chamber cylinder 30 (e.g., an inner frame member or housing). The use of the key 64 and keyway 68 prevents the bumper 60 from rotating during firing events. In the illustrated embodiment, the key 64 of the bumper 60 may include one or more projections and the keyways 68 of the storage chamber cylinder 30 may be complementary recesses that each receive one of the projections of the bumper 60. As shown, the bumper 60 has two projections 64 positioned adjacent one another on the same side of the asymmetric opening 62. In other embodiments, there may be any suitable number of projections 64 on the bumper 60 that are oriented in any suitable configuration. In other embodiments, such as that of FIGS. 91-9M, the one or more keys 64 (e.g., male components) may extend from the storage chamber cylinder 30 and the one or more keyways 68 (e.g., the female components) may be formed on the bumper. In the embodiment of FIGS. 91-9M, there are three keyways 68. At least one keyway 68 is positioned on each opposite side of the second bumper plane 60*b*. As shown in FIG. 9L, there is one keyway 68 positioned on a first side of second bumper plane 60*b* and there are two keyways 68 positioned on a second opposite side of the second bumper plane 60*b*. Stated another way, there is one keyway 68 that is at least partially positioned in the first bumper plane 60*a* and there is one keyway 68 on each side of the first bumper plane 60*a*. In the illustrated embodiment of FIG. 9I, the keys 64 are curvilinear projections or grooves extending along the wall of the storage chamber cylinder 30 parallel to the driving axis 38. Similarly, the keyways 68 are curvilinear recesses in the second outer perimeter of the bumper 60. Regardless of the configuration of the keys/keyways, the keys/keyways cause the bumper 60 to have a generally asymmetrical shape about the first bumper plane 60*a*, the second bumper plane 60*b*, or both the first and second bumper planes 60*a*, 60*b*. In the illustrated embodiment, the bumper 60 has a generally asymmetrical shaped about both the first and second bumper planes 60*a*, 60*b*. Additionally, the keys/keyways are configured to clock the bumper 60 in the correct or predetermined orientation so that the opening 62 is correctly oriented relative to the storage chamber cylinder 30 and the slot 30*a* thereof.

Moreover, in the illustrated embodiment of FIGS. 9A-9F, the upper portion of the bumper 60 has an angled outer surface 70 thereby defining the first outer dimension (e.g., an outer diameter) that tapers from an upper end to an intermediate portion. In contrast, the lower portion has a substantially straight outer surface 72 thereby defining a substantially constant second outer dimension (e.g., outer diameter) from the intermediate portion to a lower end. In other embodiments (e.g., FIG. 9D-9F), the lower portion may alternatively include a tapered edge 72*a*, such that that the lower portion includes both a straight outer surface 72 and an angled outer surface 72*a*. Regardless of the embodiment, the upper portion may have a different cross-sectional shape than the lower portion.

It should be noted that while the bumpers 60 having the keys 64 and the cylinders 30 having the keyways 68 are shown relative to the illustrated powered fastener nailer, the bumper and cylinder configurations may be used in powered fastener nailers having other configurations (e.g., a roofing nailer).

The asymmetric shape of the bumper 60 and the asymmetric opening 62 thereof is configured to accommodate the lifting teeth 26*a* and the latching teeth 26*b* on each side of the bumper 60, but also allow the opening 62 to be smaller at opposite ends thereof such that the bumper 60 enables an overall smaller tool. More specifically, the shape of the opening 62 allows the bumper 60 to be smaller since clearance is only necessary on the opposite sides of the driver blade 26. In contrast, if the opening 62 was a circle (rather than an oval), the bumper 60 would have thinner walls on the top and bottom of the bumper 60 and therefore would need to have a larger outer dimension to compensate. The bumper 60 configuration, therefore, enables the size of the storage chamber cylinder 30 to be reduced and the end result is a smaller width tool. The shape of the opening 62 also significantly reduces the stress in the bumper 60 during compression. In conventional designs, a cutout for the driver blade may have a reduced clearance but its sized and shaped similarly to the size and shape of the slot 30*a* in the storage chamber cylinder. In other words, the heights of conventional cutouts are much closer to the heights of the slots of the storage chamber cylinder. This causes a large stress concentration on the bumper on one of the sides of the cutout.

With reference to FIGS. 1 and 2, the driver 10 includes a housing 80 having a cylinder support portion 84 in which the storage chamber cylinder 30 is at least partially positioned, a drive unit support portion 88 in which the motor 46 and a transmission 92 are at least partially positioned, a handle portion 91, and a connection portion 93 that supports one or more printed circuit boards 95*a*, 95*b* (FIGS. 3 and 4) and a user interface 97. The handle portion 91 defines a handle axis 91' that intersects the driving axis 38. In other words, the handle axis 91' is oriented in a plane 98 that bisects the driver 10 and extends through the driving axis 38 (FIG. 4). In other embodiments, the handle axis 91' is in a plane that is offset from the driving axis 38 by less than 10 mm. In other embodiments, the handle axis 91' is in a plane that is offset from the driving axis 38 by less than 5 mm. In other embodiments, the handle axis 91' is in a plane that is offset from the driving axis 38 by between 1 mm and 5 mm. Additionally, in the illustrated embodiment, the cylinder support portion 84 and the connection portion 93 both extend between the drive unit support portion 88 and the handle portion 91. Accordingly, the drive unit support portion 88 and the handle portion 91 are spaced apart from one another. Moreover, the drive unit support portion 88 is spaced apart from the handle portion 91 in a direction toward the magazine 14 (and the nosepiece assembly 400 and the second end 548 of the workpiece contact assembly 540). In the illustrated embodiment, the cylinder support portion 84, the drive unit support portion 88, the handle portion 91, and the connection portion 93 are integrally formed with one another as a single piece (e.g., using a casting or molding process, depending on the material used). As described below in further detail, the transmission 92 raises the driver blade 26 from the driven position to the ready position.

Figure 3:
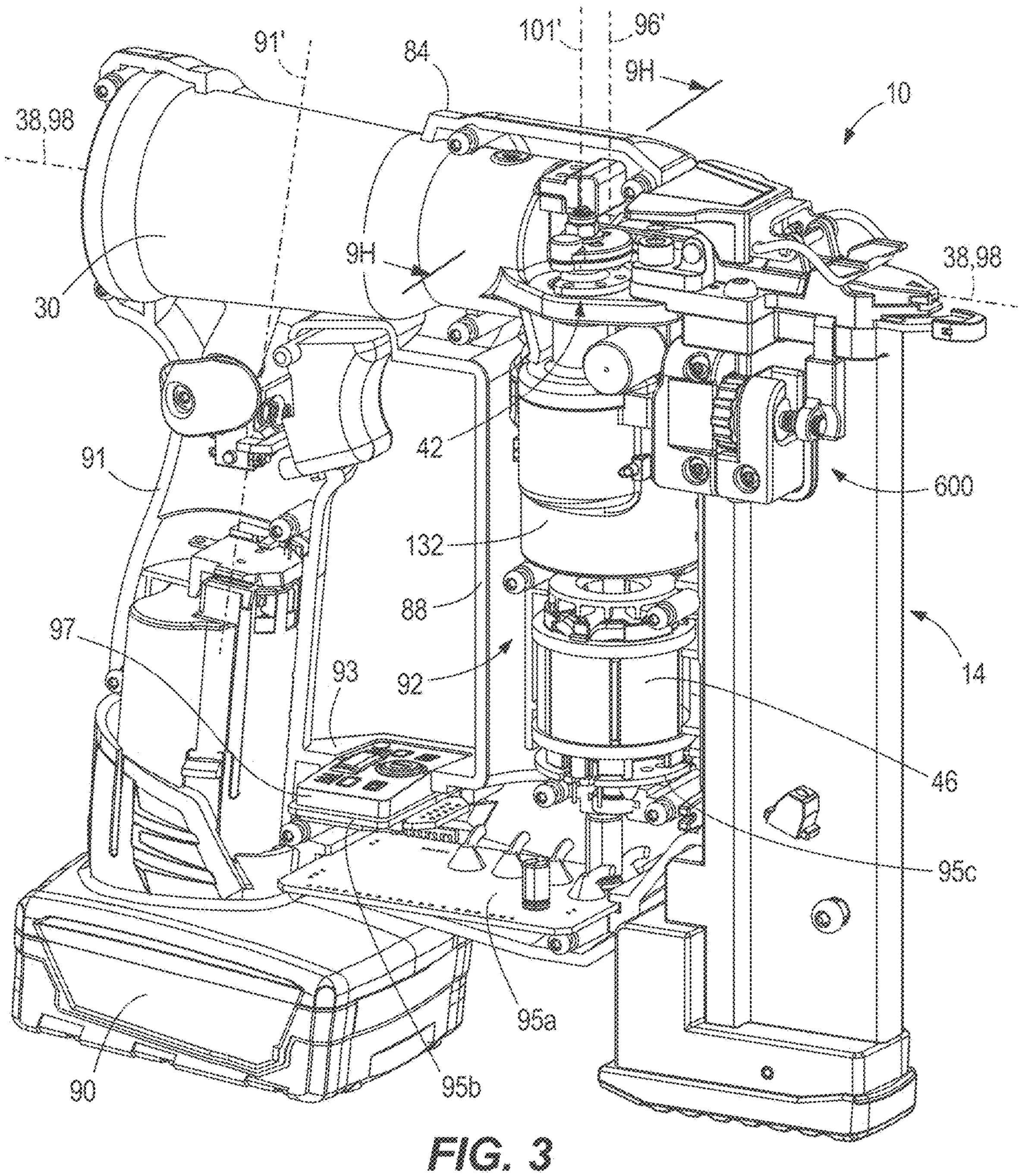
FIG. 3 is a partial cut-away view of the gas spring-powered fastener driver of FIG. 1, with portions removed for clarity.
Figure 4:
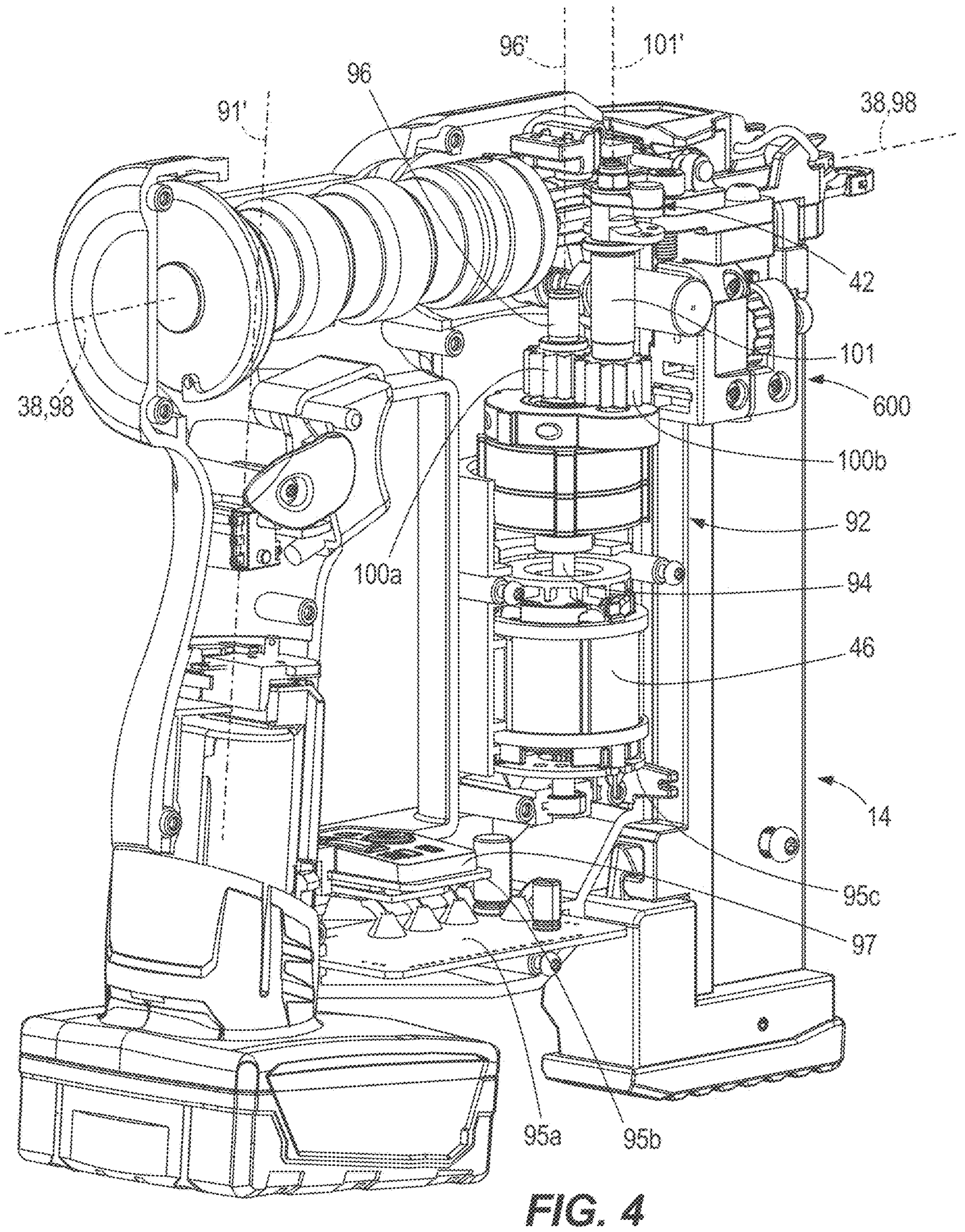
FIG. 4 is another partial cut-away view of the gas spring-powered fastener driver of FIG. 1, with portions removed for clarity.
Figure 5:
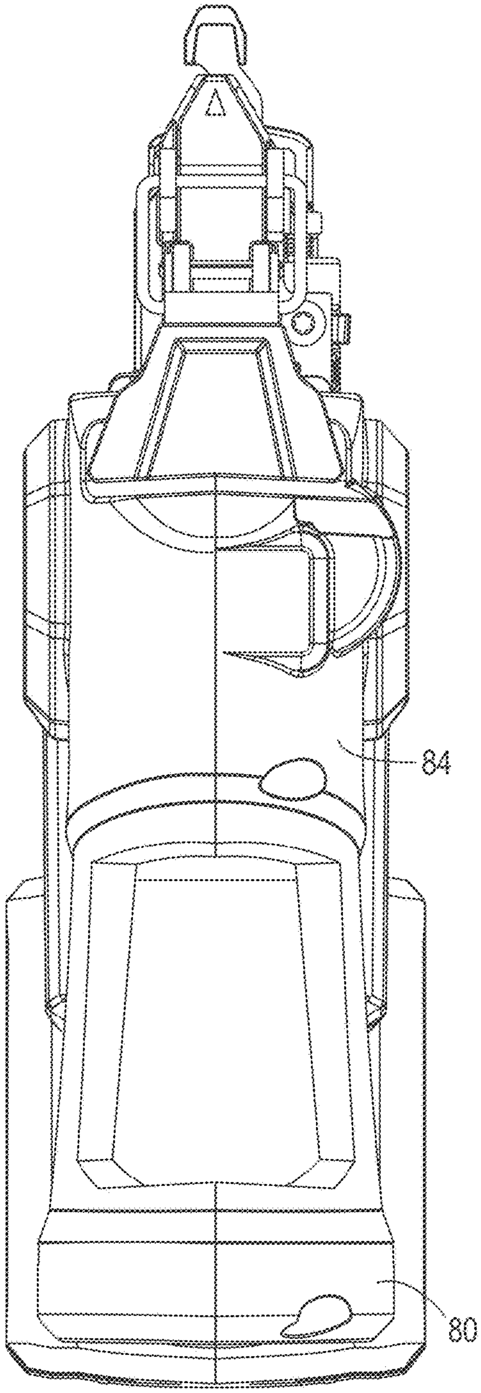
FIG. 5 is a top view of the gas spring-powered fastener driver of FIG. 1.

With reference to FIGS. 3 and 4, a first printed circuit board 95*a* and a second printed circuit board 95*b* are both supported within the connection portion 93 of the housing. Additionally, a third printed circuit board 95*c* is supported within the drive unit support portion 88. In the illustrated embodiment, the first printed circuit board 95*a* is the power printed circuit board, the second printed circuit board 95*b* is a user interface printed circuit board, and the third printed circuit board 95*c* is a motor printed circuit board. The first printed circuit board 95*a* includes an electronic processor (e.g., a microcontroller) that is in electrical communication with a power source (e.g., a battery pack 90). The first printed circuit board 95*a* therefore receives power from the power source. The second printed circuit board 95*b* includes one or more indicators (e.g., one or more lights or LEDs) in communication with the electronic processor. As shown, the first printed circuit board 95*a* is positioned below the second printed circuit board 95*b* within the connection portion 93. The third printed circuit board 95*c* is positioned beneath and coupled to the motor 46. The third printed circuit board 95*c* is electrical communication with the motor 46. The third printed circuit board 95*c* includes a rotational speed sensor. The second printed circuit board 95*b* and the third printed circuit board 95*c* are in electrical communication with the first printed circuit board 95*a*. The rotational speed sensor provides a motor rotational speed output signal to the electronic processor. As will be discussed in greater detail below relative to FIGS. 36-44, the first printed circuit board 95*a* and/or the second circuit board 95*b* may be supported and vibrationally isolated within the housing 80 (e.g., the connection portion 93) with one or more channels and/or one or more dampers.

With reference to FIG. 4, the motor 46 is positioned within the drive unit support portion 88 for providing torque to the transmission 92 when activated. The battery pack 90 is received and supported by a battery pack attachment interface of the handle portion 91. The battery pack 90 is electrically connectable to the motor 46 for supplying electrical power to the motor 46 via the first printed circuit board 95*a*. In alternative embodiments, the driver may be powered from an alternative power source such as an AC voltage input (i.e., from a wall outlet), or by an alternative DC voltage input (e.g., an AC/DC converter).

Figure 35:
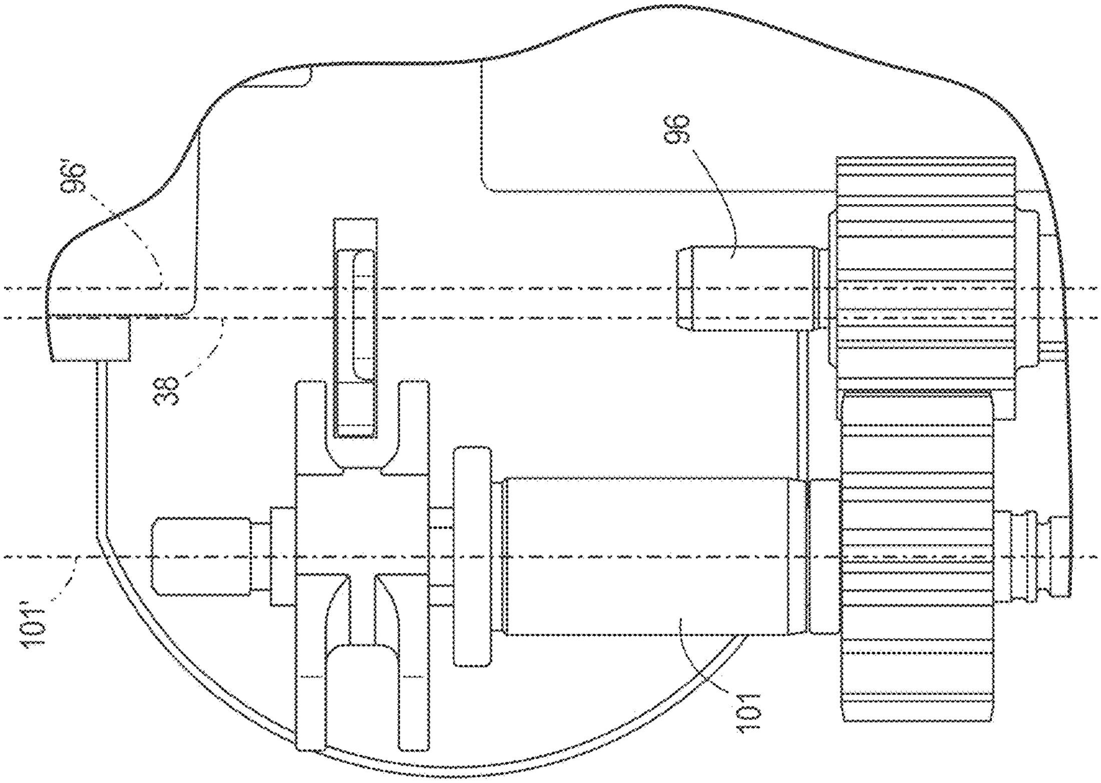
FIG. 35 illustrates a schematic view of a transmission for use with the fastener driver of FIG. 1 or 24 relative to a driving axis thereof.

With reference to FIG. 4, the transmission 92 provides torque to the lifter 44 from the motor 46. The transmission 92 includes an input shaft 94 and a first output shaft 96 extending along a first output shaft axis 96'. In the illustrated embodiment, the first output shaft axis 96' intersects the driving axis 38. In other words, like the handle axis 91' and the first output shaft axis 96' are contained within the plane 98 that bisects the driver 10 and also contains the driving axis 38. In other embodiments, such as that of FIG. 35, the first output shaft axis 96' is in a plane that is offset from the driving axis 38 by a first distance X. The first distance X may be less than about 10 mm (wherein about means plus or minus 0.1 mm). In other embodiments, the first distance X may be less than about 5 mm. In other embodiments, the first distance X may be between about 1 mm and 5 mm. In the embodiment of FIG. 35, the first distance X less than about 1.5 mm. Regardless, the motor 46 is generally in-line with the handle portion 91. As shown, the motor 46 is therefore positioned between the handle portion 91 and the magazine 14 (and therefore the nosepiece assembly 400 and the second end 548 of the workpiece assembly 540). That is, the motor 46 is generally below the handle portion 91 when the driver 10. With continued reference to FIG. 4, the first output shaft 96 rotates a drive gear 100*a*, which is operable to drive a driven gear 100*b*. In the illustrated embodiment, the gears 100*a*, 100*b* are meshed spur gears. Extending from the driven gear 100*b* is a second output shaft 101. The second output shaft 101 is operable to drive the lifter 44, which in turn is operable to move the driver blade 26 from the driven position to the ready position, as explained in greater detail below. In the illustrated embodiment, the second output shaft 101 extends along a second output shaft axis 101' that parallel to the first output shaft axis 96' and the plane 98. As shown, the second output shaft axis 101' extends in a plane that is laterally offset from the driving axis 38 and the plane 98 by a second distance Y. Moreover, as shown, the second distance Y is greater than the first distance X. As noted above, in some embodiments, such as that of FIG. 35, the driving axis 38 is positioned between the first output axis 96' and the second output axis 101'. In the illustrated embodiment, the second distance Y is about 15.6 mm. In other embodiments, the second distance is between about 5 mm and about 30 mm or between about 10 mm and about 20 mm. As shown, the first motor axis 96' and the second motor axis 101' are spaced apart from one another by a third distance Z. In the illustrated embodiment, the third distance Z may be about 17 mm. In other embodiments, the third distance Z may be between about 10 mm and about 30 mm or between about 15 mm and about 20 mm. Accordingly, the driving axis 38 may be positioned less than 10% of the third distance Z as measured from the first output axis 96'.

Figure 10:
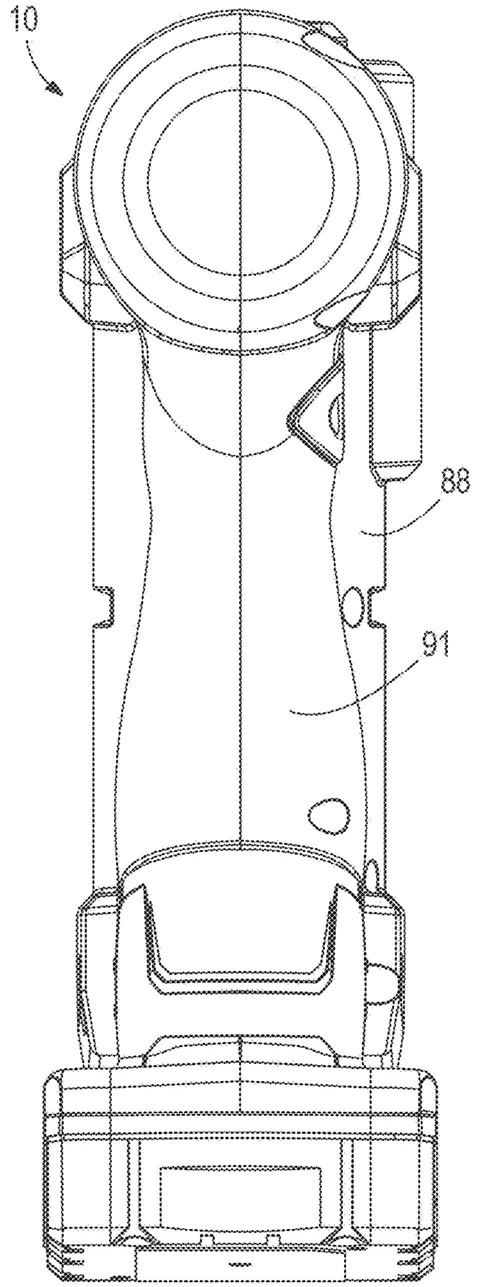
FIG. 10 is a rear view of the gas spring-powered fastener of FIG. 1.

Because the motor 46 and drive unit support portion 88 are in-line with the handle portion 91 as shown in FIG. 10, the driver 10 is more compact than conventional fastener drivers in which the motor is offset from the handle portion. This is because only the driven gear 100*b* and second output shaft 101, rather than the entire transmission 92, need to be offset from the driving axis 38 and the plane 98 to provide torque to the lifter 44.

Figure 11:
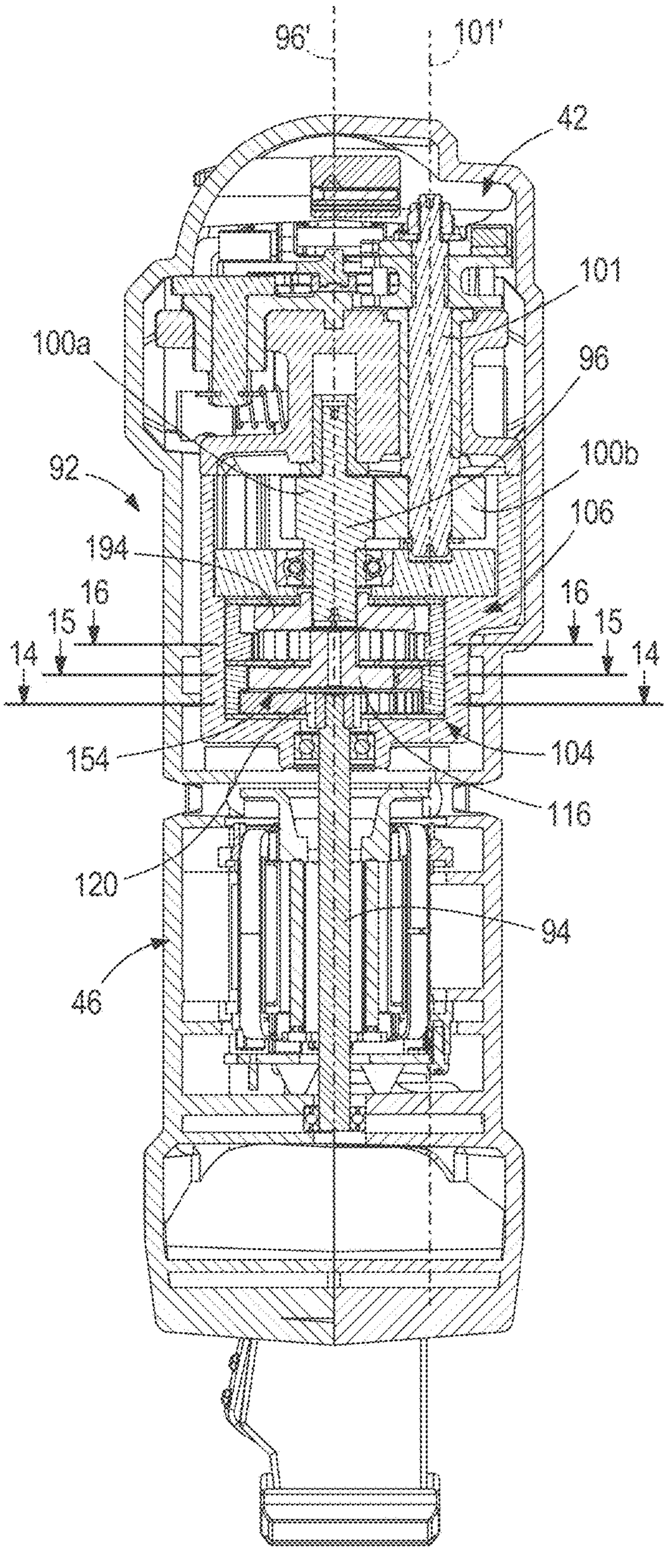
FIG. 11 is a cross-sectional view of the gas spring-powered fastener of FIG. 1 taken along the line 11-11 of FIG. 2A and illustrating a transmission.

With reference to FIG. 11, the transmission 92 is configured as a planetary transmission having a first planetary gear stage 104 and a second planetary gear stage 106. In alternative embodiments, the transmission may be a single-stage planetary transmission, or a multi-stage planetary transmission including any number of planetary gear stages. The first planetary gear stage 104 includes a ring gear 112, a carrier 116 (FIGS. 11 and 15), a sun gear 120, and multiple planet gears 124 coupled to the carrier 116 for relative rotation therewith. The sun gear 120 is drivingly coupled to the input shaft 94 and is enmeshed with the planet gears 124. The ring gear 112 includes a toothed interior peripheral portion 128. In the illustrated embodiment, the ring gear 112 in the first planetary gear stage 104 is fixed to a transmission housing 132 (FIG. 12) positioned adjacent the motor 46 such that it is prevented from rotating relative to the transmission housing 132. The plurality of planet gears 124 are rotatably supported upon the carrier 116 and are engageable with (i.e., enmeshed with) the toothed interior peripheral portion 128.

Figure 15:
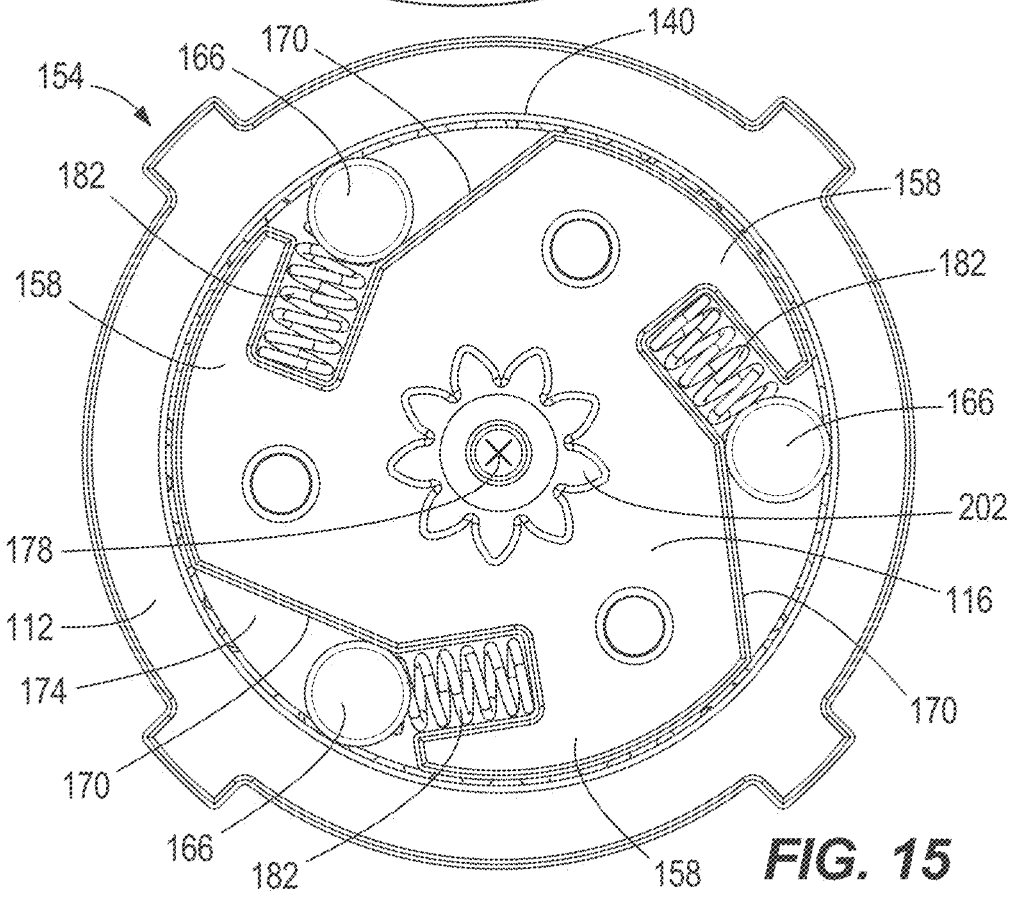
FIG. 15 is a cross-sectional view of the transmission of FIG. 11 taken along the line 15-15 of FIG. 11.

With reference to FIGS. 11 and 15, the driver 10 further includes a one-way clutch mechanism 154 incorporated in the transmission 92. More specifically, the one-way clutch mechanism 154 includes the carrier 116, which is also a component in the second planetary gear stage 106. The one-way clutch mechanism 154 permits a transfer of torque to the first output shaft 96 of the transmission 92 in a single (i.e., first) rotational direction (i.e., counter-clockwise from the frame of reference of FIG. 3), yet prevents the motor 46 from being driven in a reverse direction in response to an application of torque on the first output shaft 96 of the transmission 92 in an opposite, second rotational direction (e.g., clockwise from the frame of reference of FIG. 3). In the illustrated embodiment, the one-way clutch mechanism 154 is incorporated with the first planetary gear stage 104 of the transmission 92. In alternative embodiments, the one-way clutch mechanism 154 may be incorporated into the second planetary gear stage 106, for example.

Figure 14:
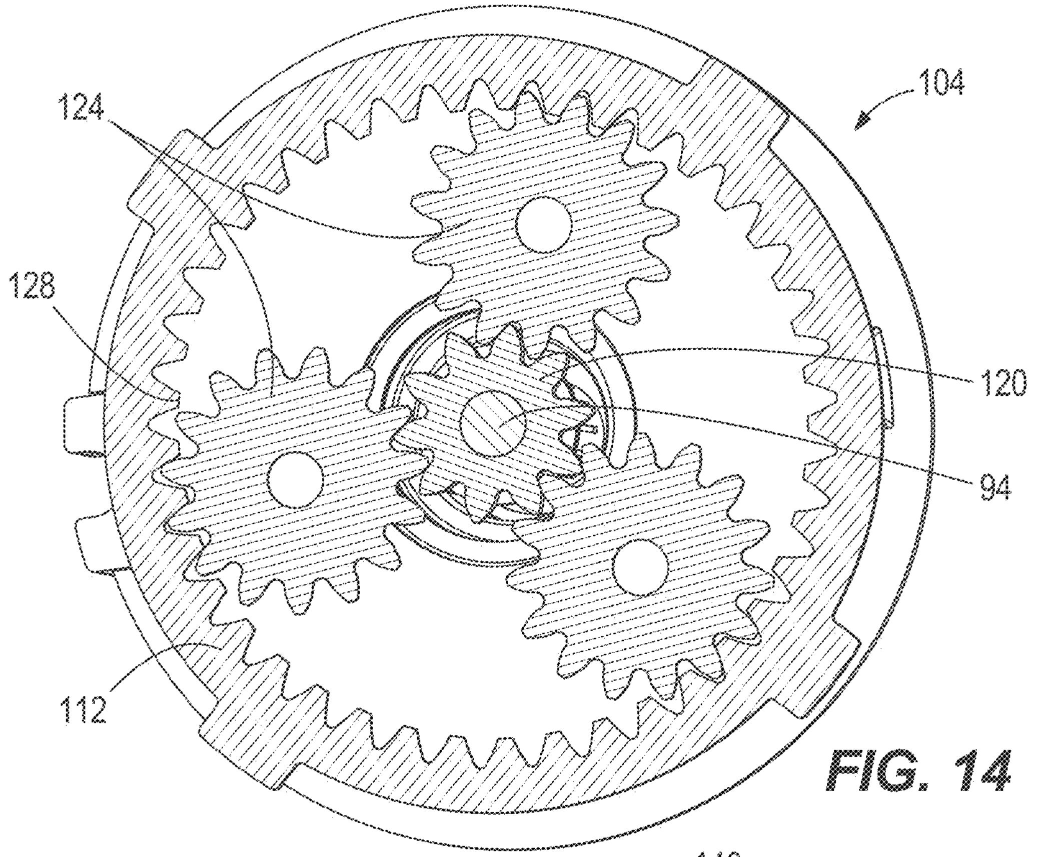
FIG. 14 is a cross-sectional view of the transmission of FIG. 11 taken along the line 14-14 of FIG. 11.

With continued references to FIG. 15, the one-way clutch mechanism 154 also includes a plurality of lugs 158 defined on an outer periphery of the carrier 116. In addition, the one-way clutch mechanism 154 includes a plurality of rolling elements 166 engageable with the respective lugs 158, and a ramp 170 adjacent each of the lugs 158 along which the rolling element 166 is moveable. The illustrated rolling elements 166 extend from a disc 174. Each of the ramps 170 is inclined in a manner to displace the rolling elements 166 farther from a rotational axis 178 of the carrier 116 (into the page as shown in FIG. 15) as the rolling elements 166 move further from the respective lugs 158. With reference to FIG. 14, the carrier 116 of the one-way clutch mechanism 154 is in the same planetary gear stage of the transmission 92 as the ring gear 112 (i.e., the first planetary gear stage 104). The rolling elements 166 are engageable with the second interior peripheral portion 140 of the ring gear 112 in response to an application of torque on the first output shaft 96 in the second rotational direction (i.e., as the rolling elements 166 move along the ramps 170 away from the respective lugs 158). A biasing mechanism (e.g., a spring 182) is positioned between each of the rolling elements 166 and the carrier 116. The springs 182 bias the rolling elements 166 toward the second interior peripheral portion 140 (and away from the lugs 158).

In operation of the one-way clutch mechanism 154, the rolling elements 166 are maintained in close proximity with the respective lugs 158 in the first rotational direction (i.e., counter-clockwise from the frame of reference of FIG. 3) of the first output shaft 96. However, when the piston 22/driver blade 26 has reached the ready position, the rolling elements 166 move away from the respective lugs 158 in response to an application of torque on the first output shaft 96 in an opposite, second rotational direction (i.e., clockwise from the frame of reference of FIG. 3). More specifically, when the first output shaft 96 rotates a small amount (e.g., 1 degree) in the second rotational direction, the rolling elements 166 roll away from the respective lugs 158 along the ramps 170 and engage the second interior peripheral portion 140 on the ring gear 112 to thereby prevent further rotation of the first output shaft 96 in the second rotational direction. Consequently, the one-way clutch mechanism 154 prevents the transmission 92 from applying torque to the motor 46, which might otherwise back-drive or cause the motor 46 to rotate in a reverse direction, in response to an application of torque on the first output shaft 96 in an opposite, second rotational direction (i.e., when the piston 22 and the driver blade 26 has reached the ready position).

Figure 16:
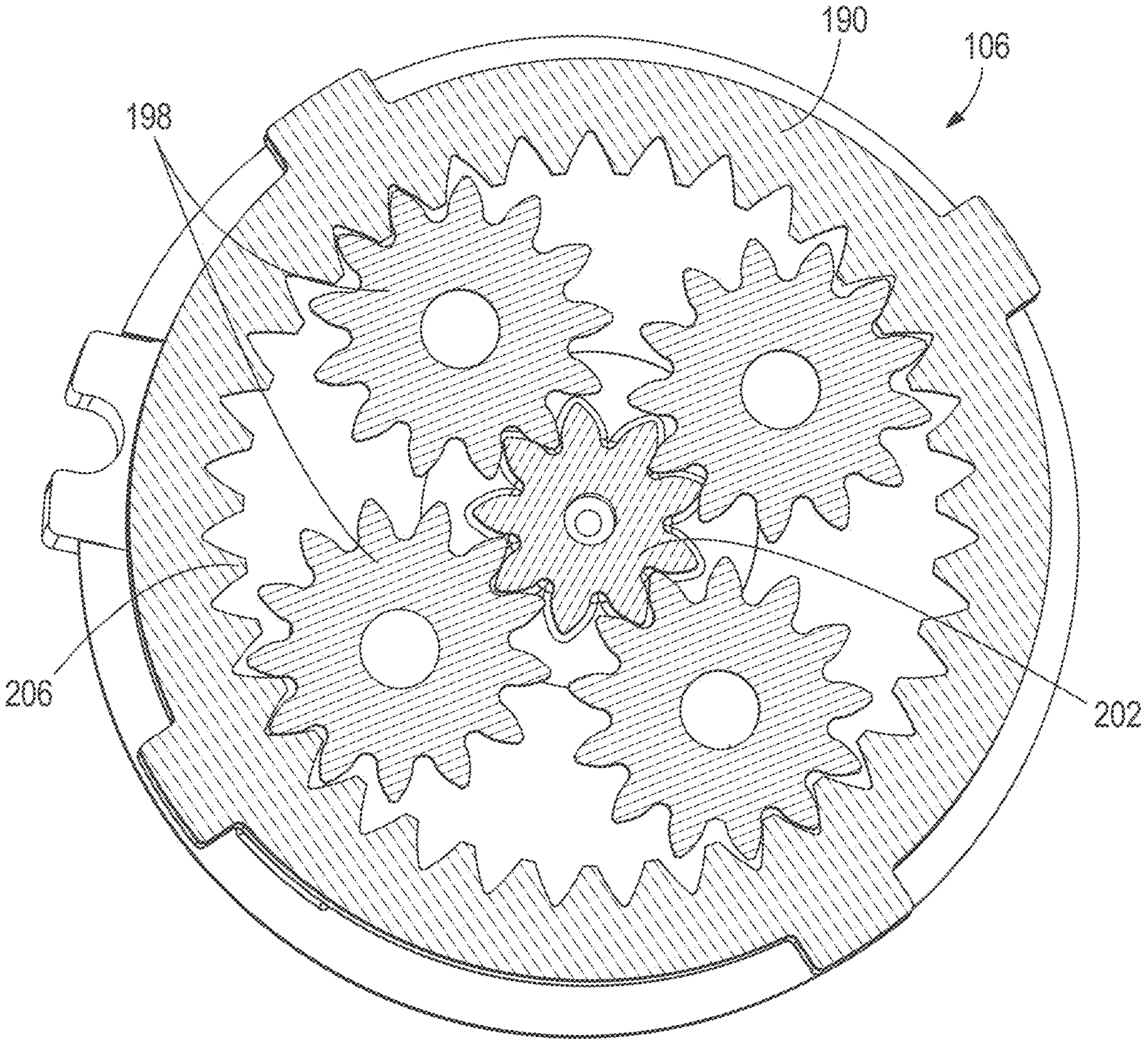
FIG. 16 is a cross-sectional view of the transmission of FIG. 11 taken along the line 16-16 of FIG. 11.

With reference to FIGS. 11 and 16, the second planetary gear stage 106 includes a ring gear 190, a carrier 194 (FIG. 11), and multiple planet gears 198 coupled to the carrier 194 for relative rotation therewith. The carrier 116 of the first planetary gear stage 104 further includes an output pinion 202 that is enmeshed with the planet gears 198 which, in turn, are rotatably supported upon the carrier 194 of the second planetary gear stage 106 and enmeshed with a toothed interior peripheral portion 206 of the ring gear 190. Like the ring gear 112, the ring gear 190 of the second planetary gear stage 106 is fixed relative to the transmission housing 132. The carrier 194 is operably coupled to the first output shaft 96 for relative rotation therewith. Moreover, the carrier 194 is operably coupled to the first output shaft 96 to rotate the first output shaft 96, and therefore the drive gear 100*a* of the spur gear arrangement.

Although not shown, the driver 10 further includes a torque-limiting electronic-clutch mechanism, which limits an amount of torque transferred to the first output shaft 96 and the lifter 44.

Figure 12:
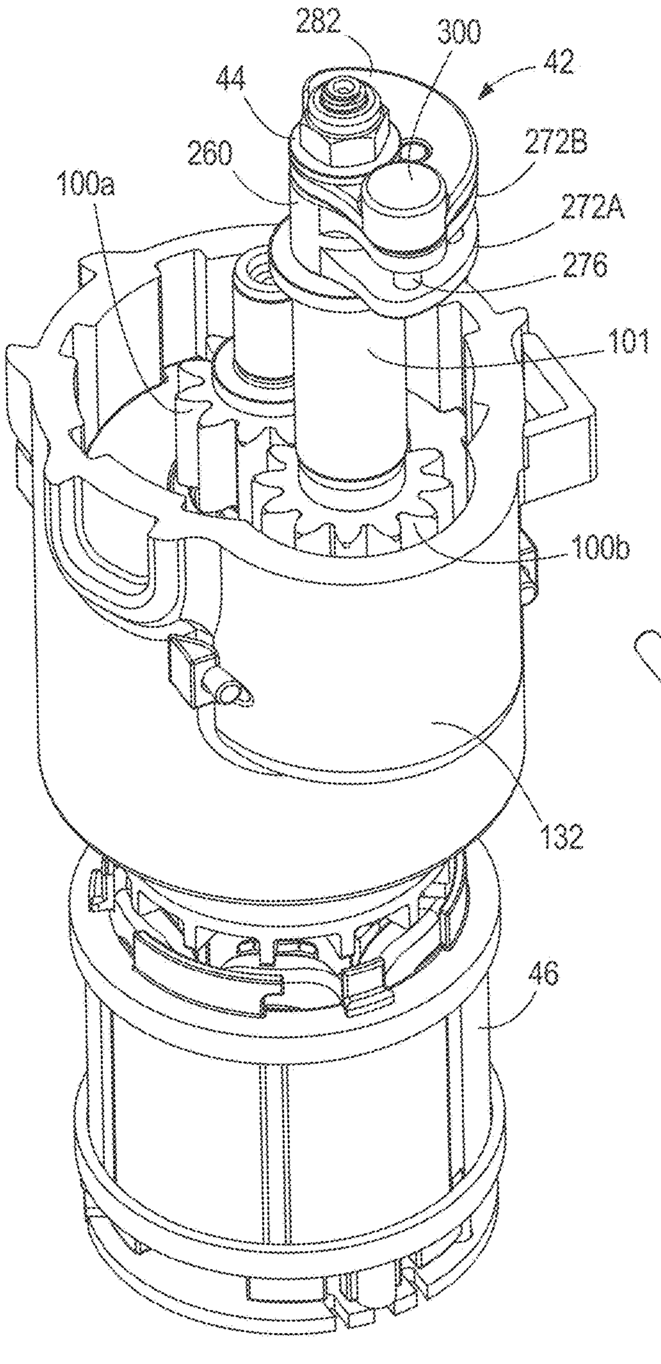
FIG. 12 is a perspective view of the transmission of FIG. 11 showing a transmission housing.
Figure 13:
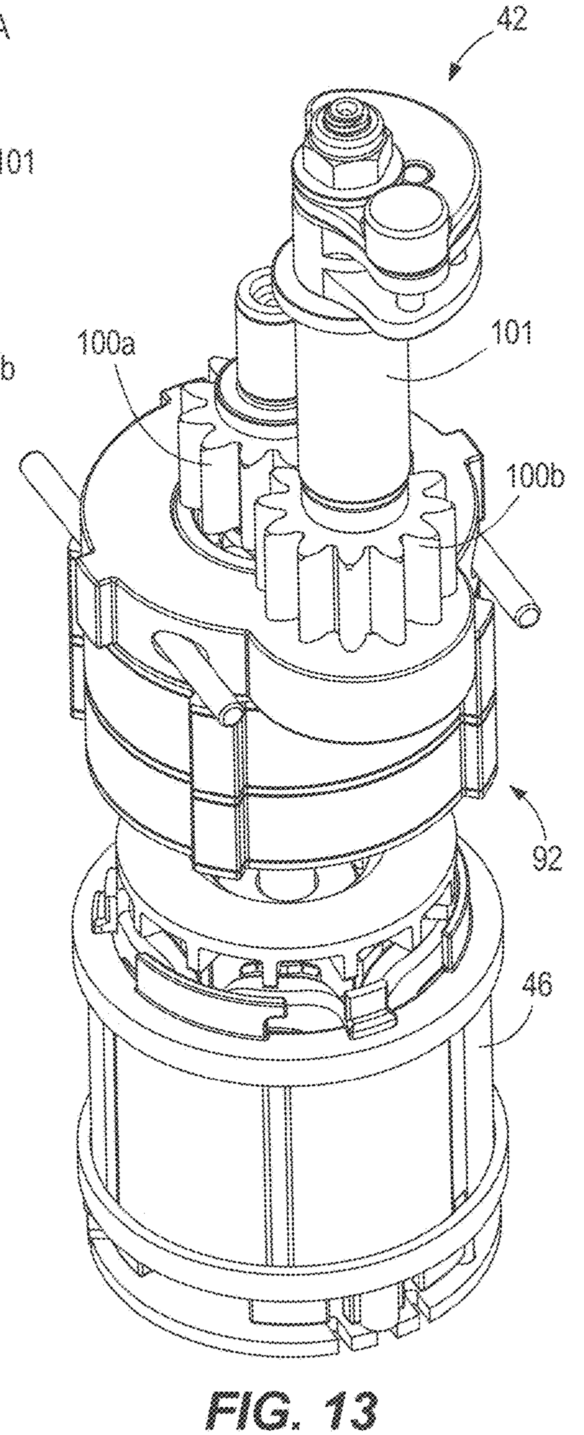
FIG. 13 is a perspective view of the transmission of FIG. 11 with the transmission housing of FIG. 12 removed.

With reference to FIGS. 4, 6, and 12, the lifter 44, which is a component of the lifting assembly 42, is coupled for co-rotation with the second output shaft 101 which, in turn, is driven by engagement of the driven gear 100*b* with drive gear 100*a*. The lifter 44 includes a hub 260 having an opening 264. An end of the second output shaft 101 extends through the opening 264 and is rotatably secured to the lifter 44. With continued reference to FIG. 12, the hub 260 is formed by two plates 272A, 272B and includes multiple drive pins 276 extending between the plates 272A, 272B. The illustrated lifter 44 includes four drive pins 276; however, in other embodiments, the lifter 44 may include three or more drive pins 276. The drive pins 276 are sequentially engageable with the driver blade 26 to raise the driver blade 26 from the driven position to the ready position.

The illustrated lifter 44 further includes a disk member 282 positioned adjacent the lower plate 272B (FIG. 12). The disk member 282 is coupled for co-rotation with the second output shaft 101 and the lifter 44. The disk member 282 supports a magnet 300. Specifically, the disk member 282 may be considered a retaining member for inhibiting axial movement of the drive pins 276 and the magnet 300 relative to the second output shaft axis 101'.

The driver 10 further includes a sensor (e.g., a Hall-effect sensor, not shown) positioned at a location proximate the lifter 44. As discussed above, the lifter 44 includes the magnet 300 supported by the disk member 282. The sensor and the magnet 300 are configured to indicate a position of the driver blade 26 (i.e., the ready position).

With reference to FIG. 4, and as noted above, the driver blade 26 includes lifting teeth 26*a* along the length thereof, and the respective drive pins 276 are engageable with the lifting teeth 26*a* when returning the driver blade 26 from the driven position to the ready position. The illustrated driver blade 26 includes eight lifting teeth 26*a* such that two revolutions of the lifter 44 moves the driver blade 26 from the driven position to the ready position.

As discussed above, the driver blade 26 further includes axially spaced latching teeth or projections 26*b* formed on an extending from the driver blade 26 opposite the lifting teeth 26*a*.

As stated above, the lifting assembly 42 moves the driver blade 26 from the driven position to the ready position. The sensor determines the position of the driver blade 26 in response to detecting the magnet 300, which is positioned on the disk member 282 and which co-rotates with the lifter 44. Specifically, the magnet 300 is aligned with the sensor when the driver blade 26 reaches the ready position, deactivating the motor 46 in response to an output signal from the sensor to stop the driver blade 26 at the ready position.

With reference to FIG. 6A, the driver 10 further includes a latch assembly 350 having a pawl or latch 354 for selectively holding the driver blade 26 in the ready position, and a mechanical latch actuator (not shown) for releasing the latch 354 from the driver blade 26. In other words, the latch assembly 350 is moveable between a latched state in which the driver blade 26 is held in the ready position against a biasing force (i.e., the pressurized gas in the storage chamber cylinder 30), and a released state in which the driver blade 26 is permitted to be driven by the biasing force from the ready position to the driven position. The latch 354 is pivotably supported by a shaft 362 on the nosepiece assembly 400 about a latch axis 366 (which is into the page as shown in FIG. 6A). The latch axis 366 is parallel to the second output shaft axis 101' of the second output shaft 101.

With reference to FIG. 6A, the latch assembly 350 is positioned proximate the side of the driver blade 26. Furthermore, the latch 354 is configured to rotate, via movement of the latch actuator, about the shaft 362 relative to the latch axis 366 such that a tip of the latch 354 is configured to engage a stop surface (not shown) of the nosepiece assembly 400 when the latch 354 is moved toward the driver blade 26.

The latch 354 is moveable between a latched position (coinciding with the latched state of the latch assembly 350) in which the latch 354 is engaged with one of the latching teeth 26*b* on the driver blade 26 for holding the driver blade 26 in the ready position against the biasing force of the compressed gas, and a released position (coinciding with the released state of the latch assembly 350) in which the driver blade 26 is permitted to be driven by the biasing force of the compressed gas from the ready position to the driven position.

The operation of a firing cycle for the driver 10 is illustrated and detailed below. With reference to FIGS. 7B, prior to initiation a firing cycle, the driver blade 26 is held in the ready position with the piston 22 near top dead center within the cylinder 18. More specifically, the first drive pin 276' (FIG. 6A) on the lifter 44 is engaged with a lower-most tooth 26*a'* (FIG. 6A) of the axially spaced teeth lifting teeth 26*a* on the driver blade 26, and the rotational position of the lifter 44 is maintained by the one-way clutch mechanism 154. In other words, as previously described, the one-way clutch mechanism 154 prevents the motor 46 from being back-driven by the transmission 92 when the lifter 44 is holding the driver blade 26 in the ready position. Also, in the ready position of the driver blade 26, the latch 354 is engageable with a lower-most tooth 26*b'* (FIG. 6A) on the driver blade 26, though not necessarily in contact with and functioning to maintain the driver blade 26 in the ready position. Rather, the latch 354 at this instant provides a safety function to prevent the driver blade 26 from inadvertently firing should the one-way clutch mechanism 154 fail.

Upon the trigger 48 being pulled to initiate a firing cycle, the latch actuator pivots the latch 354 from the latched position to the release position, thereby repositioning the latch 354 so that it is no longer engageable with the latching teeth 26*b* (defining the released state of the latch assembly 350). At about the same time, the motor 46 is activated to rotate the first output shaft 96 and the lifter 44 in a counter-clockwise direction from the frame of reference of FIG. 6A, thereby displacing the driver blade 26 upward past the ready position a slight amount before the lower-most tooth 26*a*' on the driver blade 26 slips off the drive pin 276' (at the TDC position of the driver blade 26). Thereafter, the piston 22 and the driver blade 26 are thrust downward toward the driven position (FIG. 7A) by the expanding gas in the cylinder 18 and storage chamber cylinder 30. As the driver blade 26 is displaced toward the driven position, the motor 46 remains activated to continue counter-clockwise rotation of the lifter 44.

With reference to FIG. 6A, upon a fastener being driven into a workpiece, the piston 22 impacts the bumper 60 to quickly decelerate the piston 22 and the driver blade 26, eventually stopping the piston 22 in the driven or bottom dead center position.

Shortly after the driver blade 26 reaches the driven position, a first of the drive pins 276 on the lifter 44 engages one of the lifting teeth 26*a* on the driver blade 26 and continued counter-clockwise rotation of the lifter 44 raises the driver blade 26 and the piston 22 toward the ready position. Shortly thereafter and prior to the lifter 44 making one complete rotation, the latch actuator permits the latch 354 to re-engage the driver blade 26 and ratchet around the latching teeth 26*b* as upward displacement of the driver blade 26 continues (defining the latched state of the latch assembly 350).

After one complete rotation of the lifter 44 occurs, the latch 354 maintains the driver blade 26 in an intermediate position between the driven position and the ready position while the lifter 44 continues counter-clockwise rotation (from the frame of reference of FIG. 4) until the first drive pin 276' re-engages another of the lifting teeth 26*a* on the driver blade 26. Continued rotation of the lifter 44 raises the driver blade 26 to the ready position, which is detected by the sensor as described above.

With reference to FIGS. 2A-2C and 17-23B, the driver 10 further includes a nosepiece assembly 400 positioned at an end of the magazine 14.

The magazine 14 includes a magazine body 404 configured to receive the fasteners to be driven into the workpiece by the powered fastener driver. The magazine body 404 (FIG. 1) has a first end 408 and a second end 412 opposite the first end 408. The magazine body 404 further includes a first side 416 and a second side 420 (FIGS. 17-18) opposite the first side 416, and a bottom side 424 and a top side 428 extending between the first and second sides 416, 420, respectively.

Figure 2A:
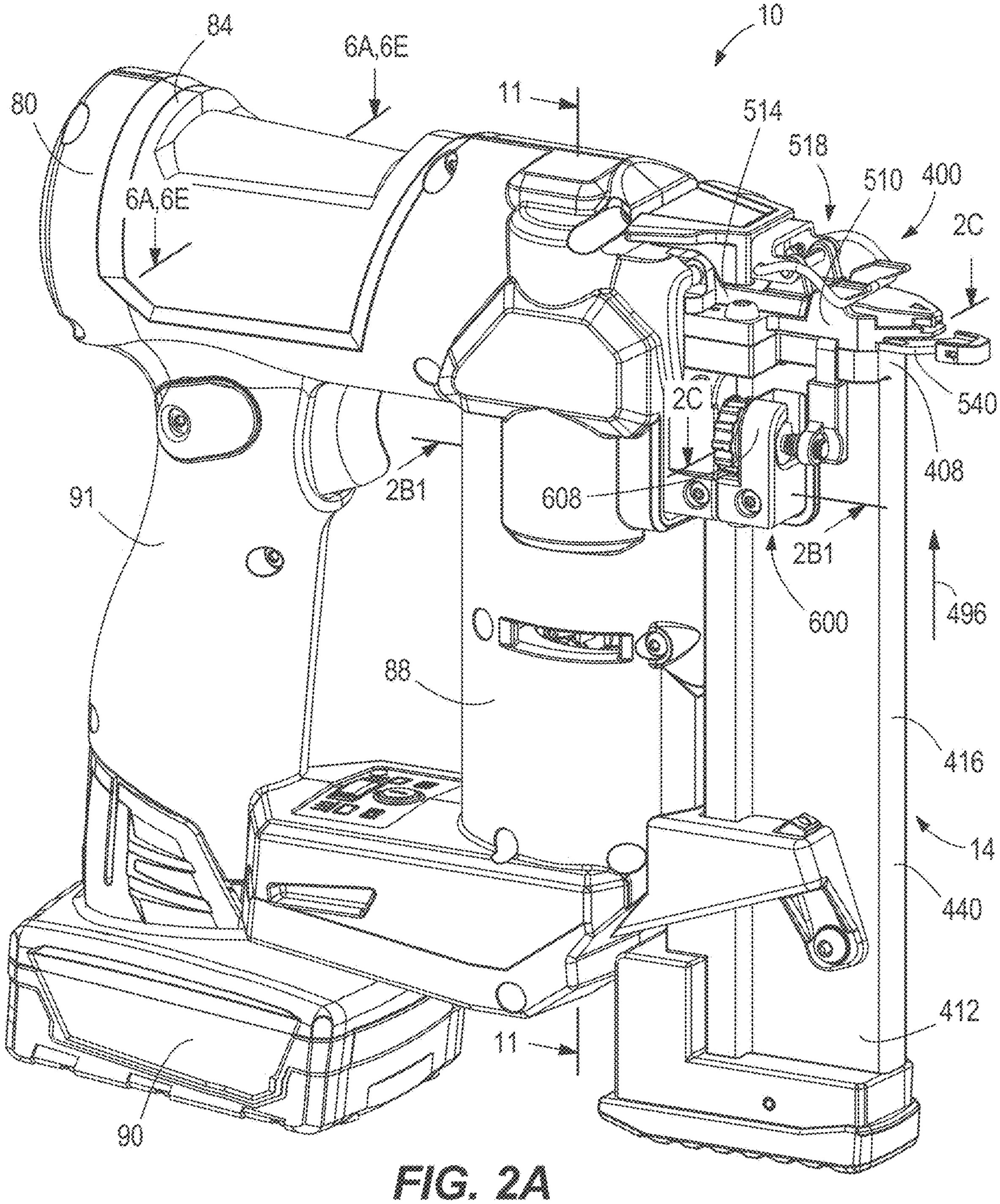
FIG. 2A is another perspective view of the gas spring-powered fastener driver of FIG. 1.
Figure 2C:
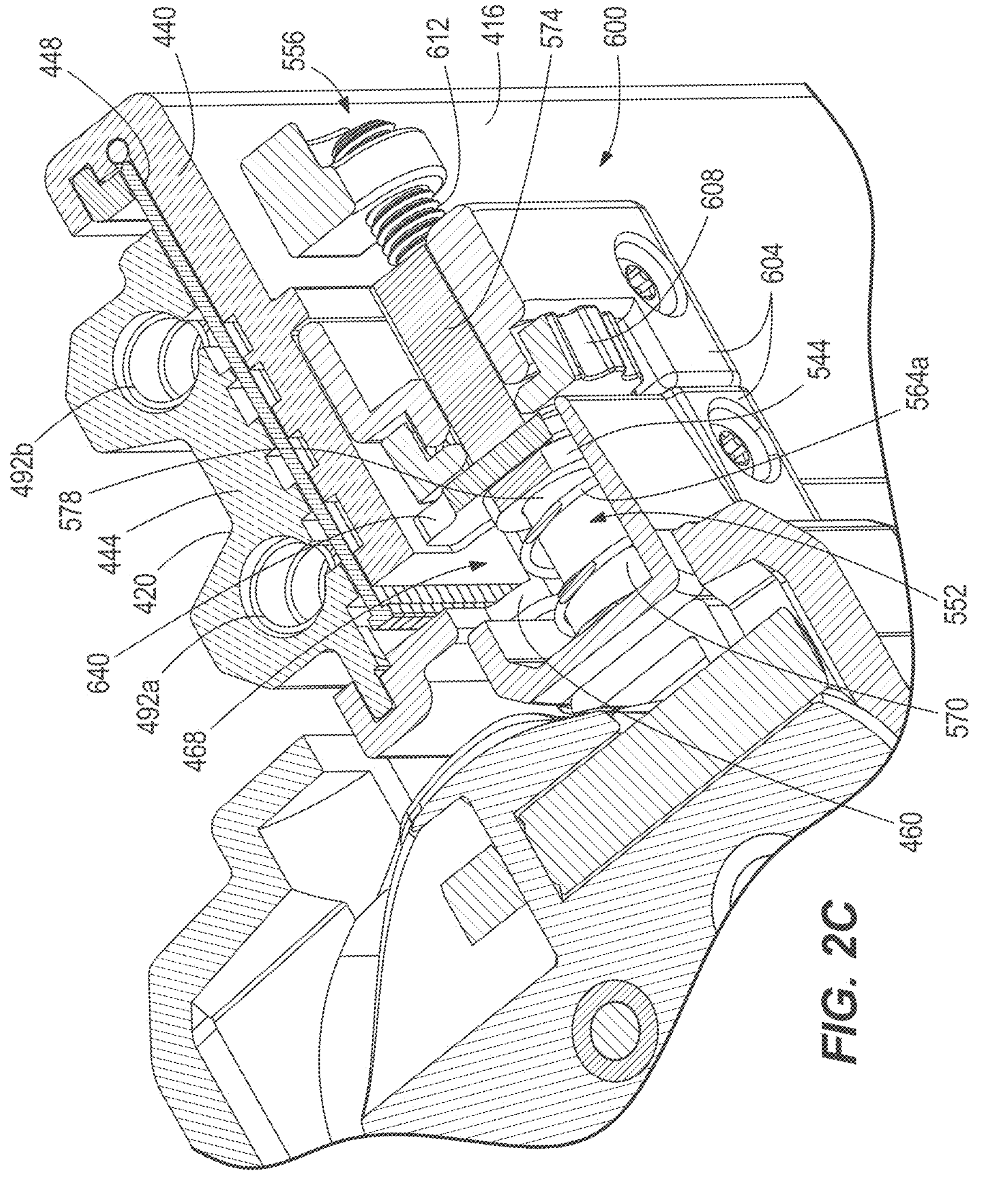
FIG. 2C is a cross-sectional view of the gas spring-powered fastener driver of FIG. 1 along line 2C-2C of FIG. 2A.
Figure 17:
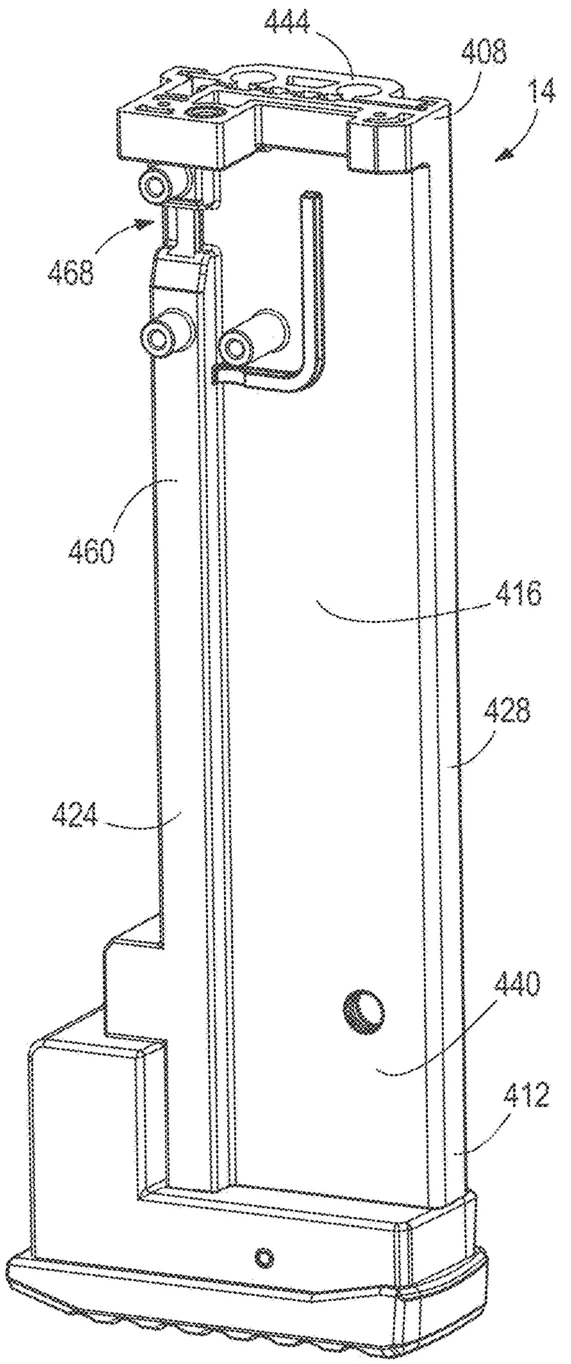
FIG. 17 is a perspective view of the magazine of FIG. 1.
Figure 18:
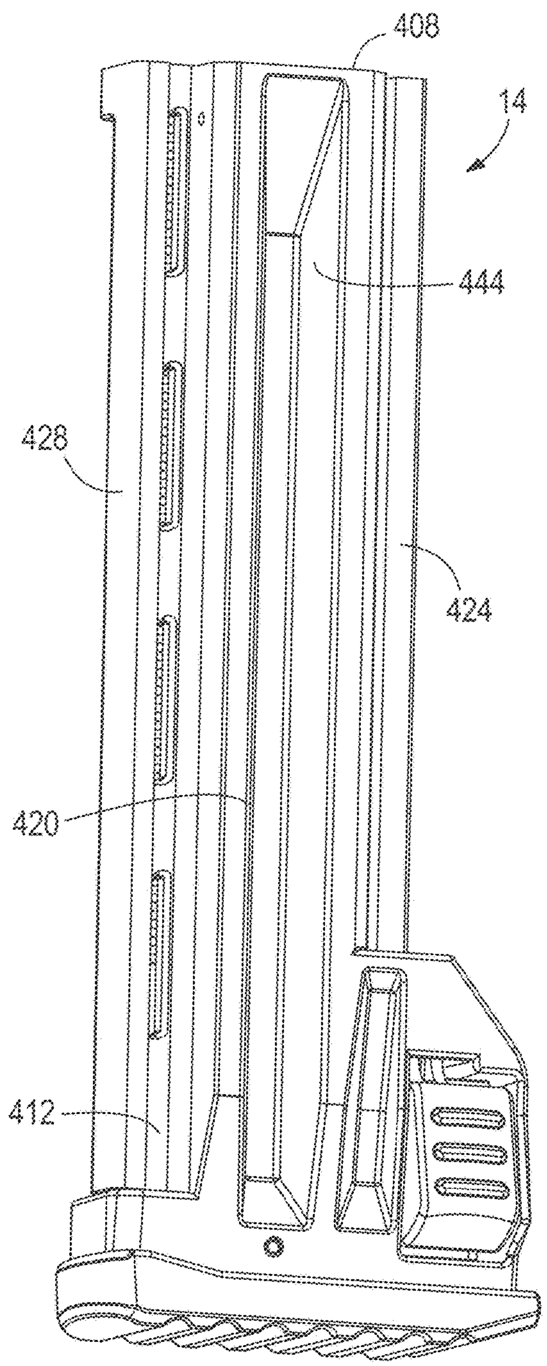
FIG. 18 is another perspective view of the magazine of FIG. 1.

As shown in FIGS. 2C, 17, 18, the illustrated magazine body 404 is formed by a base portion 440 and a cover portion 444. In particular, the cover portion 444 is slidably coupled to the base portion 440. Additionally, the base portion 440 and the cover portion 444 cooperatively define a fastener channel 448 (FIG. 2C) extending from the first end 408 to proximate the second end 412 of the magazine body 404. The fastener channel 448 is configured to receive the fasteners.

Figure 19:
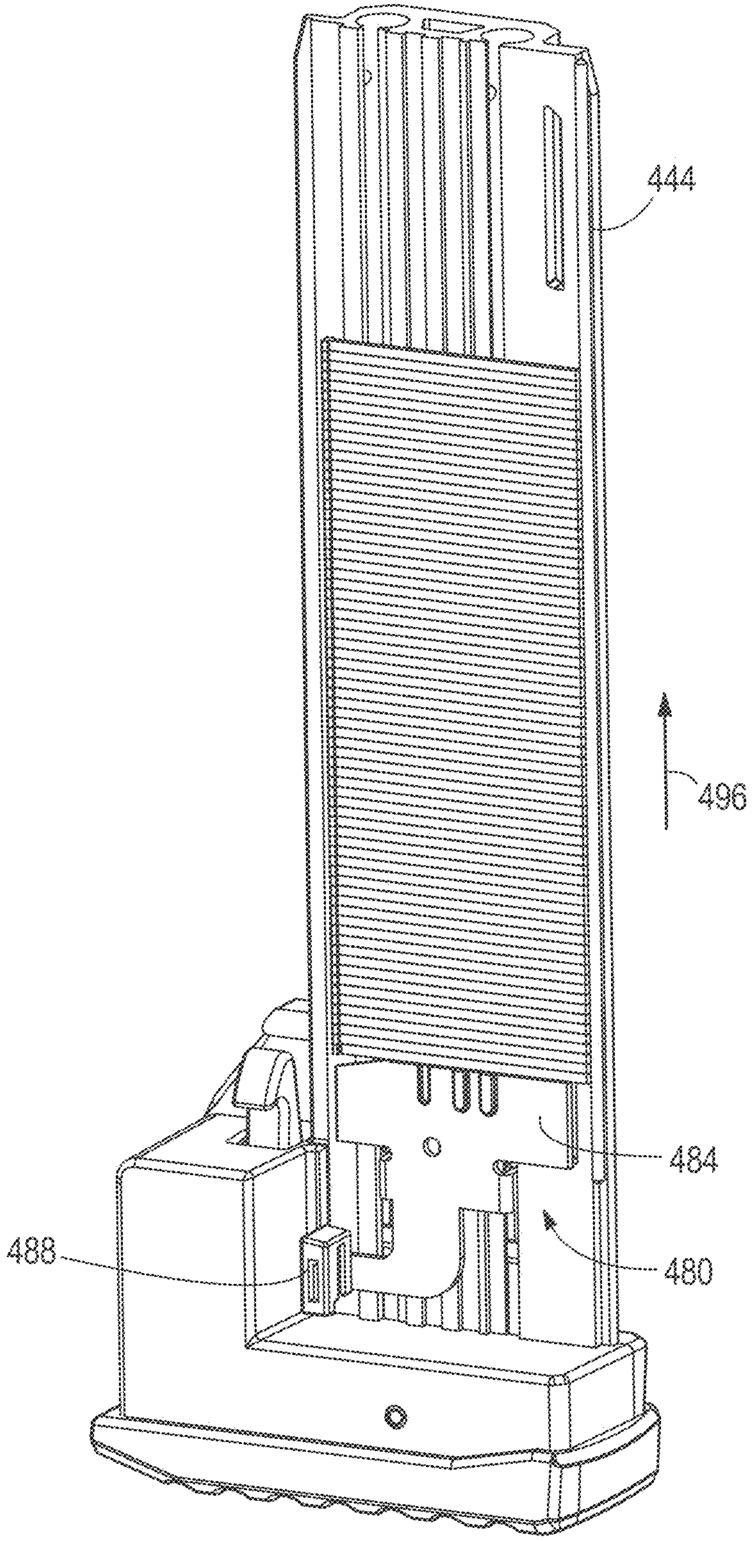
FIG. 19 is a perspective view of the magazine of FIG. 1 with a portion removed, illustrating a pusher assembly.
Figure 20A:
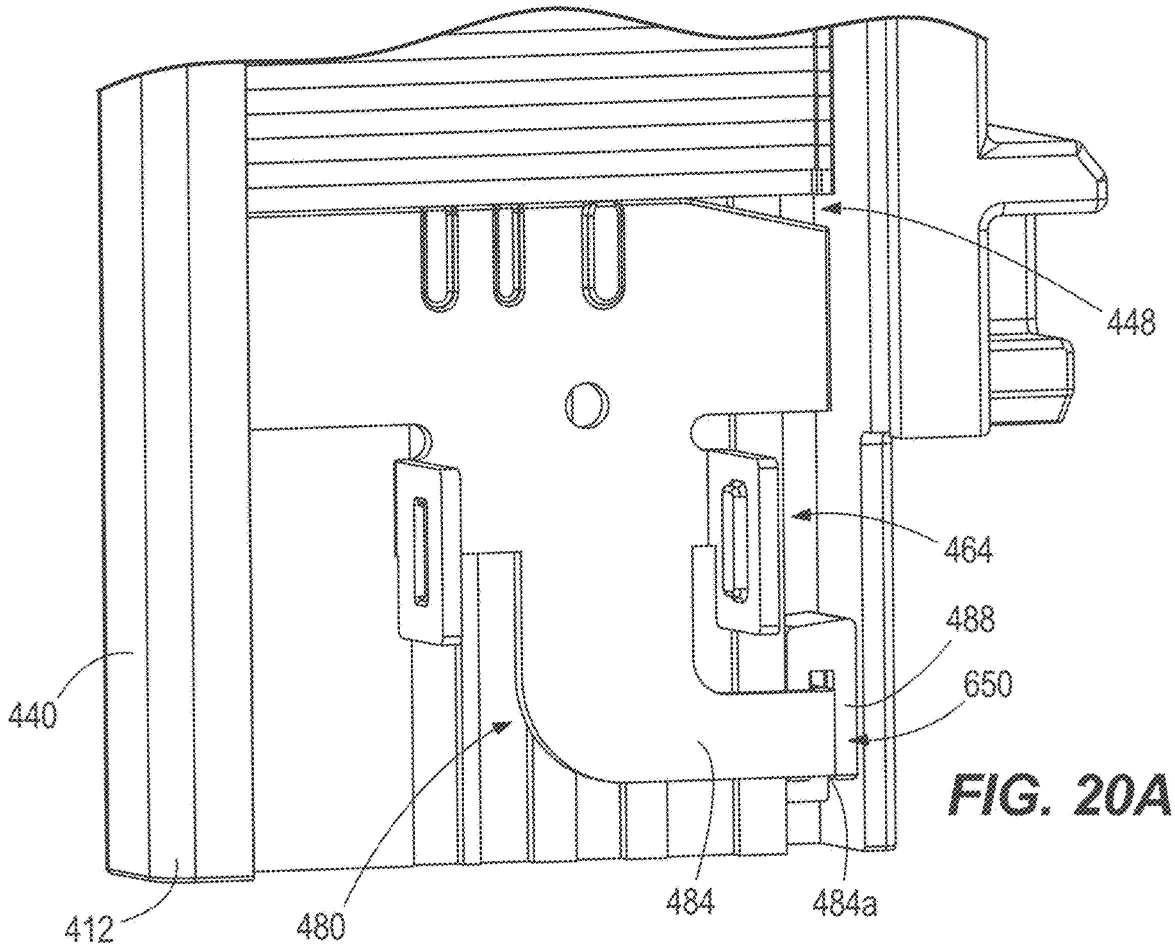
FIG. 20A is a detailed perspective view of the pusher assembly of FIG. 19.

With particular reference to FIGS. 2C and 17-20, the first side 416 of the magazine body 404 includes a projection 460 (FIG. 17) defining a recess 464 (FIG. 20). The recess 464 extends along the first side 416 from proximate the second end 412 toward the first end 408. More specifically, the recess 464 extends parallel to and in connection with the fastener channel 448. The first side 416 further defines an opening or window 468 (FIGS. 2C and 17) in connection with the recess 464 proximate the first end 408 of the magazine body 404.

Figure 20B:
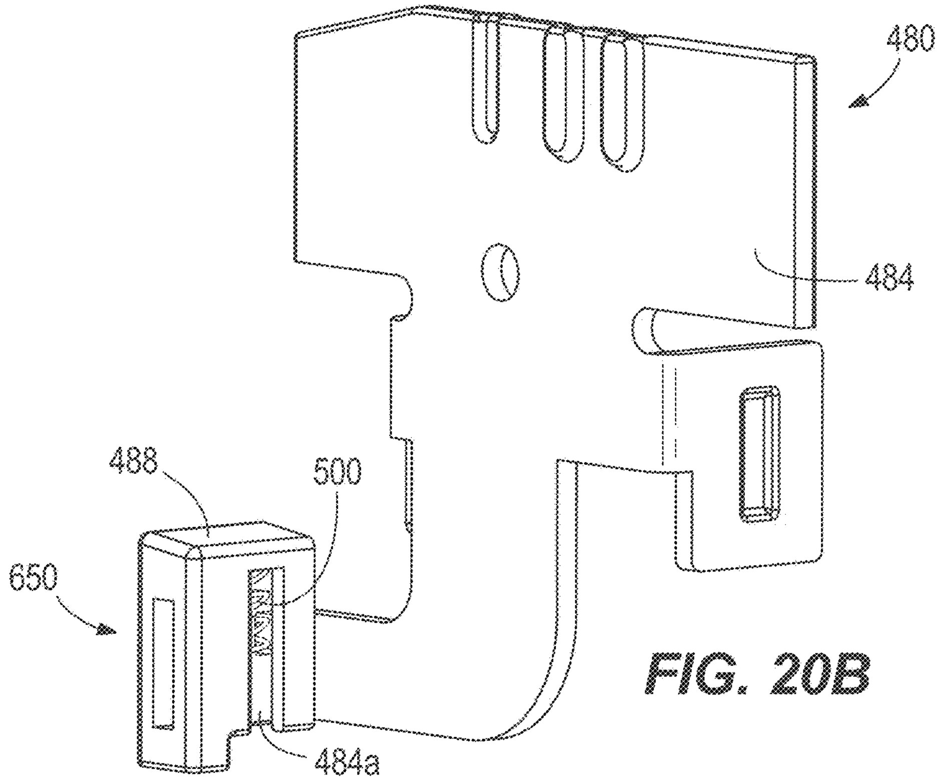
FIG. 20B is another detailed perspective view of the pusher assembly of FIG. 19.
Figure 21A:
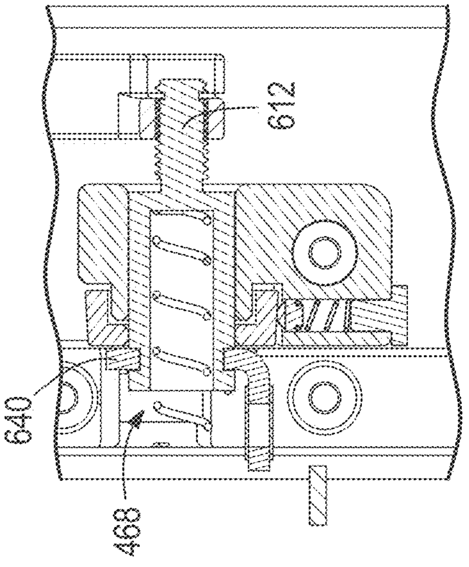
FIG. 21A illustrates a dry-fire lockout link coupled to the workpiece contact assembly of FIG. 1 in a first position when there is greater than a predetermined number of fasteners within the magazine.
Figure 21B:
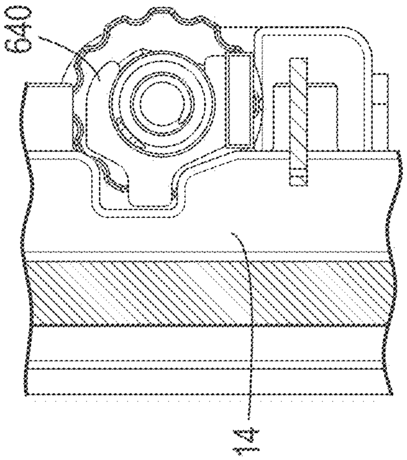
FIG. 21B illustrates the dry-fire lockout link coupled to the workpiece contact assembly of FIG. 1 in the first position when there is greater than a predetermined number of fasteners within the magazine.
Figure 21C:
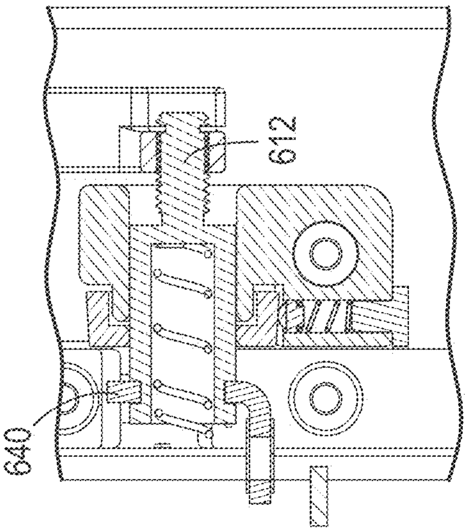
FIG. 21C illustrates the dry-fire lockout link coupled to the workpiece contact assembly of FIG. 1 in a second position when there is greater than a predetermined number of fasteners within the magazine.
Figure 21D:
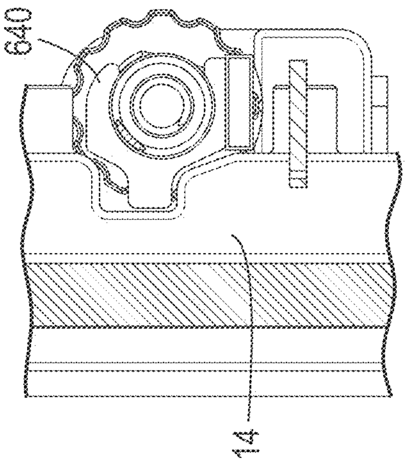
FIG. 21D illustrates the dry-fire lockout link coupled to the workpiece contact assembly of FIG. 1 in the second position when there is greater than a predetermined number of fasteners within the magazine.
Figure 21E:
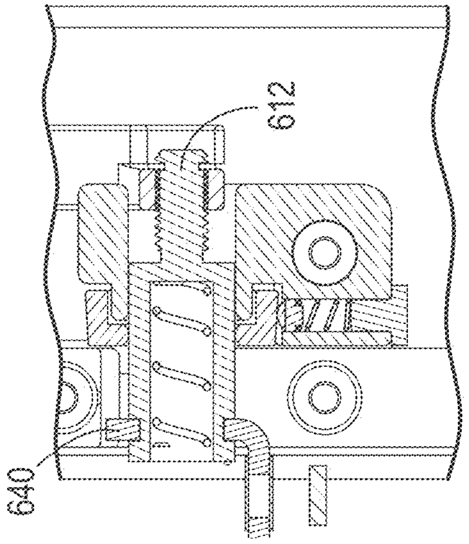
FIG. 21E illustrates the dry-fire lockout link coupled to the workpiece contact assembly of FIG. 1 in a third position when there is greater than a predetermined number of fasteners within the magazine.
Figure 21F:
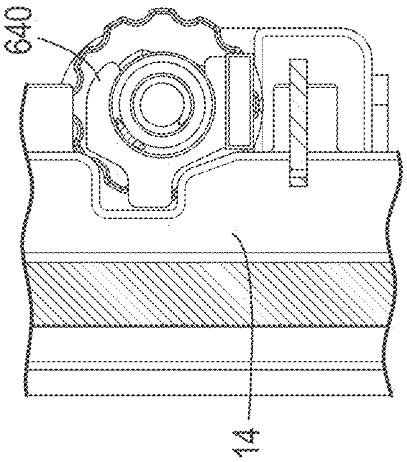
FIG. 21F illustrates the dry-fire lockout link coupled to the workpiece contact assembly of FIG. 1 in the third position when there is greater than a predetermined number of fasteners within the magazine.
Figure 22E:
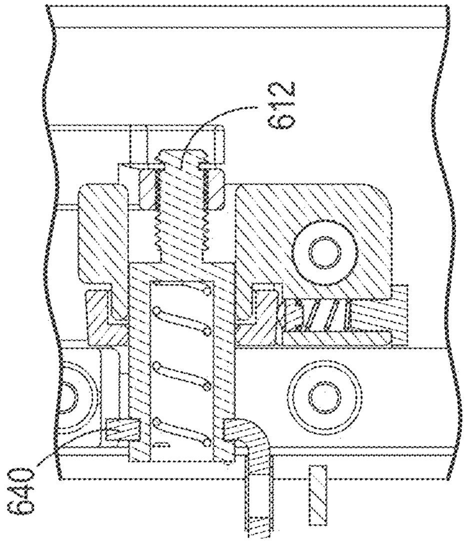
FIG. 22E illustrates the dry-fire lockout link coupled to the workpiece contact assembly of FIG. 1 in a third position when there is one more than the predetermined number of fasteners within the magazine.
Figure 22F:
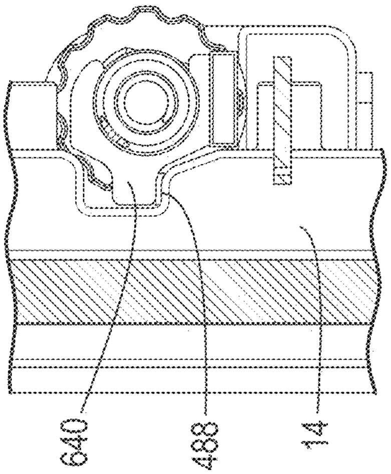
FIG. 22F illustrates the dry-fire lockout link coupled to the workpiece contact assembly of FIG. 1 in the third position when there is one more than the predetermined number of fasteners within the magazine.
Figure 22C:
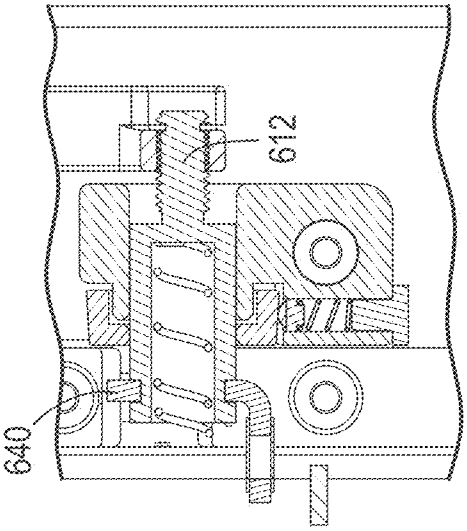
FIG. 22C illustrates the dry-fire lockout link coupled to the workpiece contact assembly of FIG. 1 in a second position when there is one more than the predetermined number of fasteners within the magazine.
Figure 22D:
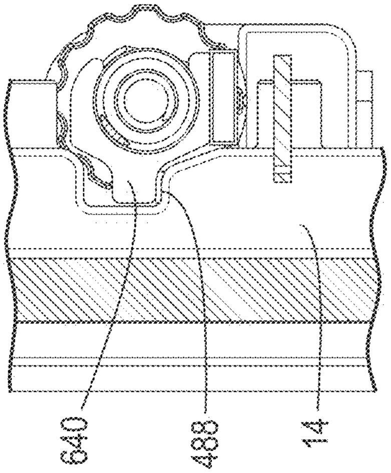
FIG. 22D illustrates the dry-fire lockout link coupled to the workpiece contact assembly of FIG. 1 in the second position when there is one more than the predetermined number of fasteners within the magazine.
Figure 22A:
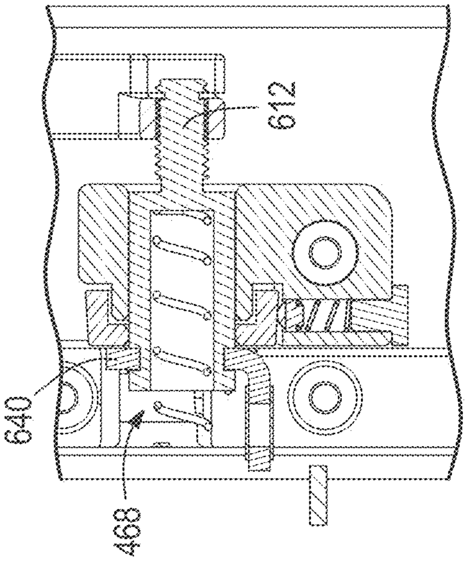
FIG. 22A illustrates a dry-fire lockout link coupled to the workpiece contact assembly of FIG. 1 in a first position when there is one more than the predetermined number of fasteners within the magazine.
Figure 22B:
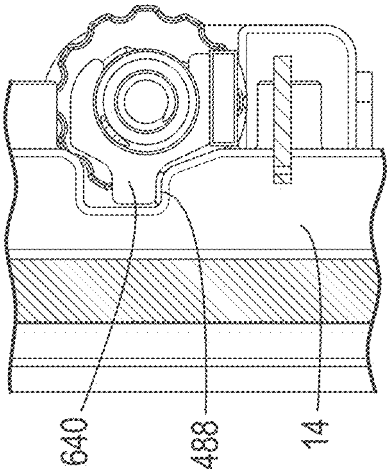
FIG. 22B illustrates the dry-fire lockout link coupled to the workpiece contact assembly of FIG. 1 in the first position when there is one more than the predetermined number of fasteners within the magazine.

With reference to FIGS. 19-23B, the magazine 14 further includes a pusher assembly 480 positioned within the fastener channel 448 of the magazine body 404. The pusher assembly 480 is slidably coupled to the magazine 14 and configured to bias the fasteners in the magazine 14 toward the nosepiece assembly 400. As shown in FIGS. 19-20B, the illustrated pusher assembly 480 includes a first portion or pusher body 484 and a second portion or dry-fire lockout member 488 movably coupled to the pusher body 484. The magazine 14 includes first springs 492*a*, 492*b* (FIG. 2C) configured to exert a biasing force on the pusher assembly 480 for moving the pusher assembly 480 in the direction of arrow 496 (FIG. 2A and FIG. 18). Furthermore, the dry-fire lockout member 488 is movably coupled to the pusher body 484 (e.g., an extension 484*a* of the pusher body 484) by a second spring 500 (FIG. 20B). As such, the pusher body 484 of the pusher assembly 480 may selectively move relative to the dry-fire lockout member 488. The biasing force of the second spring 500 is independent of the biasing force of the first springs 492*a*, 492*b*. The pusher assembly 480 is movable in a first state, in which the pusher body 484 and the dry-fire lockout member 488 move together in unison in the direction of arrow 496 and a second state in which relative movement between the pusher body 484 and the dry-fire lockout member 488 has occurred, as further discussed below.

With reference to FIGS. 2A-2B2, the nosepiece assembly 400 is positioned at the first end 408 of the magazine body 404. The nosepiece assembly 400 generally includes a first, base portion 510 coupled to the first end 408 of the magazine body 404 and a second, cover portion 514 coupled to the base portion 510. The base portion 510 of the nosepiece assembly 400 is fixed to the magazine body 404. The cover portion 514 of the nosepiece assembly 400 substantially covers the base portion 510. In the illustrated embodiment, the cover portion 514 is pivotally coupled to the base portion 510 by a latch mechanism 518. The nosepiece assembly 400 cooperatively defines a firing channel 522 (only a portion of which is shown in FIG. 6A) extending along the driving axis 38. The firing channel 522 is in communication with the fastener channel 448 of the magazine body 404 (e.g., by an opening 526 in the base portion 510) for receiving a fastener from the magazine body 404. The nosepiece assembly 400 further has a distal end 530 at one end of the firing channel 522 (FIG. 6A). The driver blade 26 is received in the firing channel 522 for driving the fastener from the firing channel 522, out the distal end 530 of the nosepiece assembly 400, and into a workpiece, as discussed above.

With reference to FIGS. 2A, 2B1, and 2B2, the driver 10 includes a workpiece contact assembly 540 extending along one side of the nosepiece assembly 400. The workpiece contact assembly 540 includes a first end 544 (FIGS. 2B1, 2B2, and 2C) and a second, opposite end 548 that is engageable with a workpiece during a firing operation. The workpiece contact assembly 540 includes a plurality of sections 552, 556 in which each section 552, 556 is formed by a plurality of interconnected segments. A pair of springs 564*a*, 564*b* (FIGS. 2B1, 2B2, and 2C) are configured to bias the workpiece contact assembly 540 toward an extended position. The workpiece contact assembly 540 is configured to be moved from the extended position toward a retracted position when the workpiece contact assembly 540 is pressed against a workpiece.

A first section 552 of the workpiece contact assembly 540 is positioned closer to the top side 428 of the magazine body 404 rather than the bottom side 424. The first section 552 includes the first end 544 of the workpiece contact assembly 540. The first section 552 further includes an arm 574 including a bore 578. The arm 574 is movable relative to the housing 80. Specifically, a stationary post 570 is coupled to the housing 80 and is movably received in the bore 578 of the arm 574. The first spring 564*a* surrounds the post 570 and is seated between the housing 80 and a first end of the arm 574. The second spring 564*b* is positioned within the bore 578 and is seated between a distal end of the post 570 and a bottom surface of the bore 578. The arm 574 includes a screw portion 612. The second section 556 includes the second end 548 that is configured to engage a workpiece. The first and second sections 552, 556 are coupled together by a depth of drive adjustment mechanism 600, which adjusts the effective length of the workpiece contact assembly 540. In particular, the screw portion 612 couples the first section 552 to the second section 556.

With reference to FIGS. 2B and 2C, the depth of drive adjustment mechanism 600 includes a support member 604, an adjustment knob 608, and the screw portion 612. In the illustrated embodiment, the pair of springs 564*a*, 564*b* are supported, at least in part, by the depth of drive adjustment mechanism 600. The springs 564*a*, 564*b* achieve the same spring force on the workpiece contact assembly 540 with a reduced throw (distance between extended and retracted positions), compared to a single spring. In the illustrated embodiment, the springs 564*a*, 564*b* have different stiffnesses, but in other embodiments the stiffnesses may be the same. In the illustrated embodiment, there are two springs 564*a*, 564*b*, but in other embodiments, there may be more than two springs having the same or different stiffnesses. The support member 604 at least partially supports the arm 574. The adjustment knob 608 is rotatably supported upon the arm 574. As noted above, the screw portion 612 extends between the first section 552 and the second section 556 of the workpiece contact assembly 540. One end of the second section 556 is threadably coupled to the screw portion 612. Furthermore, the arm 574, and therefore the screw portion 612, are coupled for co-rotation with the adjustment knob 608. Accordingly, the screw portion 612 and the adjustment knob 608 are rotatably supported by the arm 574. Rotation of the adjustment knob 608 axially threads the second section 556 along the screw portion 612 for adjusting a protruding length of the workpiece contact assembly 540 relative to the distal end 530 of the nosepiece assembly 400. More specifically, rotation of the adjustment knob 608 moves the second section 556 relative to the first section 552 for adjusting an effective length of the workpiece contact assembly 540. As such, the adjustment knob 608 may be termed as an actuator. As shown in FIGS. 2B1 and 2B2, a detent mechanism 610 is engageable with the adjustment knob 608 to prevent the adjustment knob 608 from freely rotating. As shown, the adjustment knob 608 includes a plurality of grooves or recesses 608*a* in an outer surface thereof. The detent mechanism 610 includes a ball 610*a* (e.g., detent) and a spring 610*b* (e.g., biasing mechanism) that biases the ball 610*a* into one of the grooves 608*a* of the adjustment knob 608.

The depth of drive adjustment mechanism 600 adjusts the depth to which a fastener is driven into the workpiece. In particular, the depth of drive adjustment mechanism 600 adjusts the length that the workpiece contact assembly 540 protrudes relative to the distal end 530 of the nosepiece assembly 400, thereby changing the distance between the distal end 530 of the nosepiece assembly 400 and the workpiece contact assembly 540 in the extended position. In other words, the depth of drive adjustment mechanism 600 adjusts how far the workpiece contact assembly 540 extends past the nosepiece assembly 400 for abutting with a workpiece. The larger the gap between the distal end 530 of the nosepiece assembly 400 and the workpiece, the shallower the depth a fastener will be driven into the workpiece. As such, the position of the workpiece contact assembly 540 with respect to the nosepiece assembly 400 is adjustable to adjust the depth to which a fastener is driven. In the illustrated embodiment, the spring 610*b* biases the ball 610*a* into the one of the grooves 608*a* of the adjustment knob 608 to retain the adjustment knob 608, and therefore the workpiece contact assembly 400 at the selected depth. When the user wants to adjust the depth, the user rotates the adjustment knob 608 against the bias of the spring 610*b* to selectively rotate the adjustment knob 608.

As shown in FIGS. 2B-2C and FIGS. 21A-23B, the workpiece contact assembly 540 further includes an engagement portion 640 (e.g., a dry-fire lockout link). In the illustrated embodiment, the first section 552 includes the dry-fire lockout link 640. The dry-fire lockout link 640 is positioned at the substantially the first end 544 of the workpiece contact assembly 540 and specifically is coupled to the arm 574.

Figure 23B:
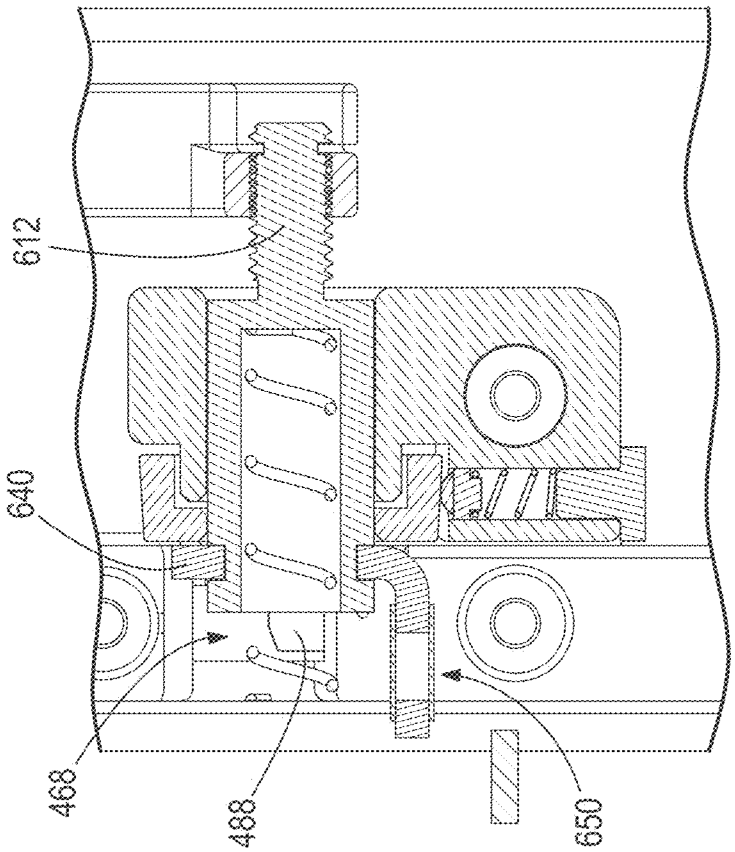
FIG. 23B illustrates the dry-fire lockout link coupled to the workpiece contact assembly of FIG. 1 in a second position when there are the predetermined number of fasteners within the magazine.
Figure 23A:
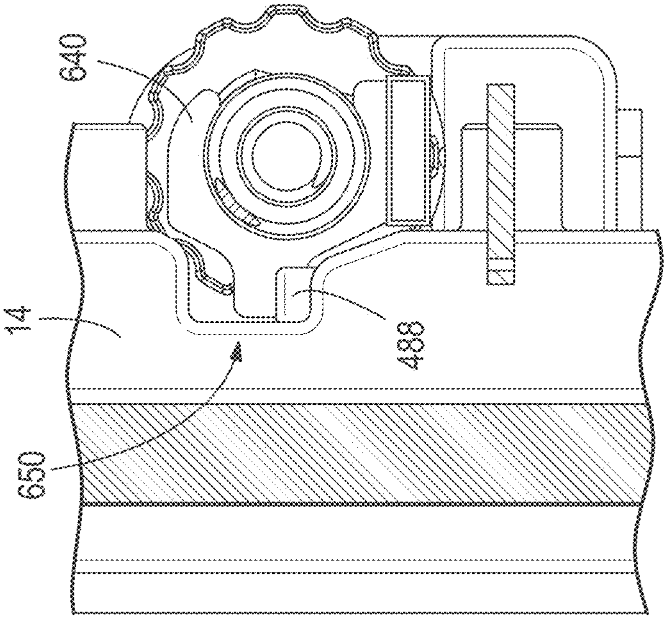
FIG. 23A illustrates a dry-fire lockout link coupled to the workpiece contact assembly of FIG. 1 in a first position when there are the predetermined number of fasteners within the magazine.

With reference to FIGS. 19-23B, the powered fastener driver 10 further includes a dry-fire lockout assembly 650 (FIGS. 23A and 23B). The dry-fire lockout assembly 650 prevents the powered fastener driver 10 from operating when the number of fasteners remaining in the magazine 14 drops below a predetermined value. The dry-fire lockout assembly 650 includes the dry-fire lockout member 488 of the pusher assembly 480, and the dry-fire lockout link 640. The extension 484*a* of the pusher body 484 and the dry-fire lockout member 488 are positioned within and movable (e.g., slideable) within the fastener channel 448 of the magazine 14. The dry-fire lockout member 488 is selectively received in the opening 468 of the magazine 14. The dry-fire lockout member 488 is configured to prevent movement of the workpiece contact assembly 540 when a predetermined number of fasteners (e.g., 0, 1, 2, 4 etc.) remain in the magazine 14.

The dry-fire lockout member 488 is movable between a first, non-blocking or bypass position (e.g., FIGS. 21A-22E), and a second, blocking position (FIGS. 23A-23B). When the dry-fire lockout member 488 does not extend through the opening 468 of the magazine 14, the dry-fire lockout member 488 is in the bypass position such that the dry-fire lockout link 640 and the workpiece contact assembly 540 can move from the extended position toward the retracted position (FIGS. 21A-22E). That is, in the bypass position, the dry-fire lockout link 640 is configured to slide past the opening 468 (and depending on the number of fasteners remining, the dry-fire lockout member 488) in response to movement toward the retracted position. Also, when the dry-fire lockout member 488 is in the bypass position, the pusher assembly 480 is in the first state such that the pusher body 484 and the dry-fire lockout member 488 move together in unison. When the dry-fire lockout member 488 is in the blocking position, at least a portion of the dry-fire lockout member 488 (FIG. 23A-23B) protrudes through the opening 468 of the magazine 14 where it interferes with retraction of dry-fire lockout link 640 and therefore inhibits movement of the workpiece contact assembly 540 from the extended position toward the retracted position.

In operation, as shown in FIGS. 21A-21E, with more than the predetermined number of fasteners in the magazine 14, the pusher body and the dry-fire lockout member 484, 488 of the pusher assembly 480 move in unison, biased by the first springs 492*a*, 492*b*, in the direction of arrow 496 the magazine 14 in an incremental manner as consecutive fasteners from the collated fastener strip are discharged from the nosepiece assembly 400. At this time, the opening 468 remains open and the dry-fire lockout member 488 remains in the bypass position.

In a scenario when the predetermined number of fasteners remaining in the magazine 14 is reached, the dry-fire lockout member 488 is in the blocking position and therefore engages the dry-fire lockout link 640, as shown in FIGS. 23A-23B. Upon reaching the blocking position, the dry-fire lockout member 488 blocks the dry-fire lockout link 640 of the workpiece contact assembly 540, and retraction of the workpiece contact assembly 540 is inhibited to prevent further activation of the powered fastener driver 10. In this scenario, movement of the pusher assembly 480 may remain in the first state (i.e., with the pusher body and the dry-fire lockout member 484, 488 moving together in unison) up until the dry-fire lockout member 488 is moved to the blocking position.

However, in a scenario in which fasteners of specific sizes (e.g., fasteners having a specific shank length or diameter) are placed in the magazine 14, when the predetermined number of fasteners remaining in the magazine 14 is reached, the skewed collated fastener strip within the fastener channel may only permit the dry-fire lockout member 488 to partially move toward the blocking position. That is, as shown in FIGS. 22A-22E, the dry-fire lockout member 488 may be in an intermediate position between the bypass position and the blocking position, in which the dry-fire lockout member 488 only slightly blocks the dry-fire lockout link 640 and the workpiece contact assembly 540. In addition, other tolerances associated with the specific sized fasteners used, and/or associated with the driver 10 as a whole, may cause the dry-fire lockout member 488 to move to the intermediate position. In this case, for example, when the number of fasteners remaining is one greater than the predetermined number of fasteners, the dry-fire lockout member 488 is in the intermediate position. With the dry-fire lockout member 488 in the intermediate position, it is possible for the workpiece contact assembly 540 (and specifically, the dry-fire lockout link 640) to nominally engage the dry-fire lockout member 488 during retraction and move the dry-fire lockout member 488 toward the bypass position, permitting continued retraction of the workpiece contact assembly 540 to enable a final fastener firing cycle. When the dry-fire lockout member 488 is moved from the intermediate position to the bypass position, the pusher assembly 480 transitions from the first state to the second state, in which relative movement between the pusher body 484 and the dry-fire lockout member 488 has occurred.

That is, the dry-fire lockout link 640 can nominally engage the dry-fire lockout member 488 during retraction to move the dry-fire lockout member 488 toward the bypass position against the bias of the spring second spring 500 and therefore slide past the dry-fire lockout member 488 to the retracted position to enable the final firing cycle. In this scenario, movement of the pusher assembly 480 transitions from the first state to the second state (i.e., the dry-fire lockout member 488 having moved relative to the pusher body 484 against the bias of the second spring 500) after the final fastener firing cycle. Once the final fastener firing cycle is complete and the number of predetermined fasteners remain, the dry-fire lockout member 488 protrudes through the opening 468 and blocks the dry-fire lockout link 640, and therefore the workpiece contact assembly 540, from moving into the retracted position to prevent a "dry-fire" cycle in which a driver blade 26 is driven from the TDC position to the BDC position without a fastener in the firing channel 522.

When the predetermined number of fasteners remain and the dry-fire lockout member 488 is located in the blocking position, the dry-fire lockout member 488 cannot transition from the first state to the second state. Accordingly, when the predetermined number of nails remain, the dry-fire lockout member 488 is positioned so that there is sufficient engagement between the dry-fire lockout member 488 and the dry-fire lockout link 640, and therefore the workpiece contact assembly 540 to prevent a "dry-fire" cycle.

Another configuration of a gas spring-powered fastener driver 1010 is shown in FIGS. 24-34. The gas spring-powered fastener driver 1010 is similar to the gas spring-powered fastener driver 10 discussed above. Therefore, like structure will be designated with like reference numerals plus "1000" and only the differences will be described herein. As shown in FIG. 26A, in the illustrated embodiment, the cylinder 1030 is defined in part by an inner frame 1031 (e.g., inner housing). Specifically, the inner frame 1031 is coupled to the cylinder 1030. The inner frame 1031 also supports, at least in part, the lifting assembly 1042 and the motor 1046. The inner frame 1031 is constructed from a material that is more robust than plastic, such as metal. Accordingly, the housing 1080 is formed from a plastic material. The inner frame 1031 is thus made from a harder, stronger, more robust material (e.g., metal) than the material (e.g., plastic) used to form the housing 1080. The inner frame 1031 also includes elastomeric members 1031' (e.g., bumpers) coupled to a bottom surface thereof. In the illustrated embodiment, there are two bumpers 1031', but in other embodiments, there may be a single damper or more than two dampers. In the illustrated embodiment, the bumpers 1031' are formed from rubber, but other materials capable of absorbing impact and reducing peak forces may be used in other embodiments. Additionally, the motor 1046 and first output shaft (not shown in this embodiment) thereof is offset relative to the driving axis 1038. Also, the lifter 1044 and the second output shaft (not shown in this embodiment) thereof are also offset relative to the driving axis 1038. In the embodiment of FIGS. 24-34, the axis (not shown) of the first output shaft of the motor 1046 and the axis (not shown) of the second output shaft of the lifter 1044 are coincident with one another. In the illustrated embodiment, the motor 1046 is a brushless direct current motor (BLDC motor). Any motor of any embodiment herein may also be a BLDC motor.

Figure 26A:
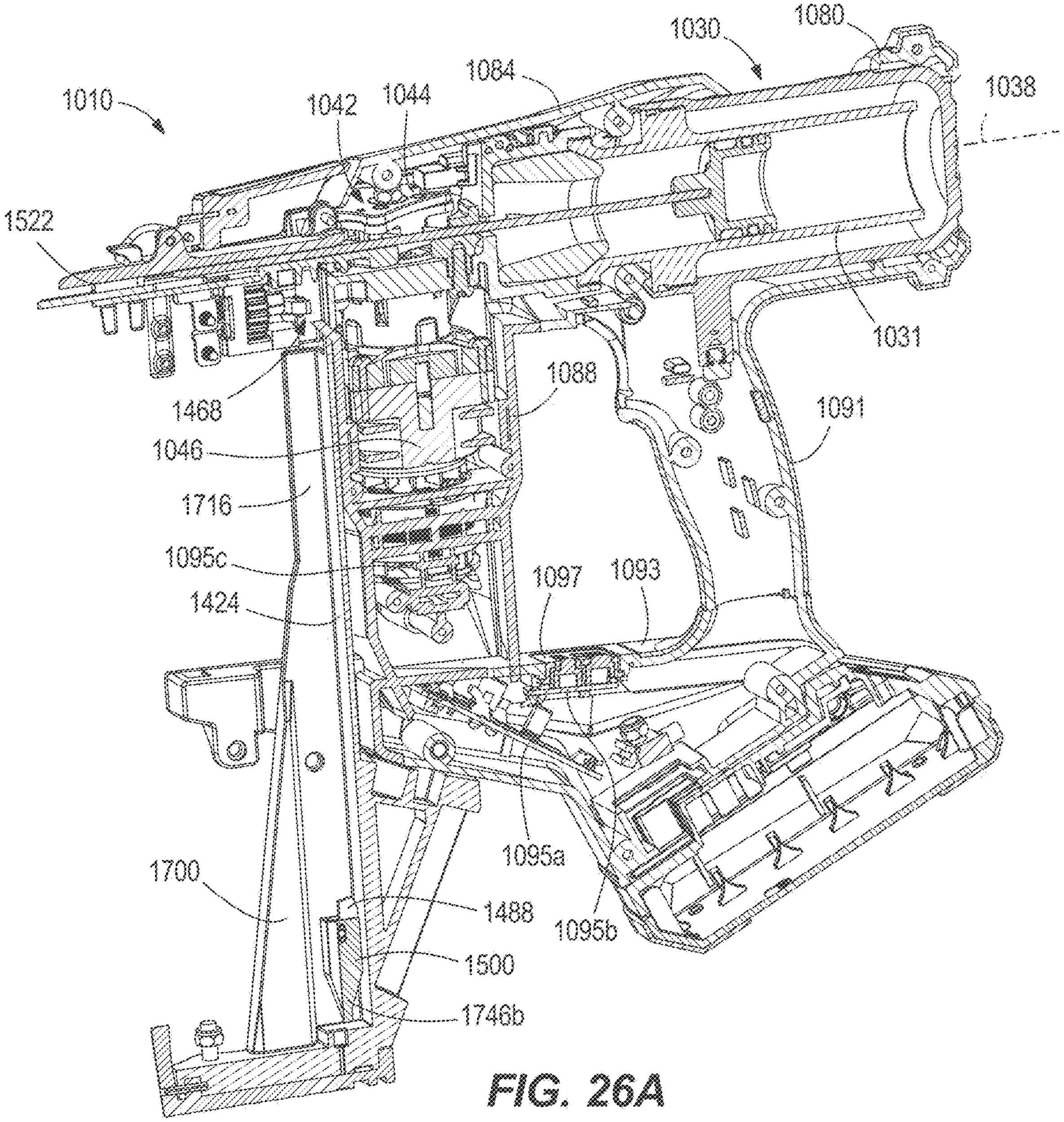
FIG. 26A is a cross-sectional view of the gas spring-powered fastener driver of FIG. 24 along the line 26-26 of FIG. 25 and illustrating a printed circuit board configuration according to an embodiment of the invention.

As shown in FIG. 26A, the printed circuit board configuration is similar to that described above with respect to FIGS. 3 and 4. That is, as shown in FIG. 26A, the driver 1010 includes the first or power printed circuit board 1095*a*, the second or user interface printed circuit board 1095*b*, and the third or motor printed circuit board 1095*c*.

Figure 25:
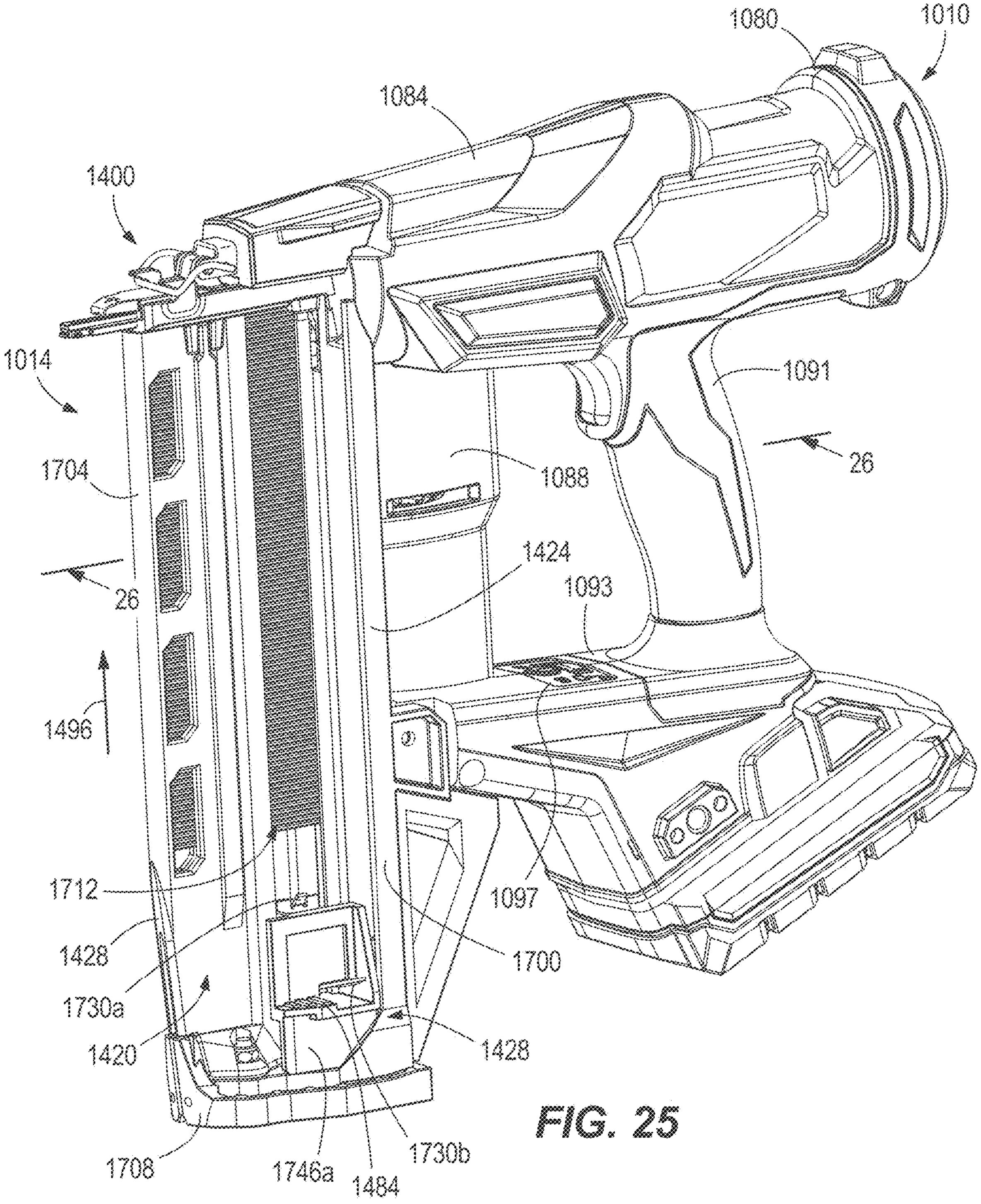
FIG. 25 is another perspective view of the gas spring-powered fastener driver of FIG. 24.
Figure 26B:
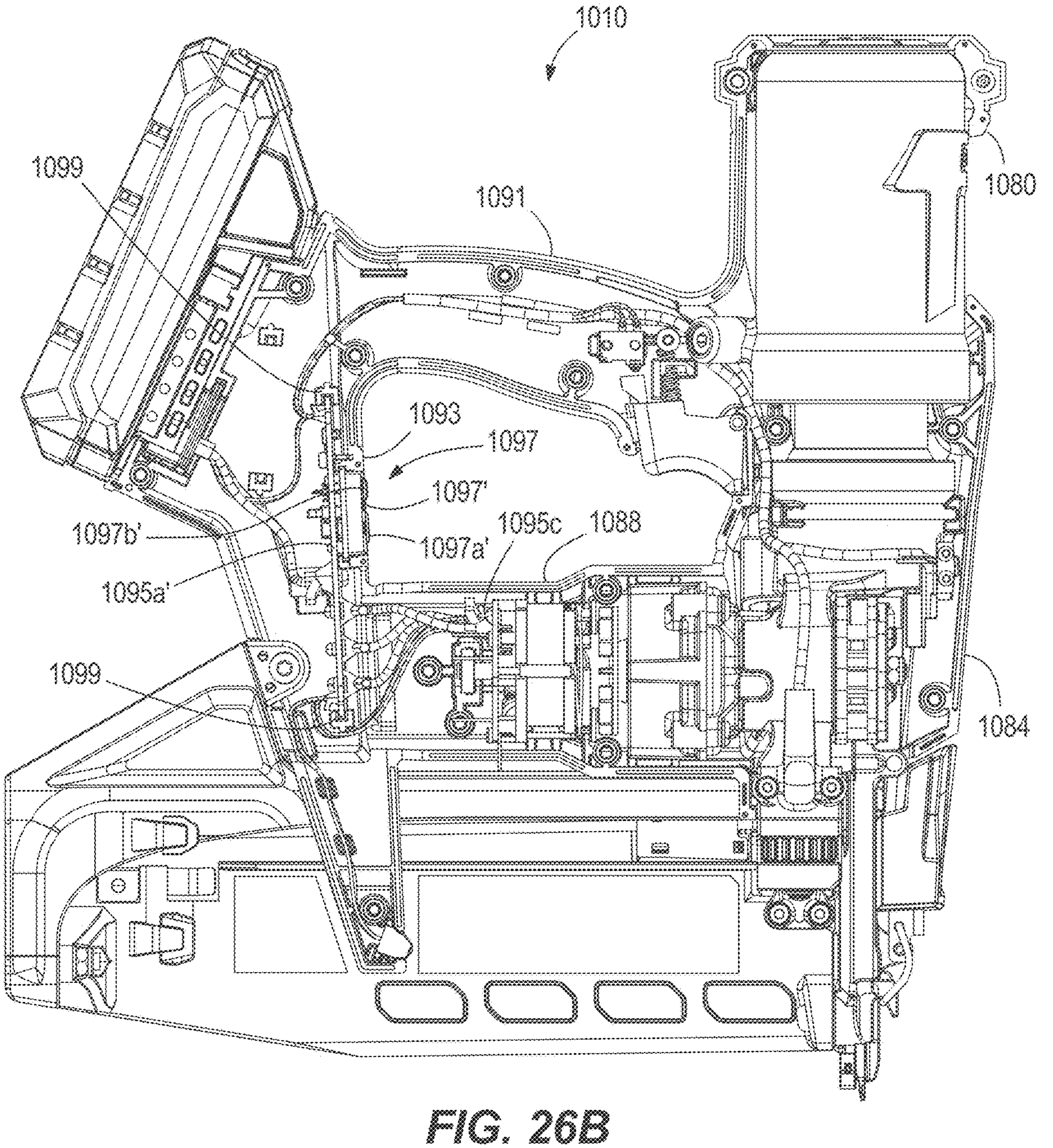
FIG. 26B is a cross-sectional view of the gas spring-powered fastener driver of FIG. 24 along the line 26-26 of FIG. 25 and illustrating a printed circuit board configuration according to another embodiment of the invention.
Figure 27:
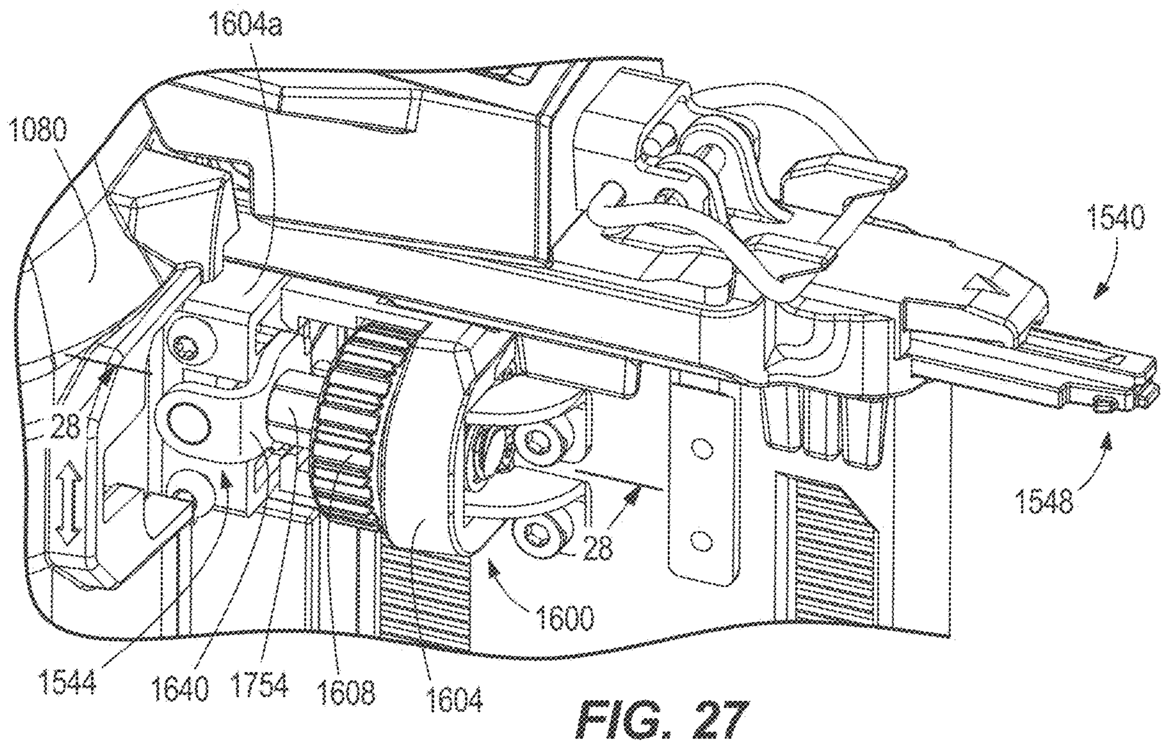
FIG. 27 is a detailed perspective view of the gas spring-powered fastener driver of FIG. 24.
Figure 27A:
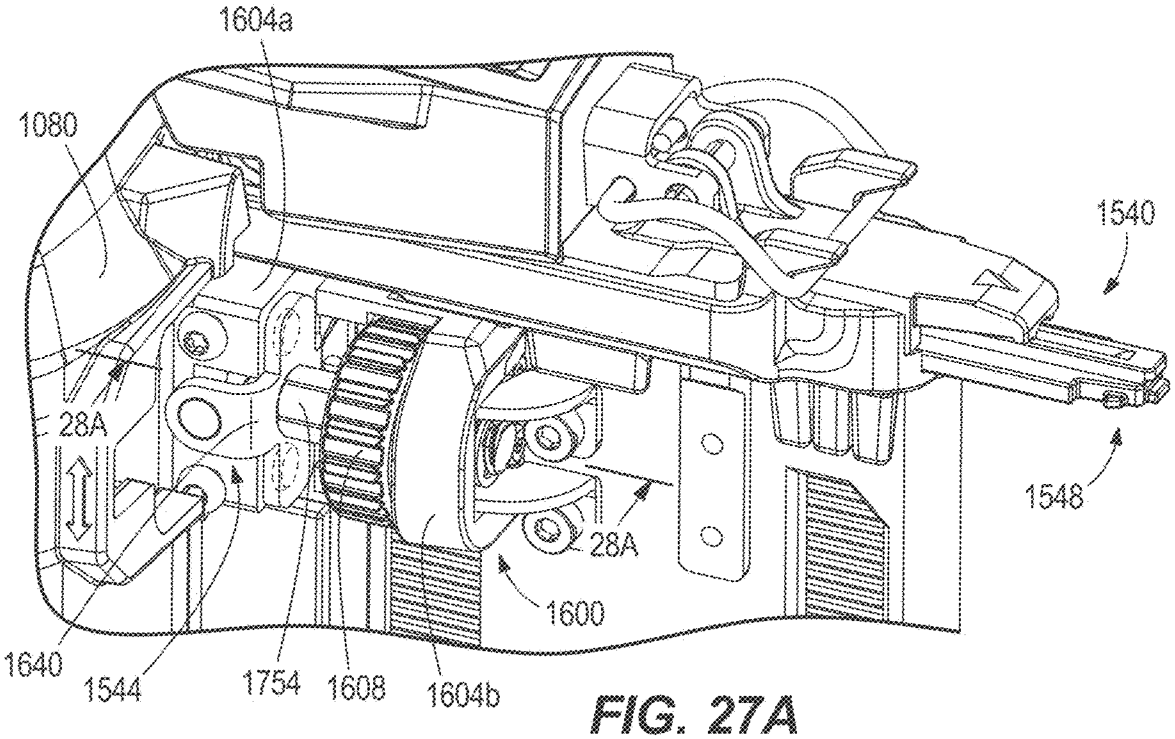
FIG. 27A is a detailed perspective view of a gas spring-powered fastener driver in accordance with another embodiment of the invention, illustrating a bumper on an inner frame.

The gas spring-powered fastener driver 1010 is shown in FIG. 26B and illustrates another printed circuit board configuration. As shown in FIG. 26B, the driver 1010 includes a first printed circuit board 1095_a'_ that is a unified power and control printed circuit board, a user interface 1097, and the motor printed circuit board 1095_c_. As shown in FIG. 25B, the unified power and control printed circuit board 1095_a'_ extends within the housing 1080 and is positioned generally between the drive unit support portion 1088 and the handle portion 1091. As shown, the unified power and control printed circuit board 1095_a'_ extends from the drive unit support portion 1088 at least partially through the connection portion 1093 in a direction toward the handle portion 1091. The unified power and control printed circuit board 1095_a'_ is received within channels 1099 in the housing 1080. The user interface 1097 is accessible via the connection portion 1093. The unified power and control printed circuit board 1095_a'_ is connected to the user interface 1097, which includes a display unit 1097'. The display unit 1097' includes indicators 1097_a'_ (e.g., low battery, overtemperature, etc.) and one or more buttons 1097_b'_ for selecting an operational mode of the driver 1010. The one or more buttons 1097_b'_ of the user interface 1097 are oriented substantially parallel to the unified power and control printed circuit board 1095_a'_ such that the depression of the one or more buttons 1097_b'_ moves the one or more buttons 1097_b'_ toward the unified power and control printed circuit board 1095_a'_. Specifically, depression of one or more buttons 1097_b'_ creates a translational movement of the one or more buttons 1097_b'_ toward the unified power and control printed circuit board 1095_a'_. The translational movement of the one or more buttons 1097_b'_ will cause the one or more buttons 1097_b'_ to activate a switch that is located either within the user interface 1097 itself or on the unified power and control printed circuit board 1095_a'_.

The unified power and control printed circuit board 1095_a'_ may also include an electronic processor (e.g., a microcontroller) for controlling the user interface 1097 and receiving inputs therefrom, and further includes one or more switches (e.g., FETs) for directing electrical current from the battery pack 90 to the motor 1046. The switches are selectively closed in response to control signals received from the electronic processor to direct electrical current from the battery pack 90 to the motor 1046. The motor printed circuit board 1095_c_ includes a rotational speed sensor that provides a motor rotational speed output signal to the electronic processor for controlling the motor 1046. Also, the unified power and control printed circuit board 1095_a'_ can include a fuse (e.g., a surface-mounted fuse, a high-impedance fuse trace, etc.), a power inverter section, a gate driver, a MOSFET, a bus capacitor, a current sense resistor, other peripheral sensor circuitry, and other suitable circuitry.

Figure 36:
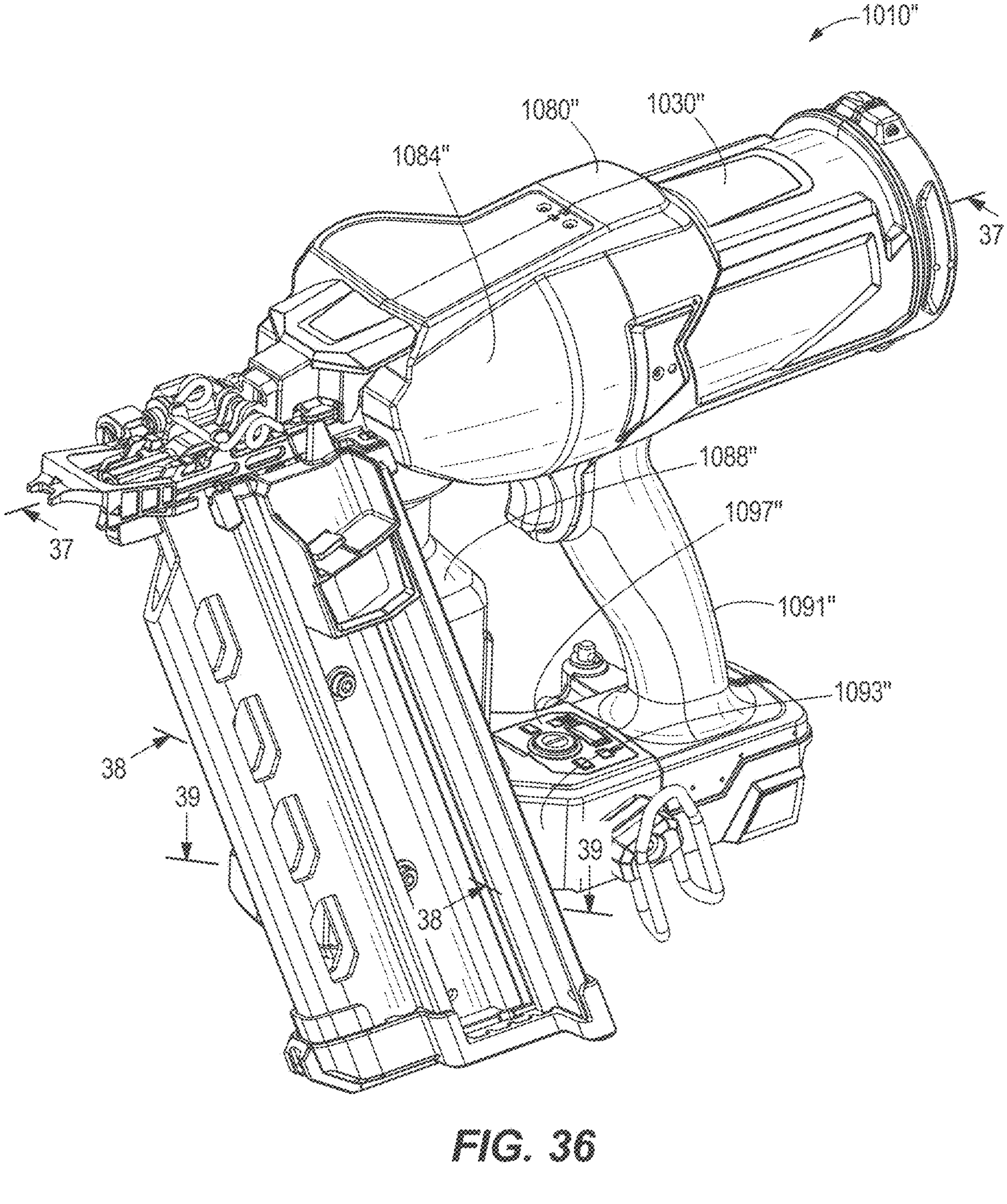
FIG. 36 is a perspective view of a gas spring-powered fastener driver including a magazine and a workpiece contact assembly in accordance with another embodiment of the invention.
Figure 37:
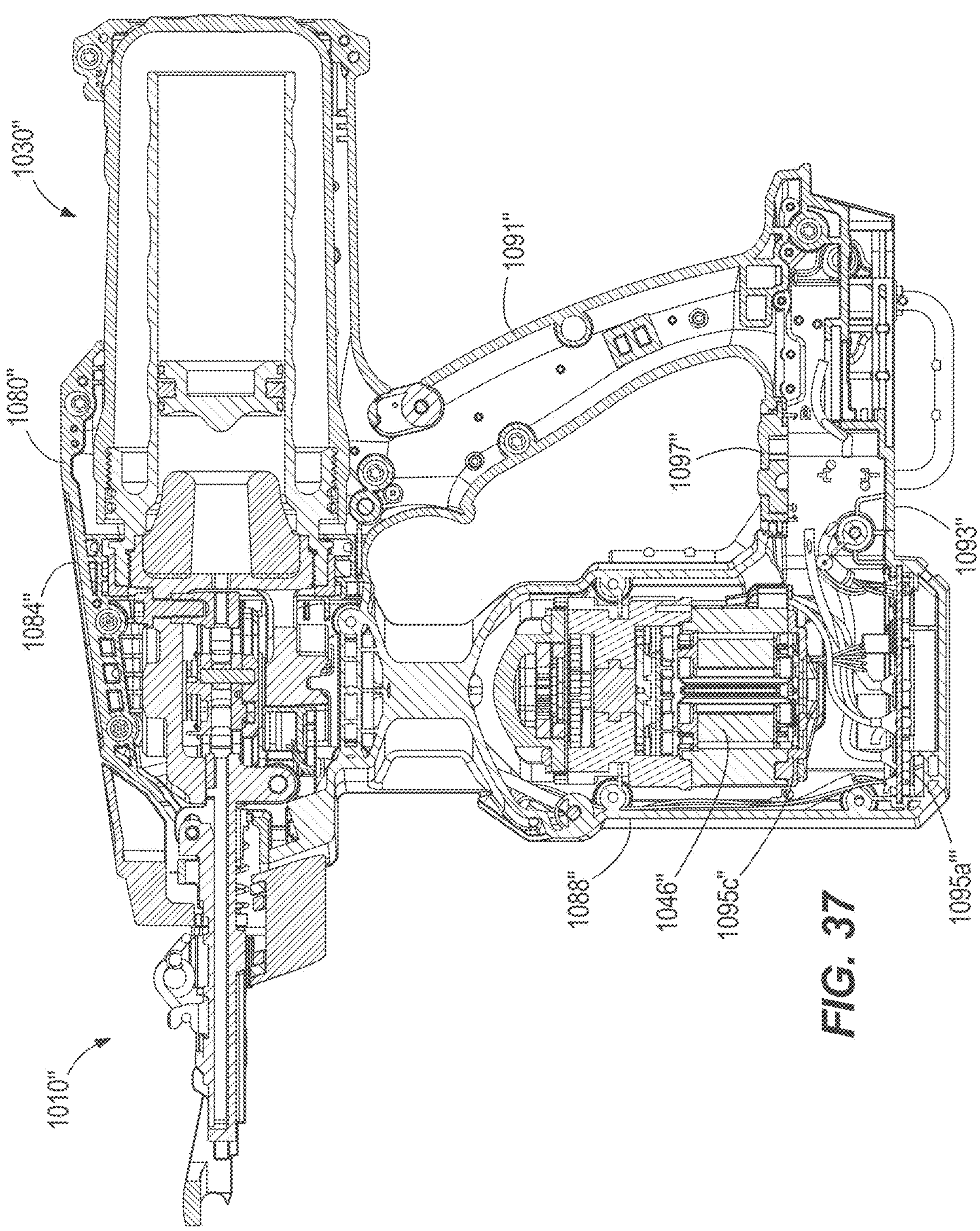
FIG. 37 is a cross-sectional view of the gas spring-powered fastener driver of FIG. 36 along the line 37-37 of FIG. 36 and illustrating a printed circuit board configuration according to an embodiment of the invention, wherein the printed circuit board is supported by vibration attenuating dampers within channels in the housing of the gas-spring-powered fastener driver.
Figure 42:
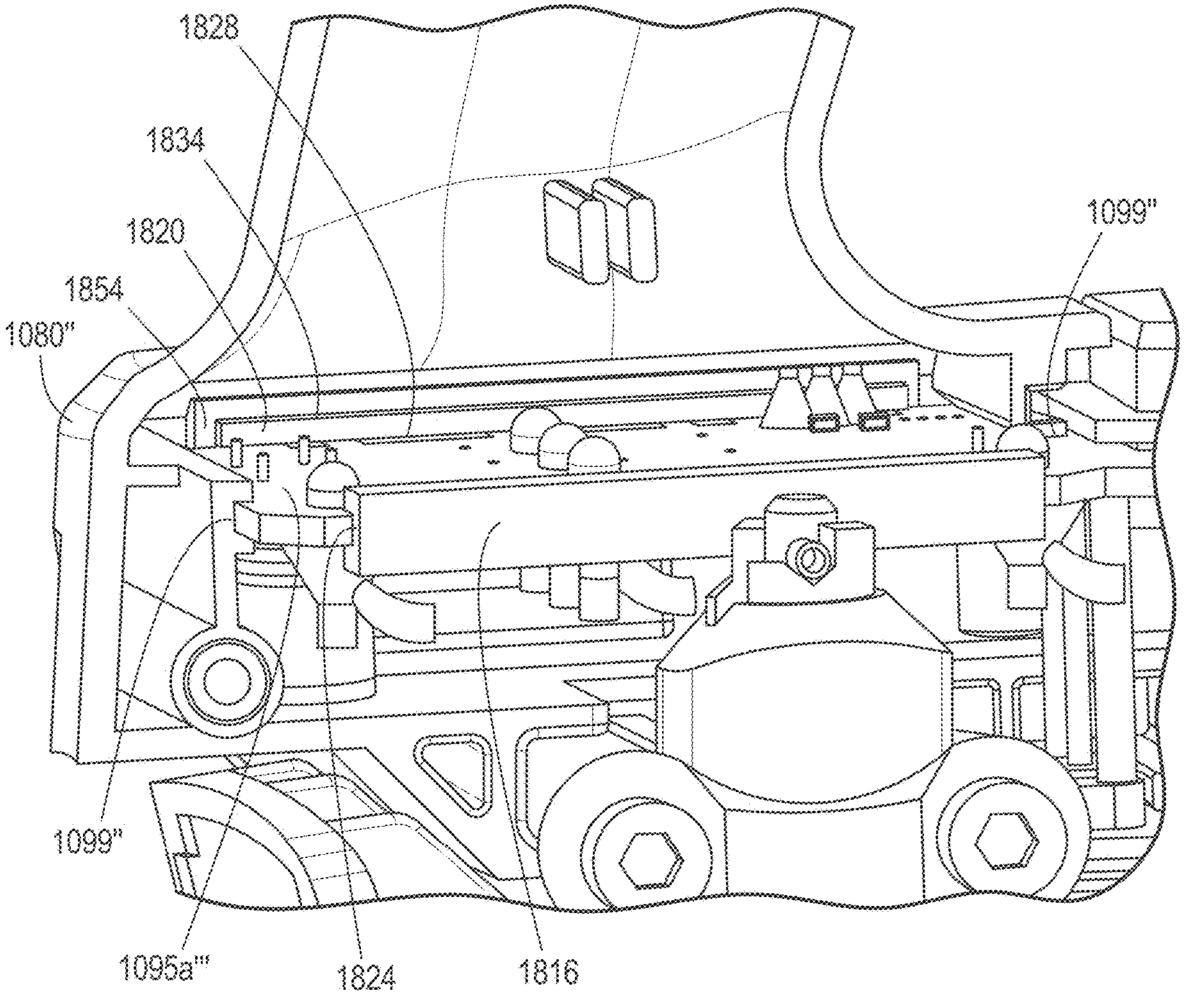
FIG. 42 is a detailed perspective view of the dampers of FIG. 41.
Figure 43:
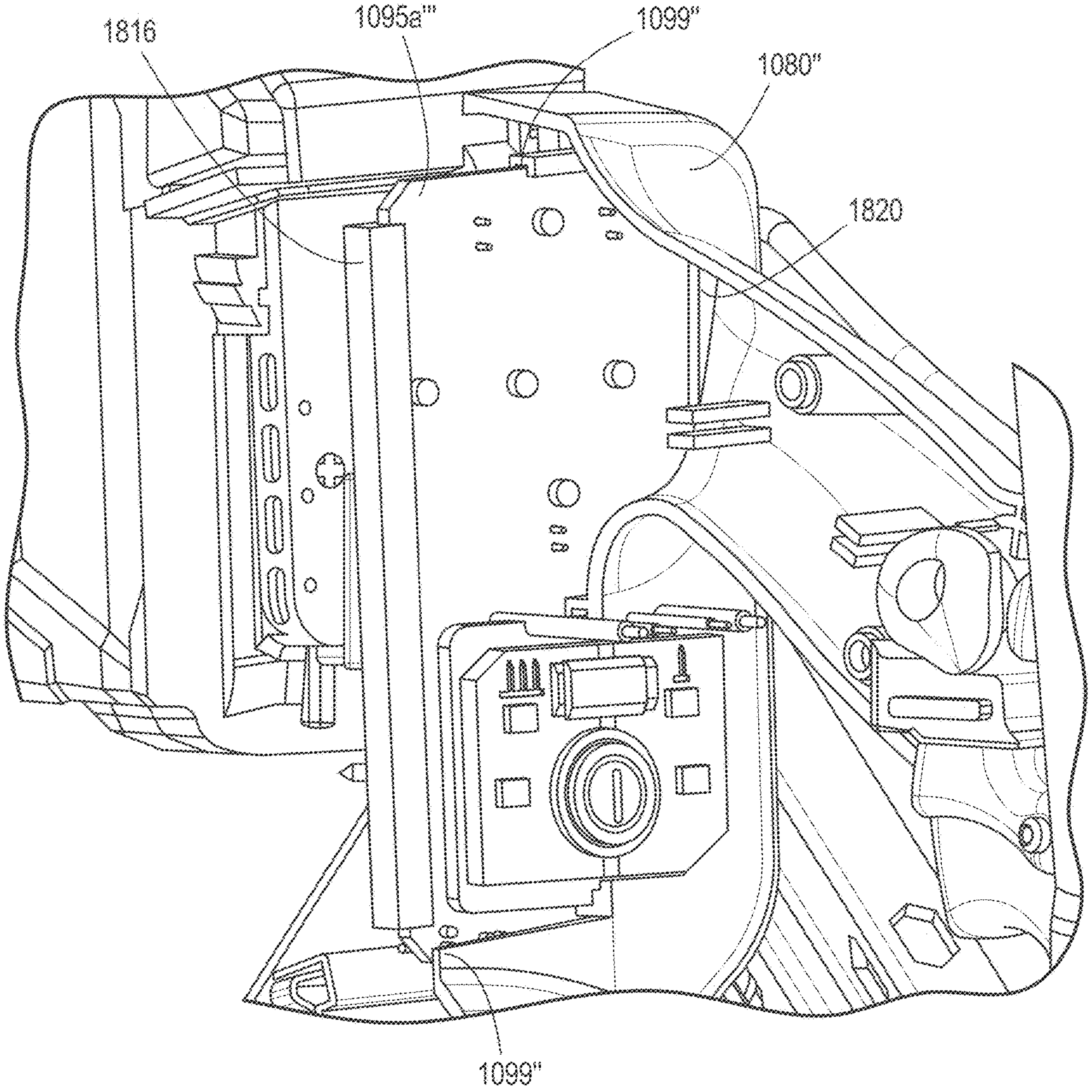
FIG. 43 is another detailed perspective view of the dampers of FIG. 41.

Another configuration of a gas spring-powered fastener driver 1010" is shown in FIGS. 36-44. The gas spring-powered fastener driver 1010" includes similar printed circuit board configurations to that of the gas spring-powered fastener driver 1010 of FIG. 26B. Therefore, like structure will be designated with like reference numerals plus double prime (") and only the differences will be described herein. As shown in FIG. 36, the driver 1010" includes a first printed circuit board 1095_a'''_ that is a unified power and control printed circuit board, a user interface 1097", and the motor printed circuit board 1095_c"_. In some embodiments, such as that of FIG. 37, the unified power and control printed circuit board 1095_a'''_ extends within the housing 1080" and is positioned within the drive unit support portion 1088". In other embodiments, as shown in FIG. 42, the unified power and control printed circuit board 1095_a'''_ extends within the housing 1080" and is positioned at least partially within the handle portion 1091". In the illustrated embodiment, the unified power and control printed circuit board 1095_a'''_ extends from the handle portion 1091" into the connection portion 1093" of the housing 1080".

Like the printed circuit board configuration of FIGS. 26B, the unified power and control printed circuit board 1095_a'''_ is received within channels 1099" in the housing 1080". The user interface 1097" is accessible via the connection portion 1093", although it may be located elsewhere. The unified power and control printed circuit board 1095_a"_ is in electrical communication with the user interface 1097", which includes a display unit 1097''', via wires extending therebetween. The display unit 1097''' includes indicators 1097_a'''_ (e.g., low battery, overtemperature, etc.) and one or more buttons 1097_b'''_ for selecting an operational mode of the driver 1010".

As shown in FIGS. 36-44, the unified power and control printed circuit board 1095_a'''_ includes a first end 1800, a second end 1804 opposite the first end 1800, a first side 1808, and a second side 1812 opposite the first side 1808. With respect to FIGS. 39 and 44, a length L of the unified power and control printed circuit board 1095_a'''_ between the first end 1800 and the second end 1804 is greater than a width W (FIG. 38 and FIG. 44) of the unified power and control printed circuit board 1095_a'''_ between the first side 1808 and the second side 1812. In the illustrated embodiment, the length L is 111.5 mm and the width is 54.4 mm. Therefore, the length L of the unified power and control printed circuit board 1095_a'''_ may be twice as long as the width W. In some cases, the length L of the unified power and control printed circuit board 1095_a'''_ may be at least 50% longer the width W.

The unified power and control printed circuit board 1095_a'''_ is supported within the housing 1080" with channels 1099". As shown, one of the channels 1099" receives the first end 1800 of the unified power and control printed circuit board 1095_a'''_ and the other of the channels 1099" receives the second end 1804 of the unified power and control printed circuit board 1095_a'_. In the illustrated embodiment, the channels 1099" are each partially defined by each of first and second clamshell halves of the housing 1080". In other embodiments, the channels 1099" may be defined by one or the other of first and second clamshell halves of the housing 1080".

In some embodiments, opposite sides of the unified power and control printed circuit board 1095_a'''_, respectively, are supported within the housing 1080" by first and second vibration attenuating dampers 1816, 1820. As shown, the first damper 1816 defines a length (FIGS. 39 and 44) and a channel 1824 (FIGS. 38, 39, and 42) that extends along the length L, and the second damper 1820 defines a length (FIGS. 39 and 44) and a channel 1828 (FIGS. 38, 39, and 42) along the length L. The channel 1824 of the first damper 1816 receives the first side 1808 of the unified power and control printed circuit board 1095_a'''_ and the channel 1828 of the second damper 1820 receives the second side 1812 of the unified power and control printed circuit board 1095_a'''_. In the embodiment of FIGS. 36-40, as shown in FIG. 39, each of the first and second dampers 1816, 1820 include a plurality of sections 1825, 1826 and a plurality of recesses 1827, 1829. Adjacent sections 1825, 1826 are separated by one of the recesses 1827, 1829, which are positioned on an opposite side of the dampers 1816, 1820 from the channels 1824, 1828. As shown, the recesses 1827, 1829 each have an open end that faces outwardly.

As shown, the first and second dampers 1816, 1820 extend along a majority of the length L of the unified power and control printed circuit board 1095*a*'''. The first damper 1816 and the second damper 1820 are formed from foam, compressed foam, or a combination of foam and compressed foam in the illustrated embodiment but may be formed from other suitable materials or combinations of materials in other embodiments. The first damper 1816 and the second damper 1820 are positioned between housing 1080" and the unified power and control printed circuit board 1095*a*'''. As shown herein, the first damper 1816 and the second damper 1820 take up a distance between an inner surface of the housing 1080" and the first side 1808 and second side 1812 of the unified power and control printed circuit board 1095*a*'''. The first damper 1816 and the second damper 1820 isolate the unified power and control printed circuit board 1095*a*" from vibration during use and/or a high impact event (e.g., if the tool is dropped). For example, the dampers 1816, 1820 may mitigate flexing of the board 1095*a*''', especially during higher drops.

In some embodiments, each of the first and second dampers 1816, 1820 is adhered to the unified power and control printed circuit board 1095*a*''' and an inner surface of the housing 1080". The first and second dampers 1816, 1820 may be adhered to both the unified power and control printed circuit board 1095*a*' and the inner surface of the housing 1080 by glue and/or double-sided tape.

In the embodiments of FIGS. 36-40, the inner surface of the housing 1080" includes a plurality of first channels 1832 and a plurality of second channels 1834. The first channels 1832 and the second channels are positioned on opposite sides of the housing 1080". The first and second channels 1832, 1834 are positioned between the channels 1099". As shown, the first channels 1832 are arranged aligned with one another along a common axis and the second channels 1832 are aligned with one another along a common axis. One of the clamshell halves of the housing 1080 may include the first channels 1832, while the other of the clamshell halves of the housing 1080 may include the second channels 1834.

Figure 38:
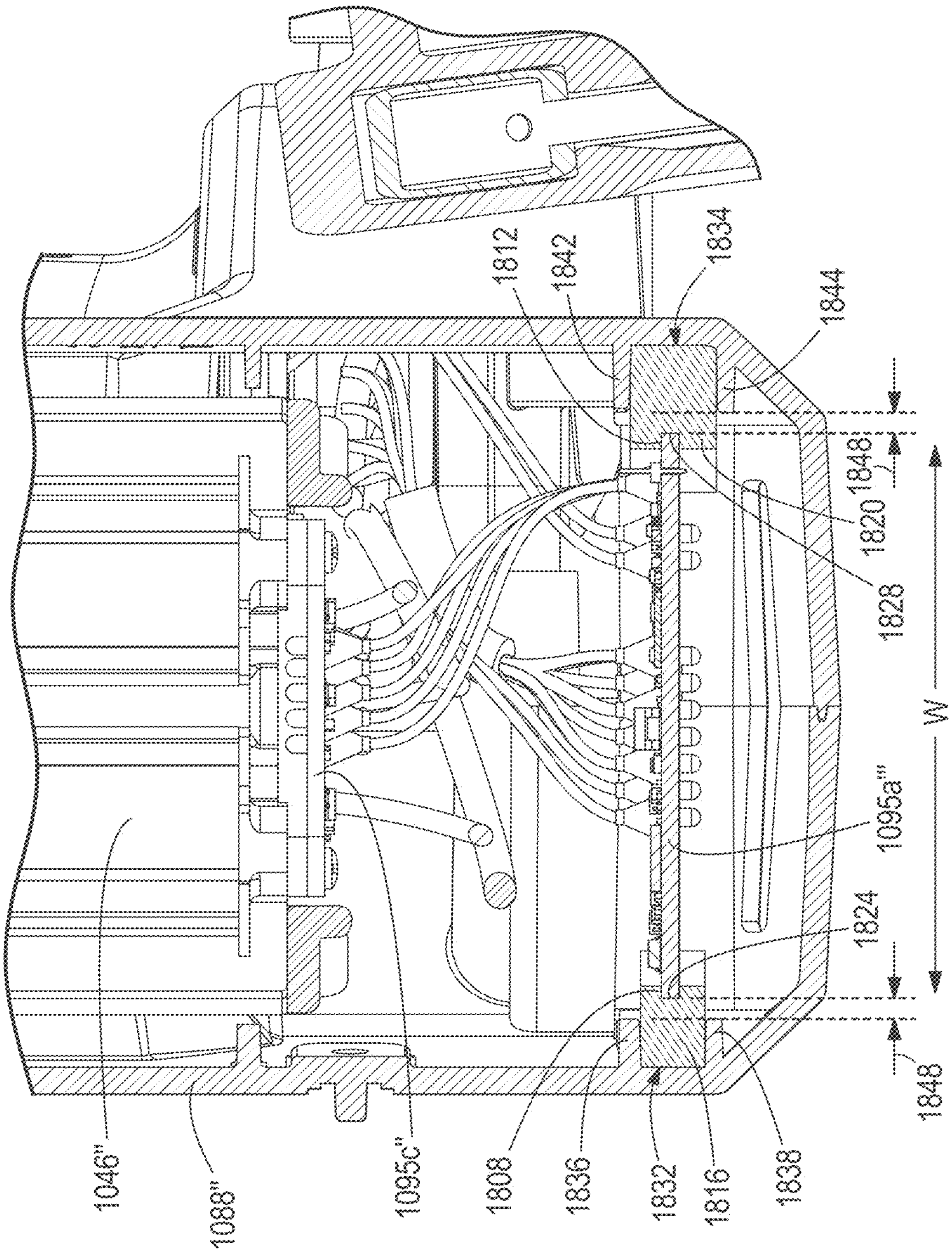
FIG. 38 is a cross-sectional view of the gas spring-powered fastener driver of FIG. 36 along the line 38-38 of FIG. 36.
Figure 39:
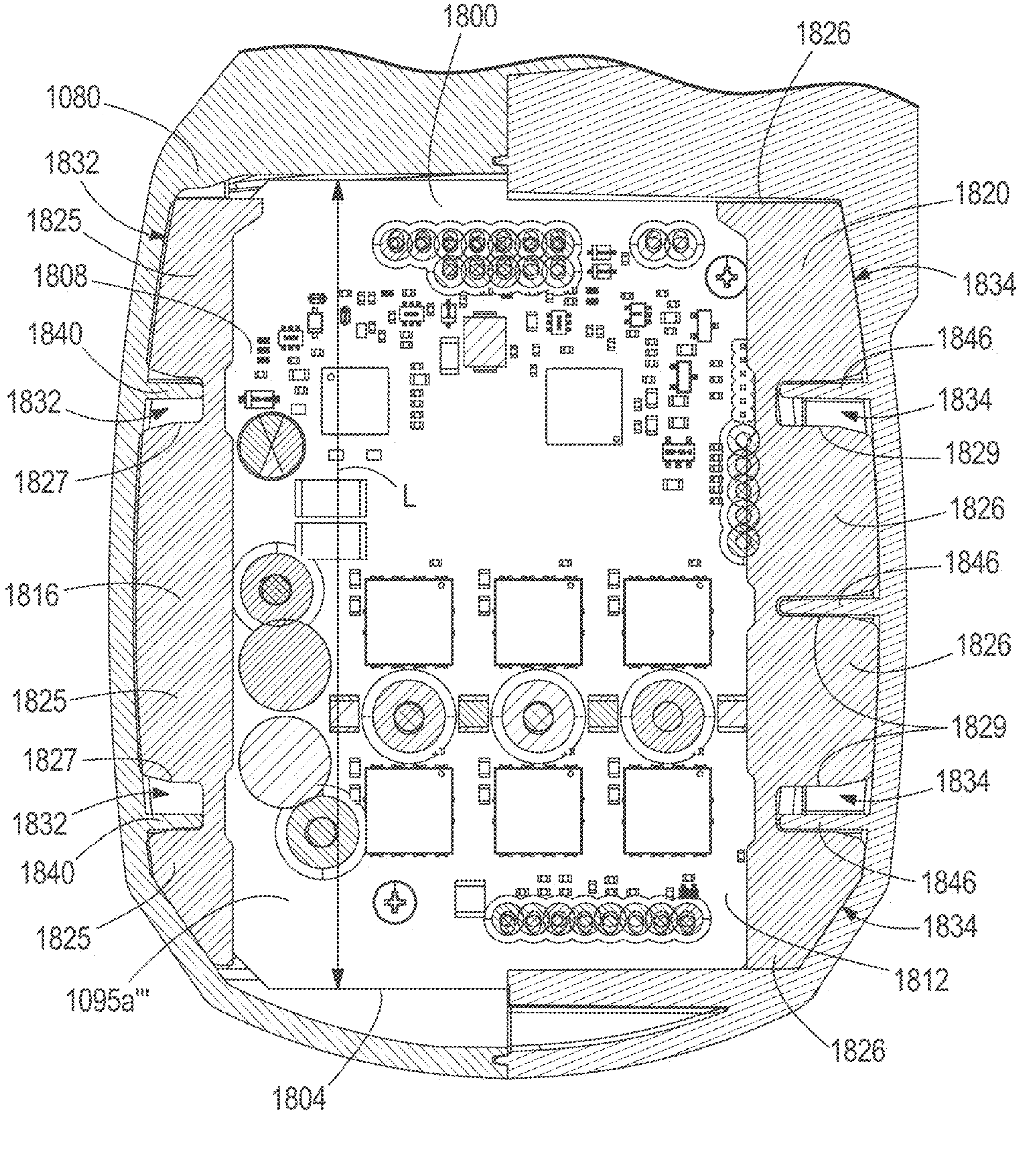
FIG. 39 is a cross-sectional view of the gas spring-powered fastener driver of FIG. 36 along the line 39-39 of FIG. 36.
Figure 40:
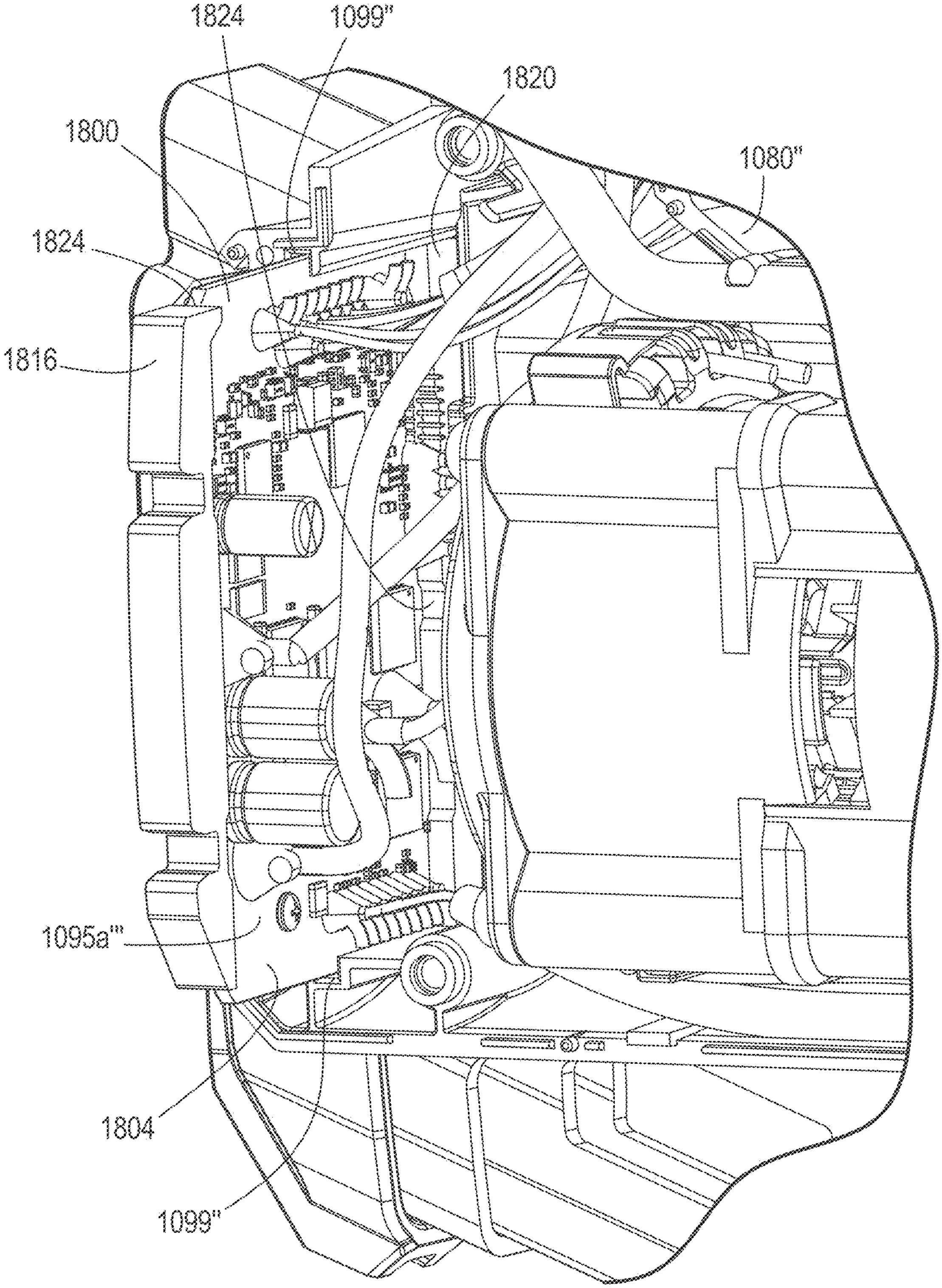
FIG. 40 is a detailed perspective view of a portion of the gas spring-powered fastener driver of FIG. 36 illustrating the printed circuit board configuration and the dampers of FIG. 37.
Figure 41:
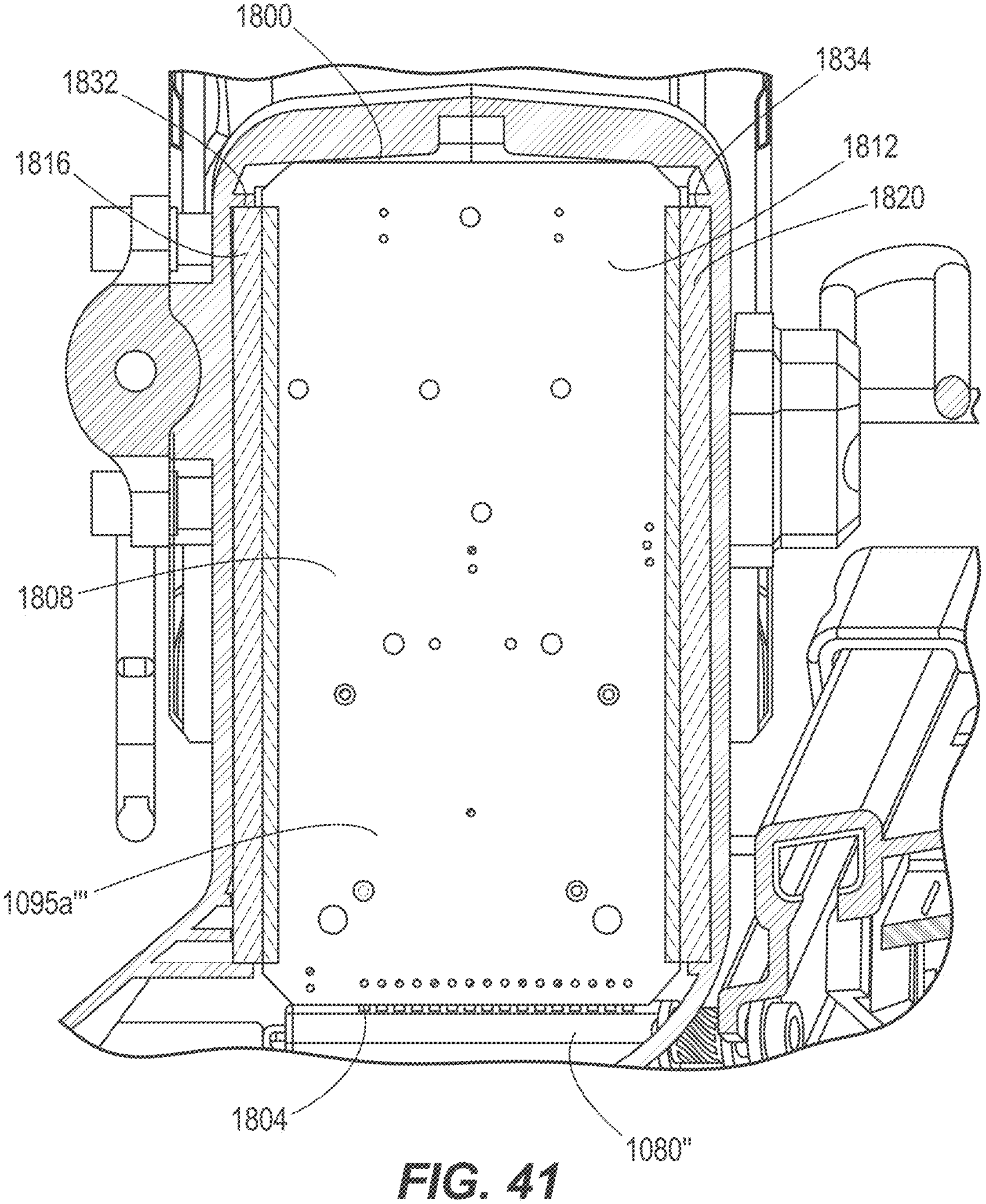
FIG. 41 is a plan view of the printed circuit board configuration of FIG. 37 supported by other vibration attenuating dampers received, respectively, within channels in the housing of the gas spring-powered fastener driver.

As shown in FIG. 38, a first wall 1836 and a second wall 1838 extend from an inner surface of the housing 1080". The walls 1836, 1838 extend between the channels 1099". Additionally, as shown in FIG. 39, a plurality of first separating walls 1840 extend between the top surface and the bottom surface of respective walls 1836, 1838. Accordingly, collectively, the first wall 1836, the second wall 1838, and the separating walls 1844 define the first channels 1832. In the illustrated embodiment, there are two separating walls 1840 and therefore there are three of the first channels 1832. In other embodiments, there may be fewer or more than three first channels 1832. The first channels 1832 have different lengths in the illustrated embodiment, but they may have the same length in other embodiments.

Similarly, as shown in FIG. 38, a first wall 1842 and a second wall 1844 extend from the housing 1080" opposite the first wall 1836 and the second wall 1838. The walls 1842, 1844 extend between the channels 1099". Additionally, as shown in FIG. 39, a plurality of first separating walls 1846 extend between the top surface and the bottom surface of respective walls 1842, 1844. Accordingly, collectively, the first wall 1842, the second wall 1844, and the separating walls 1846 define the second channels 1834. In the illustrated embodiment, there are three separating walls 1846 and therefore there are four of the second channels 1834. In other embodiments, there may be fewer or more than four second channels 1834. The second channels 1834 have different lengths in the illustrated embodiment, but they may have the same length in other embodiments. In the illustrated embodiment, there are more second channels 1834 than first channels 1832, but in other embodiments, there may be the same number of first and second channels 1832, 1834 or there may be more first channels 1832 than second channels 1834.

The first damper 1816 and the second damper 1820 are configured to be supported within the first channels 1832 and the second channels 1834, respectively. Each of the sections 1825 of the first damper 1816 is received (or at least partially received) within a corresponding first channel 1832, and each of the sections 1826 of the second damper 1820 is received (or at least partially received) within a corresponding second channel 1834. Accordingly, each of the recesses 1827, 1829 of the dampers 1816, 1820 are configured to receive one of the separating walls 1840, 1846. In such case, the first damper 1816 is fully constrained by the walls 1836, 1838, 1840 that define the first channels 1832 and the second damper 1820 is fully constrained by the walls 1842, 1844, 1846 that define the second channels 1834. In other embodiments, each of the first and second dampers 1816, 1820 may also be adhered (via glue or double-sided tape) to the unified power and control printed circuit board 1095*a*''' and surfaces of the inner housing and the surfaces of one or more of the respective walls 1836, 1838, 1840, 1842, 1844, 1846.

As shown in FIG. 38, the unified power and control printed circuit board 1095*a*''' is spaced apart from interior surfaces the respective walls 1836, 1838, 1842, 1844 by a gap 1848. Further, the dampers 1816, 1820 span (e.g., extend across) the gaps 1848.

In the embodiments of FIGS. 41-44, the inner surface of the housing 1080" may include a first channel 1832 and a second channel 1834 positioned between the channels 1099. In the illustrated embodiment, the first channel 1832 is defined by a first wall 1850 (best seen in FIG. 44) that extends inwardly from the inner surface of the housing 1080" and the second channel 1834 is defined by a second wall 1854 (best seen in FIG. 44) that extends inwardly from the inner surface of the housing 1080". In the illustrated embodiments, each of the first and second walls 1850, 1854 includes a continuous rectangular wall, which defines a top surface, a bottom surface, a first end surface, and a second end surface of the respective channel 1832, 1834. In the illustrated embodiment of FIGS. 41-44, the channels 1832, 1824 are continuous along their length. In other embodiments, each of the first and second walls 1850, 1854 may include a plurality of discrete walls that define the top surface, the bottom surface, the first end surface, and the second end surface of the respective channel 1832, 1834. One of the clamshell halves of the housing 1080" may include the first channel 1832 and the first wall 1850, while the other of the clamshell halves of the housing 1080 may include the second channel 1834 and the second wall 1854. The first damper 1816 is received within the first channel 1832, when present, and the second damper 1820 is received within the second channel 1834, when present. In such case, each of the first and second dampers 1816, 1820 is fully constrained by the wall 1850, 1854 of the respective channel 1832, 1834. In other embodiments, each of the first and second dampers 1816, 1820 may also be adhered (via glue or double-sided tape) to the unified power and control printed circuit board 1095*a*''' and surfaces of the inner housing and the respective first and second walls 1850, 1854.

Figure 44:
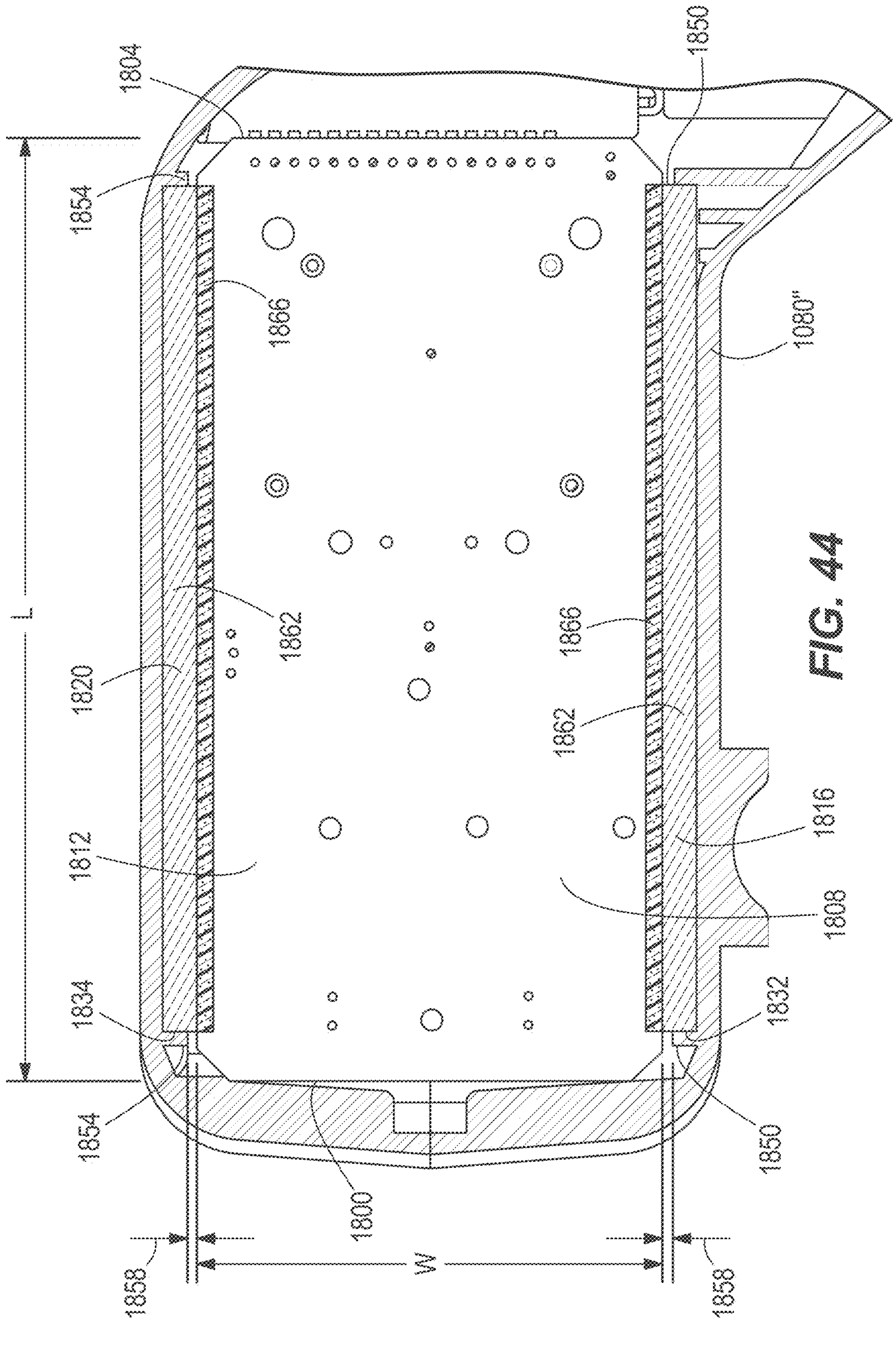
FIG. 44 is another plan view of the printed circuit board configuration of FIG. 37 and the dampers of FIG. 41.

In the embodiment of FIGS. 41-44, the unified power and control printed circuit board 1095*a*''' is spaced apart from an interior surface the respective wall 1850, 1854 by a gap 1858 (only one is shown in FIG. 44). In the illustrated embodiment, the gap 1858 may be 1.3 mm in width. As shown in FIG. 44, the dampers 1816, 1820 span (e.g., extend across) the gaps 1858. Additionally, a width of the dampers 1816, 1820 is 6.0 mm. in the embodiment of FIGS. 41-44, the first portion 1862 of the dampers 1816, 1820 is formed from a first material (e.g., foam) and a second portion 1866 of the dampers 1816, 1820 is formed from a second material (e.g., compressed foam). The first portion 1862 is positioned between the inner surface of the housing 1080" and an edge of the respective side 1808, 1812 of the unified power and control printed circuit board 1095*a*'''. The second portion 1866 contacts (or otherwise overlaps) a portion of the top and bottom surfaces of the unified power and control printed circuit board 1095*a*'''. The first portion 1862 1862 is 4.3 mm wide and the second portion 1866 is 1.7 mm wide. The second portion 1866 makes up 28% of the total width (6.0 mm) of the dampers 1816, 1820 and therefore is the narrower of the two portions 1862, 1866. Collectively, the width of the first portions 1862 of the dampers 1816, 1820 and the width W of the unified power and control printed circuit board 1095*a*''' take up the width W' (e.g., 63 mm) between the inner surfaces on opposite sides of the housing 1080. In other embodiments, the first and second portions 1862, 1866 may be larger or smaller relative to one another than that shown herein. In other embodiments, the dampers 1816, 1820 may be formed from a single material, as noted above. Also, although not shown, the dampers 1816, 1820 of FIGS. 37-40 may have the first and second portions 1862, 1866 of FIGS. 41-44, in some embodiments.

While in the illustrated embodiments the first and second dampers 1816, 1820 are each a single member extending along the majority of the length L of the unified power and control printed circuit board 1095*a*''', in other embodiments, each of the first and second dampers 1816, 1820 may include a plurality of dampers positioned along the length L of the unified power and control printed circuit board 1095*a*'''. In such case, each of the plurality of dampers defines a channel that receives the respective first or second sides 1808, 1812 of the unified power and control printed circuit board 1095*a*'''. Additionally or alternatively, a damper (not shown) may be positioned within the channels 1099" of the housing 1080", as well. In such case, like the dampers 1816, 1820, each of the dampers within the channels 1099" would also include a channel configured to receive the first end 1800 and the second end 1804, respectively, of the unified power and control printed circuit board 1095*a*'''. In still other embodiments, the first damper 1816, the second damper 1820, and the dampers within the channels 1099" may be constructed as a single member defining an inner channel, which is configured to receive each of the first end 1800, the second end 1804, the first side 1808, and the second side 1812 of the unified power and control printed circuit board 1095*a*'''.

Although not illustrated, the power printed circuit board 95*a* and/or the user interface printed circuit board 95*b* of FIGS. 3 and 4 may be supported by channels 1099, channels 1832, 1834, and/or dampers 1816, 1820 as discussed with respect to FIGS. 36-44. Similarly, the power printed circuit board 1095*a* and/or the user interface printed circuit board 1095*b* of FIG. 26A may be supported by channels 1832, 1834 and/or dampers 1816, 1820 as discussed with respect to FIGS. 36-44. Also, the unified power and control printed circuit board 1095*a*' of FIG. 26B may be supported by channels 1832, 1834 and/or dampers 1816, 1820 as discussed with respect to FIGS. 36-44.

Another configuration for the magazine 1014 is shown in FIGS. 24-34. The magazine 1014 is similar to the magazine 14 discussed above. Therefore, like structure will be designated with like reference numeral plus "1000" and only the differences will be described herein.

The magazine 1014 includes a magazine body 1404 configured to receive the fasteners to be driven into the workpiece by the powered fastener driver 1010. The magazine body 1404 (FIGS. 24, 29) has a first end 1408 and a second end 1412 opposite the first end 1408. The magazine body 1404 further includes a first portion 1700 and a second portion 1704 coupled to one another by a cover 1708 at the second end 1412 of the magazine 1014. The first portion 1700 includes the bottom side 1424 and the second portion 1704 includes the top side 1428. The first portion 1700 also includes a pocket or recess 1430 at or adjacent the second end 1412. The pocket 1430 is positioned on the second side 1420 and is closer to the bottom side 1424 than the top side 1428. The first side 1416 and the second side 1420 are each formed at least partially from both the first portion 1700 and the second portion 1704. Additionally, the first portion 1700 and the second portion 1704 cooperatively define the fastener channel 1448 (FIG. 29, 30) extending from the first end 1408 to proximate the second end 1412 of the magazine body 1404. The fastener channel 1448 is configured to receive the fasteners.

Figure 29:
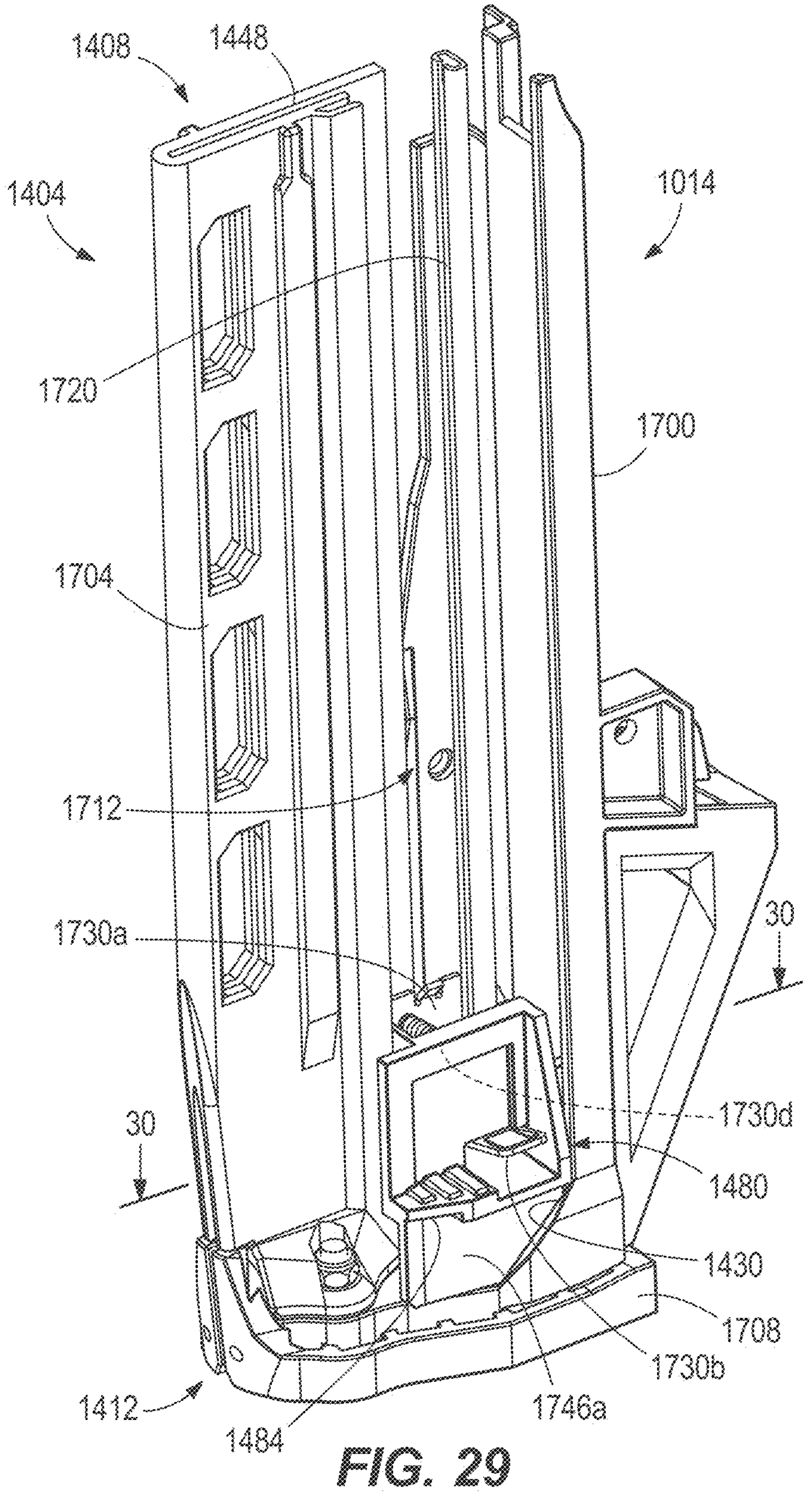
FIG. 29 is a perspective view of the magazine of FIG. 24 illustrating a pusher assembly.
Figure 30:
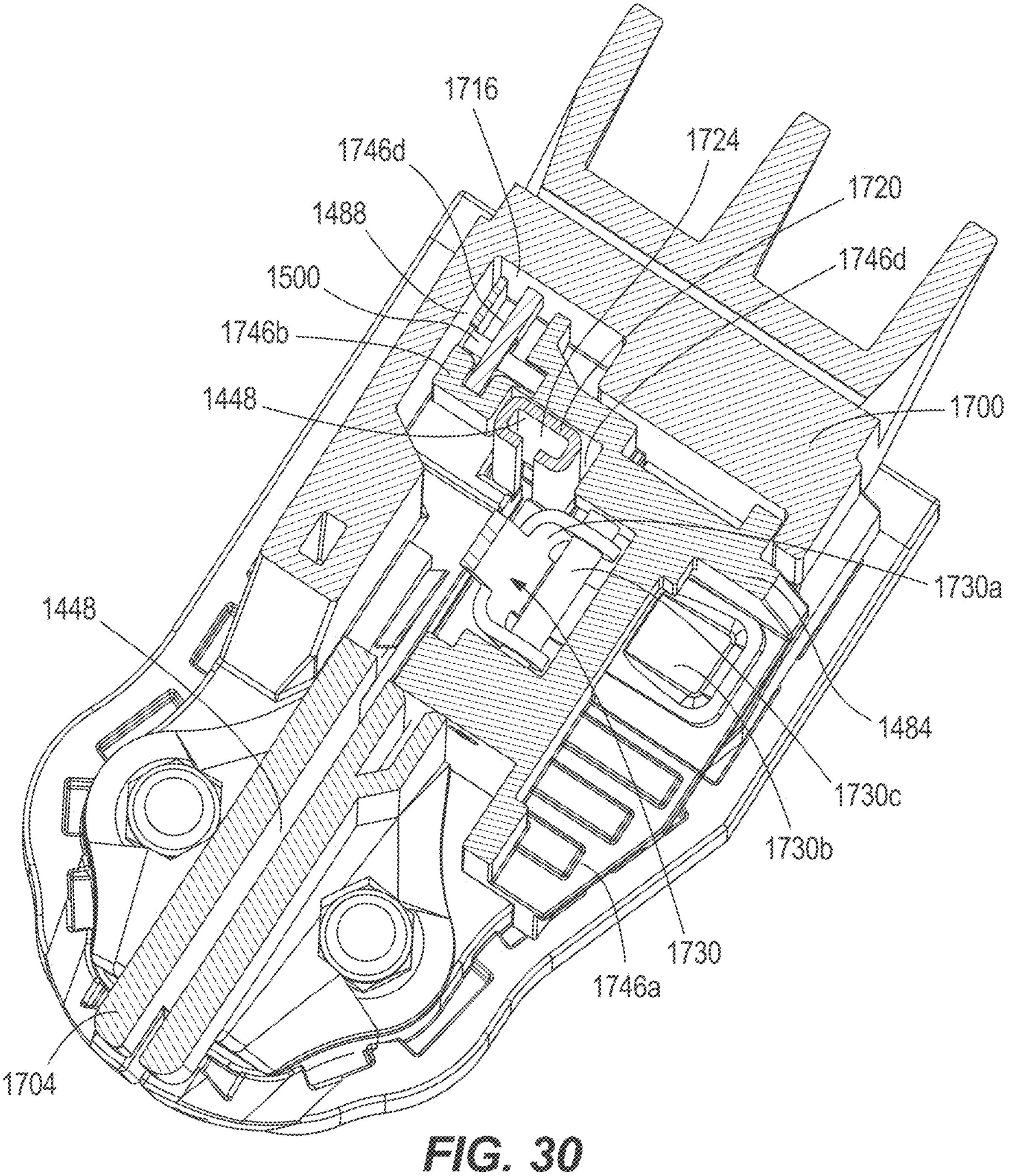
FIG. 30 is a cross-sectional view of the magazine of FIG. 29 along the line 30-30 in FIG. 29.
Figure 31:
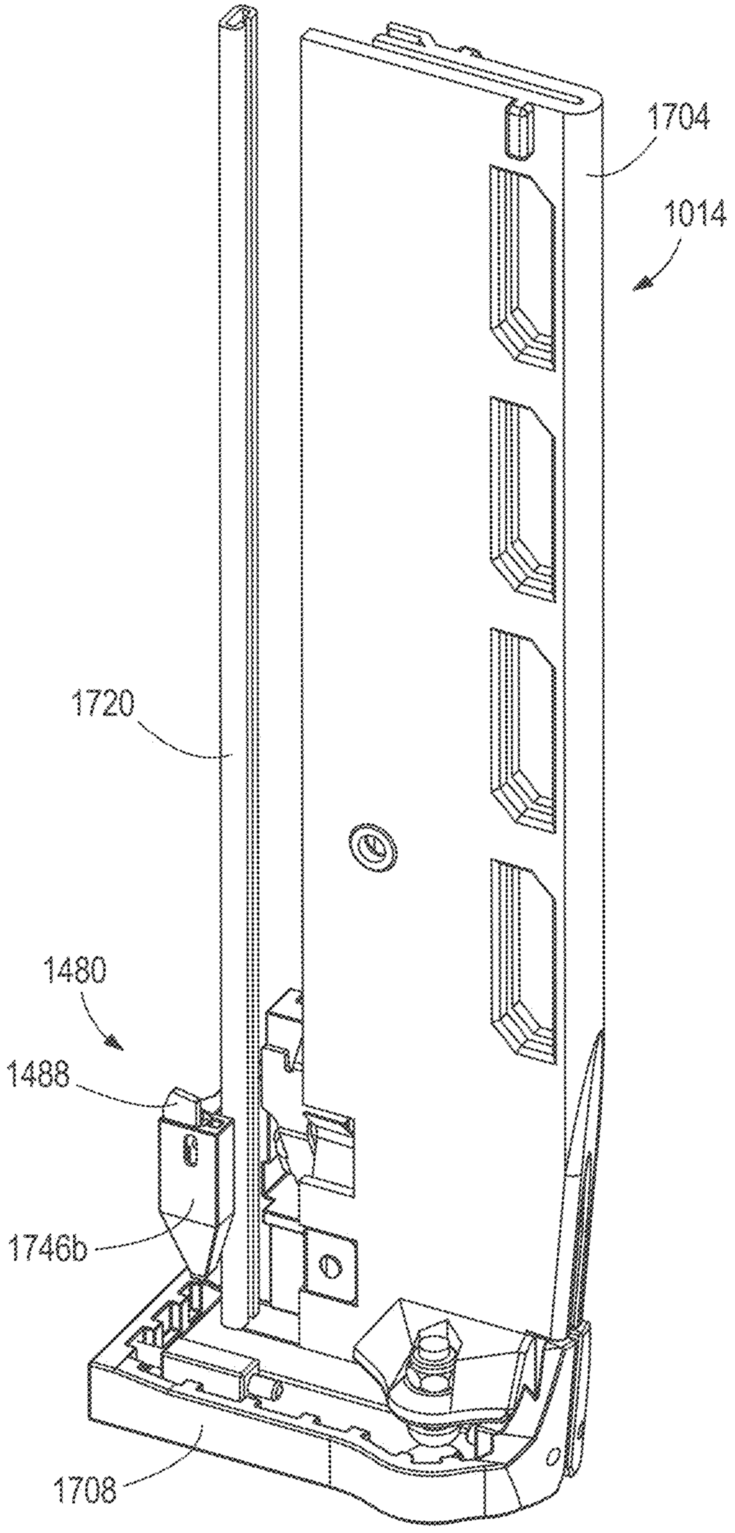
FIG. 31 is another perspective view of the magazine of FIG. 24.

With particular reference to FIGS. 25 and 29, a gap or track 1712 is defined on the second side 1420 between the first portion 1700 and the second portion 1704. The track 1712 extends along the length of the magazine body 1404 from proximate the second end 1412 toward the first end 1408. As shown in at least FIG. 26A, the first portion 1700 includes a recess 1716 that extends along the first side 1416 from proximate the second end 1412 toward the first end 1408. More specifically, the recess 1716 extends parallel to and in connection with the fastener channel 1448. As shown in FIGS. 29-31, a guide member 1720 is coupled to the second end 1412 of the first portion 1700 and is spaced apart from the second portion 1704. The guide member 1720 extends parallel to the recess 1716 and defines a portion of the fastener channel 1448. That is, the guide member 1720 includes an opening 1724 (FIG. 30) extending along a length thereof that receives a head of each of the fasteners.

With reference to FIGS. 29-31B, the magazine 1014 further includes a pusher assembly 1480. The pusher assembly 1480 is slidably coupled to the magazine 1014 and configured to bias the fasteners in the magazine 1014 toward the nosepiece assembly 1400. As shown in FIGS. 25-26A, 29-31B, the illustrated pusher assembly 1480 includes a first portion or pusher body 1484, a pusher finger 1730 pivotably coupled to the pusher body 1484, and a second portion or dry-fire lockout member 1488 movably coupled to the pusher body 1484. The pusher assembly 1480 further includes a spring assembly 1734 (FIG. 31B) that has a roller 1738 supported by the pusher body 1484 and a spring 1742 supported by the roller 1738. A stationary end 1742*a* of the spring 1742 is coupled to the magazine body 1404. The spring assembly 1734 is configured to exert a biasing force on the pusher assembly 1480 for moving the pusher assembly 1480 in the direction of arrow 1496 (FIG. 25).

With respect to FIGS. 25 and 29-30, the pusher body 1484 is supported by both the first and second portions 1700, 1704 of the magazine body 1404 and is at least partially positioned on both sides of the fastener channel 1448. The pusher assembly 1480 is movable from a first position (FIG. 29) in which the pusher body 1484 is positioned at or adjacent to the second end 1412 to a second position in which the pusher body 1484 is positioned at or adjacent to the first end 1408. In the first position, at least a portion of the pusher body 1484 is positioned within the pocket 1430. As shown in FIG. 29, an inner surface of the pocket 1430 covers an outer surface of the pusher body 1484. The pocket 1430 protects the pusher assembly 1480 against impact in the event the driver 1010 is dropped. As shown, the pusher body 1484 includes a main part **1746*a* that is positioned on the second side 1420 and positioned adjacent to the track 1712. The main part 1746*a* pivotably supports the pusher finger 1730 (FIG. 30). The pusher body 1484 also includes an arm 1746*b* extending from the main part 1746*a* and positioned on the second side 1420. The arm 1746*b* is received within and movable relative to the recess 1716 (FIG. 26A, 30) of the magazine body 1404. The arm 1746*b* includes a first recess 1746*d* through which extends the guide member 1720 (FIG. 25) and a second recess 1746*d* in which the dry-fire lockout member 1488 and a second spring 1500 (FIGS. 26A and 30**) is received.

Figure 31A:
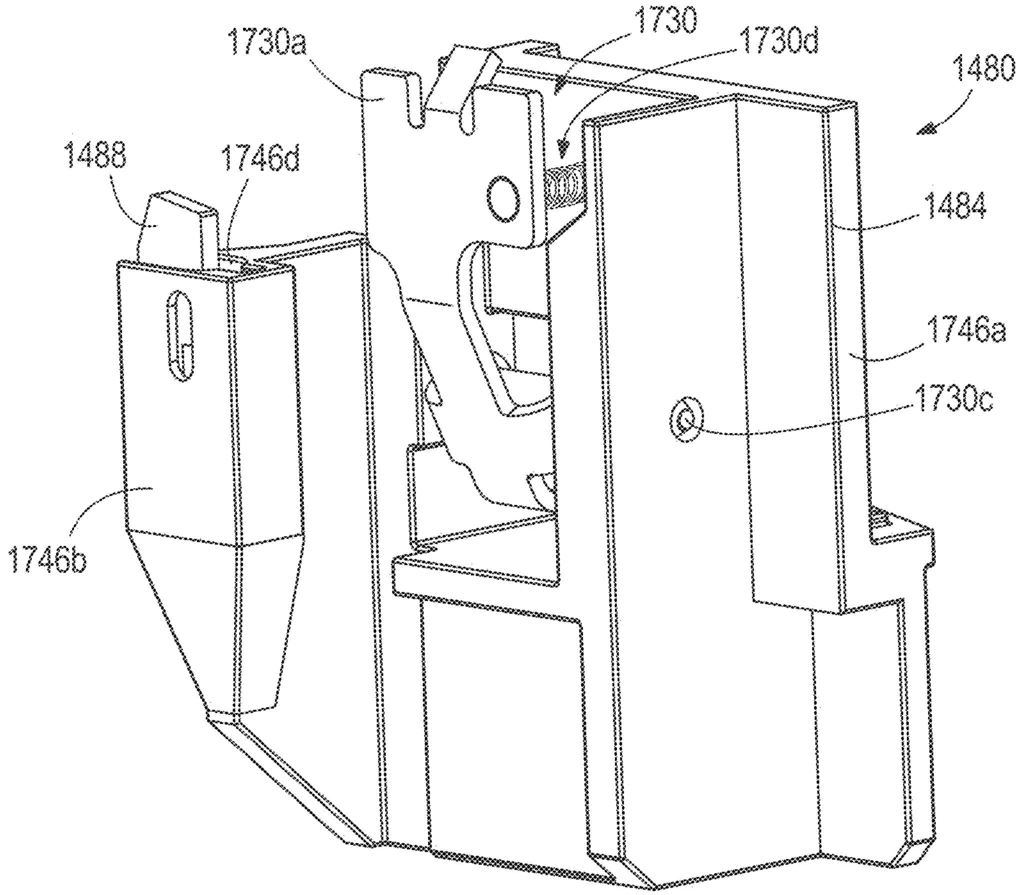
FIG. 31A is perspective view of the pusher assembly of FIG. 29.
Figure 31B:
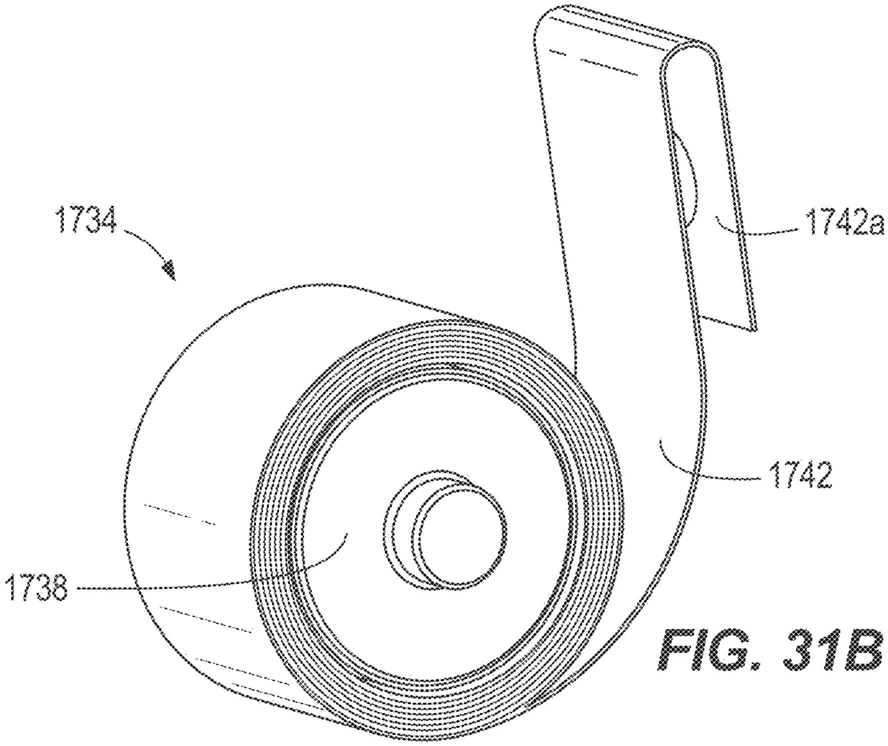
FIG. 31B is a perspective view of a spring assembly of the pusher assembly of FIG. 29.
Figure 31C:
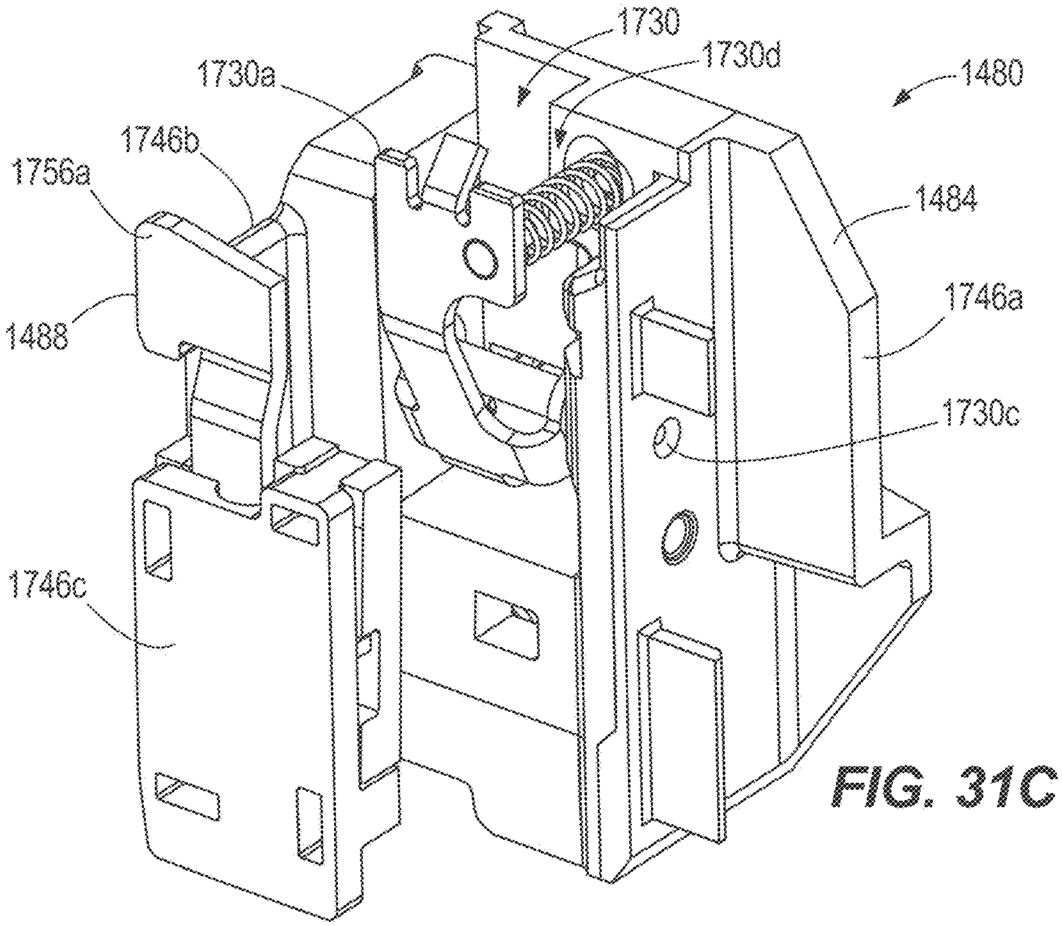
FIG. 31C is a perspective view of a pusher assembly in accordance with another embodiment of the invention.
Figure 31D:
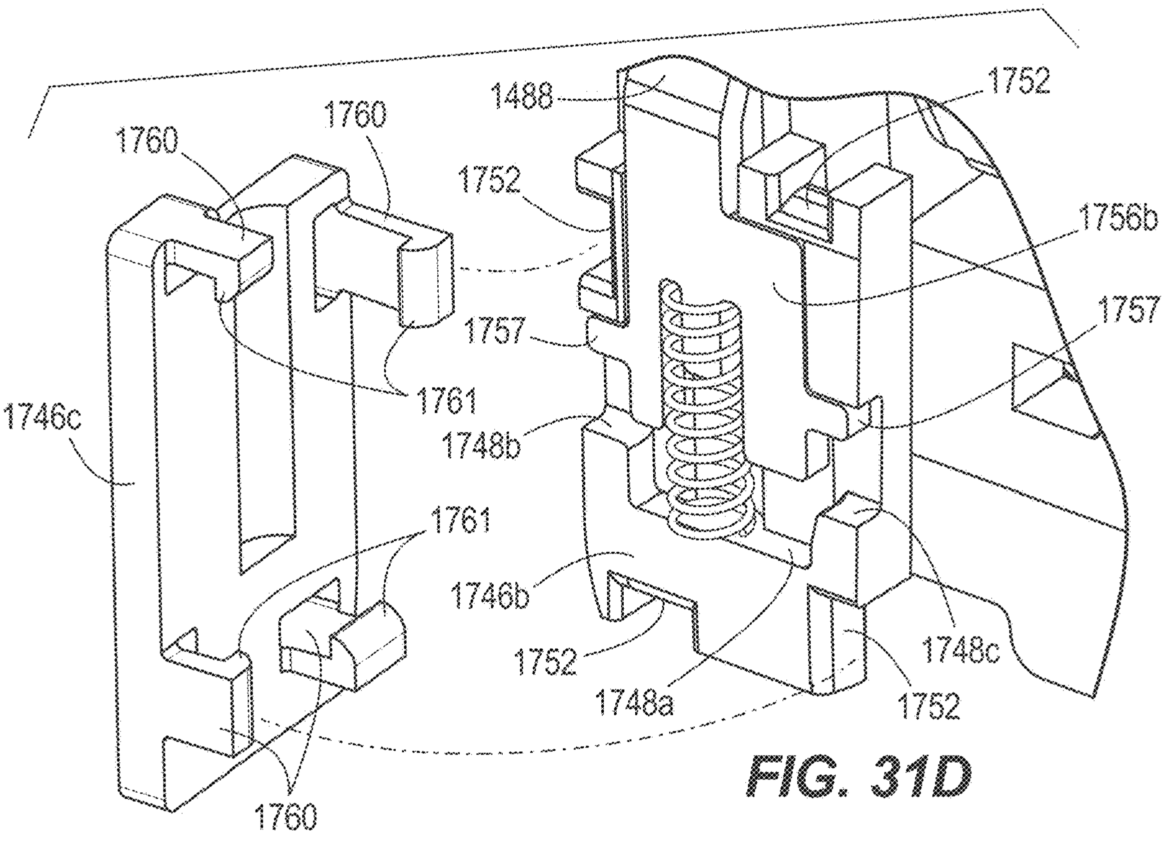
FIG. 31D is a partial exploded view of the pusher assembly of FIG. 31C.

In the embodiment of FIG. 31A, the pusher body 1484, including the main part **1746*a* and the arm 1746*b* are integrally formed. In other embodiments, such as that of FIGS. 31C and 31D, the pusher body 1484 may be formed of two or more pieces. Specifically, as shown in FIGS. 31D, the pusher body 1484 may include a cap or cover 1746*c* that is formed separately from and coupled to the arm 1746*b*. The arm 1746*b* includes a central recess 1748*a*, a first side recess 1748*b* on a first side of the central recess 1748*a*, and a second side recess 1748*c* on a second, opposite side of the central recess 1748*a*. Each of the recesses 1748*a*, 1748*b*, 1748*c* are configuration to receive at least a portion of the dry-fire lockout member 1488 and the second spring 1500. The arm 1746*b* includes a plurality of bores 1752. The dry-fire lockout member 1488 includes a first end 1756*a* (FIG. 31C) that is spaced apart from the arm 1746*b* and a second end 1756*b* (FIG. 31D) that is positioned between the arm 1746*b* and cap 1746*c*. The second end 1756*b* includes a pair of projections 1757 extending outwardly therefrom. The dry-fire lockout member 1488 is received within and movable relative to the central recess 1748*a*, one of the pair of projections 1757 is received in and movable relative to the first side recess 1748*b* in the arm 1746*b*, and the other of the pair of projections 1757 is received in and movable relative to the second side recess 1748*c* in the arm 1746*b*. The spring 1500 is positioned between the dry-fire lockout member 1488 and a surface of the central recess 1748*a*. The cap 1746*c* is snap fit to the pusher body 1484, and specifically to the arm 1746*b*. The cap 1746*c* includes a plurality of projections 1760 (FIG. 31D) extending therefrom. Each of the projections includes a hook 1761. One of the plurality of projections 1760 is received in each of the plurality of bores 1752 of the arm 1746*b* such that the hook 1761 prevents removal of the cap 1746*c* from the pusher body 1484**.

The pusher finger 1730 includes a first end **1730*a* that is positioned between the main part 1746*a* of the pusher body 1484 and the magazine body 1404 and a second end 1730*b* that extends outwardly from the main part 1746*a* of the pusher body 1484. The pusher finger 1730 is pivotably coupled to the main part 1746*a* by pin 1730*c* extending through the pusher finger 1730 at a location between the first end 1730*a* and the second end 1730*b*. The pusher finger 1730 is movable between an engaged position in which the first end 1730*a* is positioned within the fastener channel 1448 and configured to engage the last fastener in the fastener channel 1448 and a disengaged position in which the first end 1730*a* is at least partially removed from the track 1712. A spring 1730*d* (FIG. 29) biases the pusher finger 1730 into the engaged position. A force exerted on the second end 1730*b* of the pusher finger 1730 temporarily moves the pusher finger 1730 from the engaged position to the disengaged position such that the pusher assembly 1480 is movable relative to the magazine body 1404. When the force is removed from the second end 1730*b* of the pusher finger 1730, the bias of the spring 1730*d* returns the pusher finger 1730** to the engaged position.

Furthermore, the dry-fire lockout member 1488 is movably coupled to the pusher body 1484 (e.g., the arm **1746*b* of the pusher body 1484) by the second spring 1500 (FIGS. 26 and 30). As such, the pusher body 1484 of the pusher assembly 1480 may selectively move relative to the dry-fire lockout member 1488. The biasing force of the second spring 1500 is independent of the biasing force of the spring assembly 1734. The pusher assembly 1480 is movable in a first state, in which the pusher body 1484 and the dry-fire lockout member 1488 move together in unison in the direction of arrow 1496 and a second state in which relative movement between the pusher body 1484 and the dry-fire lockout member 1488** has occurred, as further discussed below.

Figure 32:
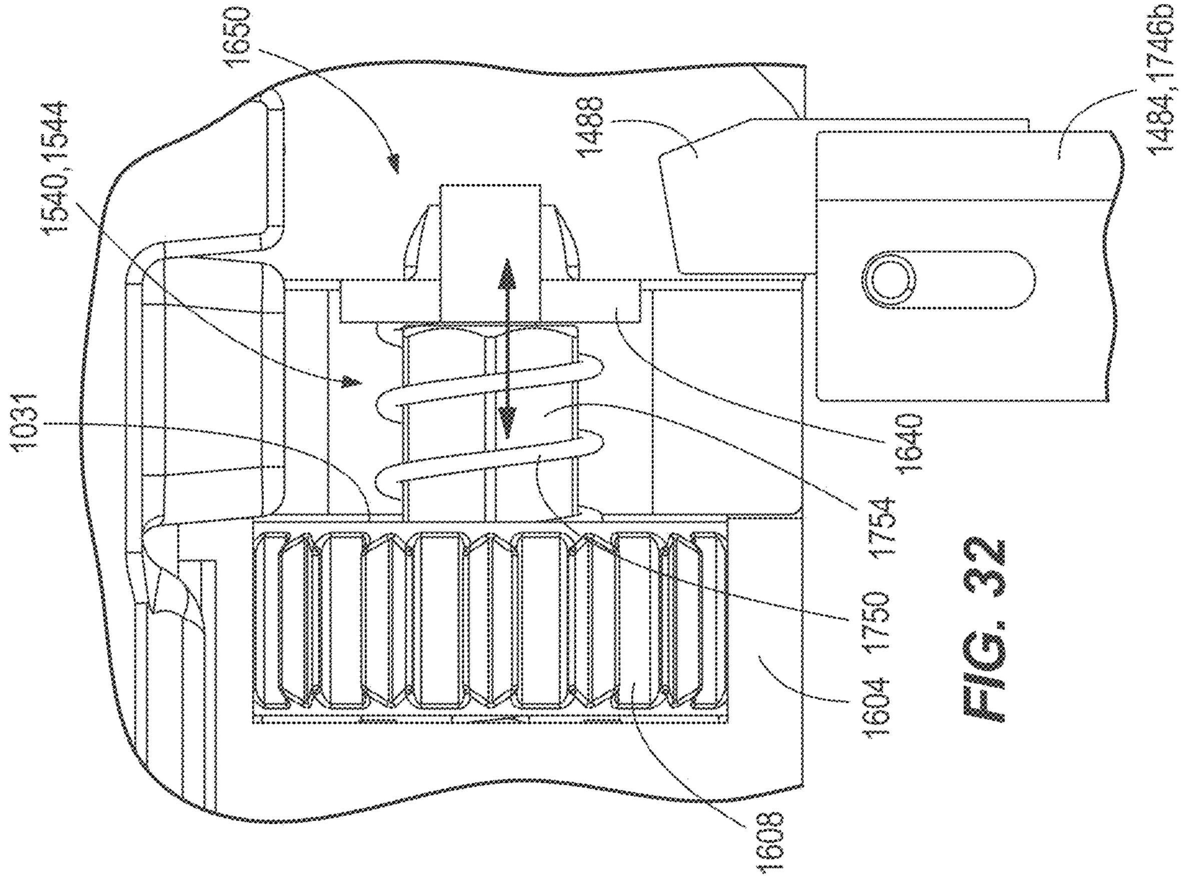
FIG. 32 illustrates a dry-fire lockout link coupled to the workpiece contact assembly of FIG. 24 when there is greater than a predetermined number of fasteners within the magazine.

Like the previous embodiment, the nosepiece assembly 1400 (FIGS. 24 and 25) is positioned at the first end 1408 of the magazine body 1404 and includes similar structure and reference numerals plus "1000", which will not be repeated here. Similarly, with reference to FIGS. 24-28, the driver 1010 includes a workpiece contact assembly 1540 that is similar to the workpiece contact assembly 1540, such that reference numerals plus "1000" are used and only the differences will be discussed herein. A single spring 1750 (FIGS. 32-34) is configured to bias the workpiece contact assembly 1540 toward an extended position. The workpiece contact assembly 1540 is configured to be moved from the extended position toward a retracted position (shown in FIGS. 27-29) when the workpiece contact assembly 1540 is pressed against a workpiece. The first section 1552 includes an arm 1754 that is movable relative to the housing 1080. The spring 1750 surrounds the arm 1754. The arm 1754 includes an engagement portion 1640 (e.g., a dry-fire lockout link) and a screw portion 1758. In the illustrated embodiment, the first section 1552 includes the dry-fire lockout link 1640. The dry-fire lockout link 1640 is positioned at the substantially the first end 1544 of the workpiece contact assembly 1540 and specifically is coupled to the arm 1754. As shown in FIG. 32, the spring 1750 is positioned between the inner frame 1031 and the dry-fire lockout link 1640.

Figure 24:
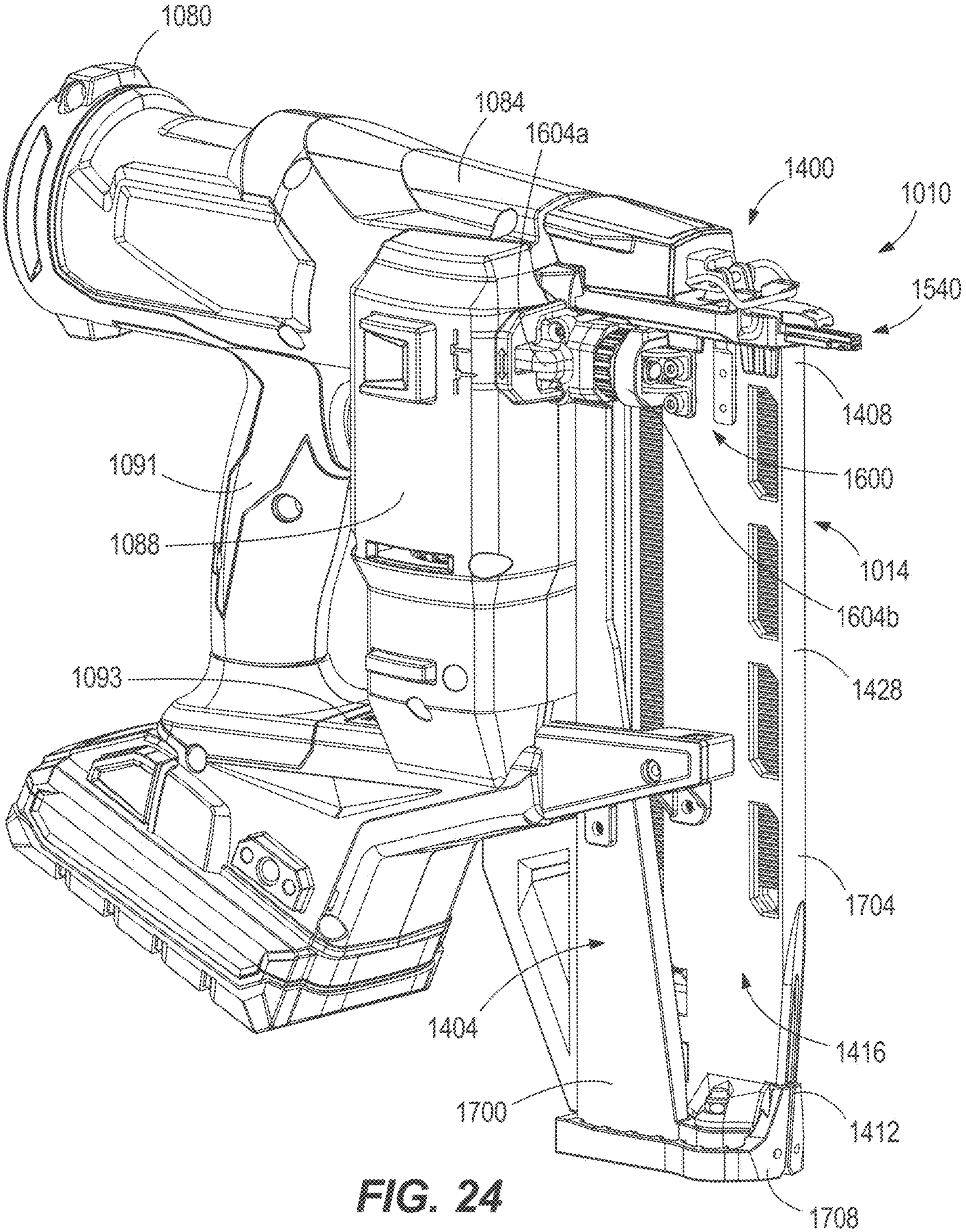
FIG. 24 is a perspective view of a gas spring-powered fastener driver including a magazine and a workpiece contact assembly in accordance with another embodiment of the invention.

With reference to FIGS. 24 and 27-29, the depth of drive adjustment mechanism 1600 is similar to depth-of-drive adjustment mechanism described above and operates in a similar manner as discussed above. Therefore, like structure is identified using like reference numerals plus "1000". With reference to FIG. 24, the depth of drive adjustment mechanism 1600 includes two support members **1604*a*, 1604*b*, the adjustment knob 1608, and the screw portion 1758. The support members 1604*a*, 1604*b* support the arm 1754. One of the support members 1604*a* is at least partially positioned within the housing 1080 and supported by the inner frame 1031. One of the support members 1604*b* is supported by the other support member 1604*a*. The adjustment knob 1608 is positioned between the support members 1604*a*, 1604*b* and is rotatably supported upon the arm 1754. As noted above, the screw portion 1758 extends between the first section 1552 and the second section 1556 of the workpiece contact assembly 1540. One end of the second section 1556 is threadably coupled to the screw portion 1758. Furthermore, the arm 1754, and therefore the screw portion 1758, are coupled for co-rotation with the adjustment knob 1608. Accordingly, the screw portion 1758 and the adjustment knob 1608 are rotatably supported by the arm 1754. Rotation of the adjustment knob 1608 axially threads the second section 1556 along the screw portion 1758 for adjusting a protruding length of the workpiece contact assembly 1540 relative to the distal end of the nosepiece assembly 1400**.

Figure 28:
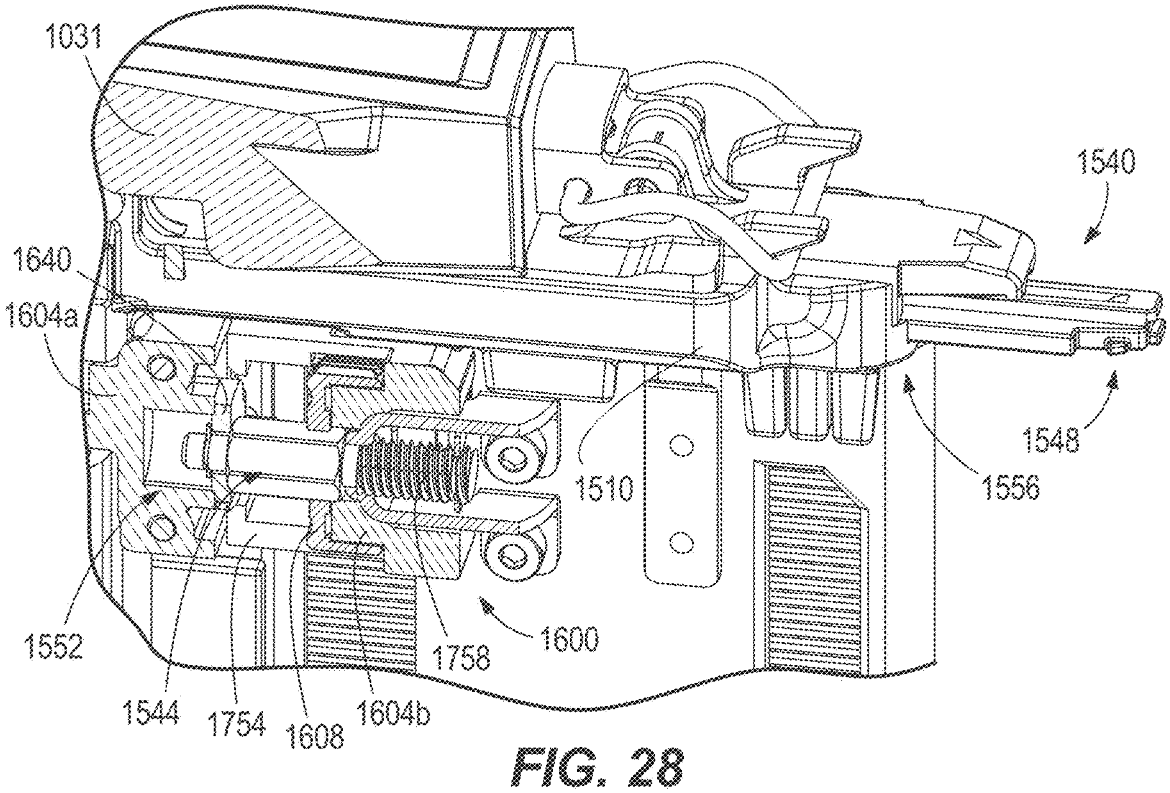
FIG. 28 is a detailed cross-sectional view of the gas spring-powered fastener driver of FIG. 24 along the line 28-28 of FIG. 27.
Figure 28A:
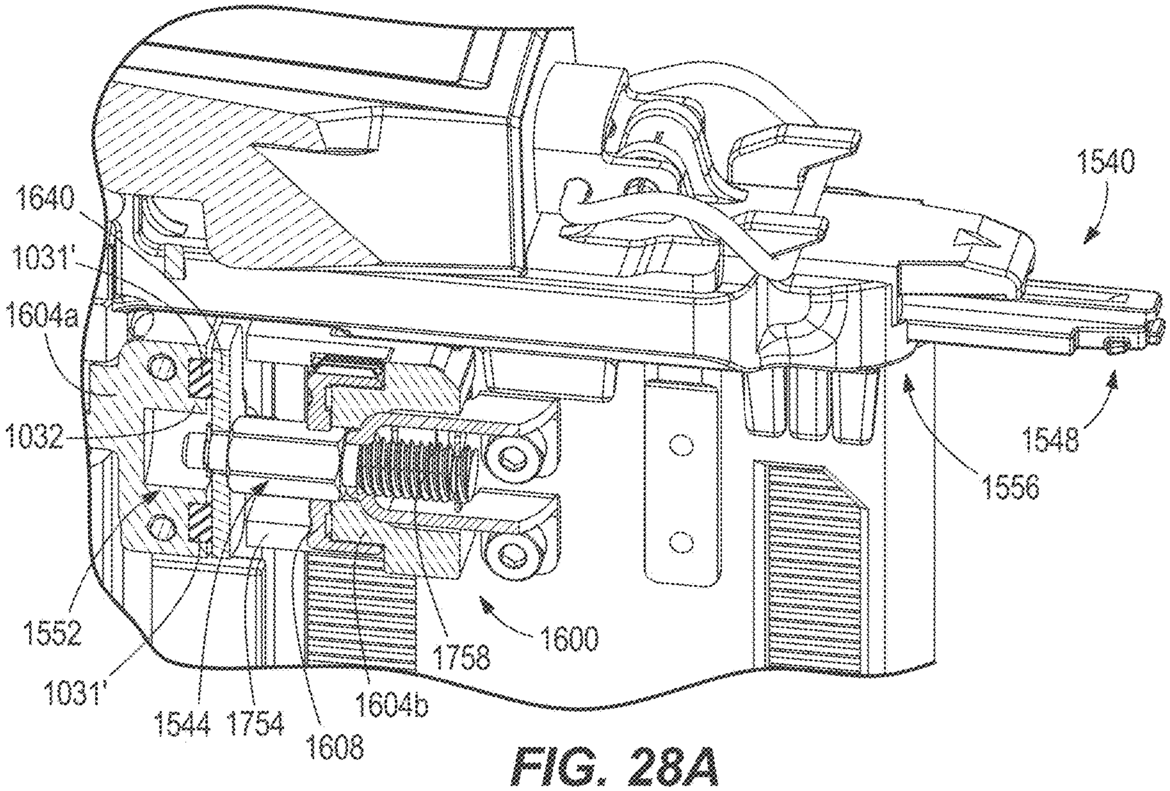
FIG. 28A is a detailed cross-sectional view of the gas spring-powered fastener driver of FIG. 27A along the line 28A-28A of FIG. 27A.

The dry-fire lockout link 1640 is configured to contact the inner frame 1031, and specifically the bumpers 1031' (FIG. 28A), when the workpiece contact assembly 1540 moves beyond the retracted position (e.g., any subsequent movement of the workpiece contact assembly 1540 in a retracting direction), such as when the driver 1010 undergoes an impact event (e.g., when the driver 1010 is dropped). Accordingly, the inner frame 1031 defines a stop surface 1032 (FIG. 28A) that the dry-fire lockout link 1640 contacts when under a significant force. For example, if the driver 1010 is dropped and it lands with the nosepiece assembly 1400 facing downwardly, the force exerted on the workpiece contact assembly 1540 contacting the ground would force the workpiece contact assembly 1540 beyond the retracted position. The stop surface 1032 of the inner frame 1031 is therefore configured to limit movement of the dry-fire lockout link 1640 of the workpiece contact assembly 1540 (e.g., when dropped) thereby protecting the components of the workpiece contact assembly 1540 and the depth of drive adjustment mechanism 1600. In other words, because the dry-fire lockout link 1640 of the workpiece contact assembly 1540 contacts the inner frame 1031, rather than the support member 1604*a*, the structure of the workpiece contact assembly 1540 and depth of drive adjustment mechanism 1600 is strengthened to limit or prevent bending/breaking such as if the tool is dropped. Moreover, the bumpers 1031' slow the impact event and reduce peak forces experienced by the components of the workpiece contact assembly 1540 and the depth of drive adjustment mechanism 1600. In other embodiments, the nosepiece assembly 1400 (e.g., the base portion 1510), which is typically constructed of a harder, robust material (e.g., metal), may include a stop surface instead of the inner frame 1031.

With reference to FIGS. 25 and 29-34, the powered fastener driver 1010 further includes a dry-fire lockout assembly 1650 (FIG. 32-34) that operates similar to the dry-fire lockout assembly 1650, discussed above. The dry-fire lockout assembly 1650 prevents the powered fastener driver 1010 from operating when the number of fasteners remaining in the magazine 1014 drops below a predetermined value. The dry-fire lockout assembly 1650 includes the dry-fire lockout member 1488 of the pusher assembly 1480, and the dry-fire lockout link 1640. The arm 1746*b* of the pusher body 1484 and the dry-fire lockout member 1488 are positioned within and movable (e.g., slideable) within the recess 1716 of the magazine 1014. The dry-fire lockout member 488 is selectively received in the opening 1468 (FIG. 26) of the magazine 1014. In the illustrated embodiment, the opening 1468 is at least partially formed by the inner frame 1031, as shown in FIG. 26. The dry-fire lockout member 1488 is configured to prevent movement of the workpiece contact assembly 1540 when a predetermined number of fasteners (e.g., 0, 1, 2, 4 etc.) remain in the magazine 1014.

Figure 33:
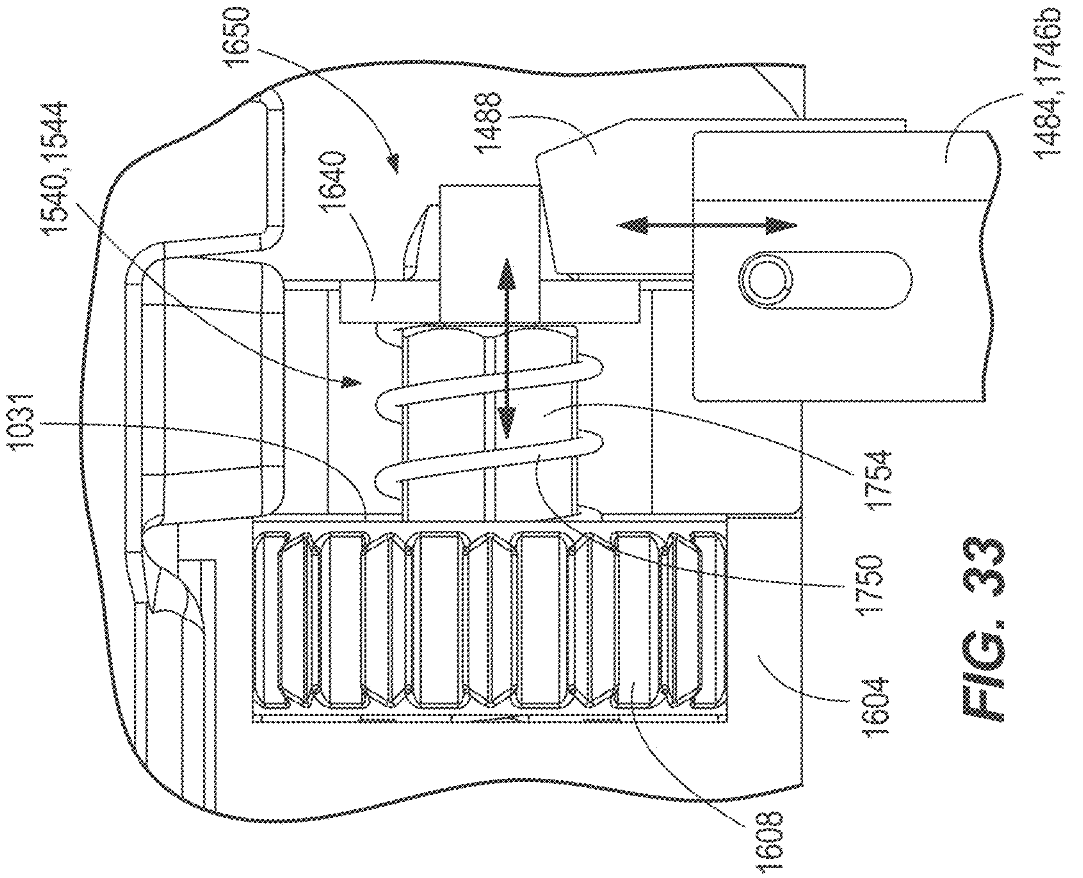
FIG. 33 illustrates a dry-fire lockout link coupled to the workpiece contact assembly of FIG. 1 when there is one more than the predetermined number of fasteners within the magazine.
Figure 34:
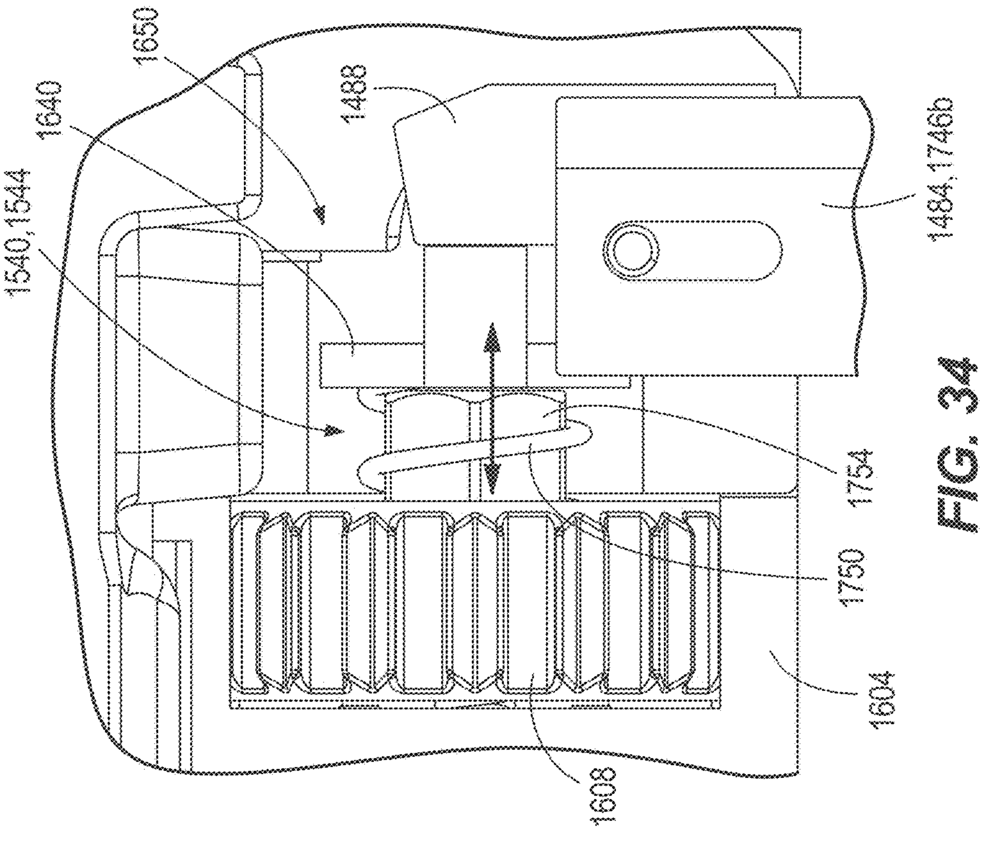
FIG. 34 illustrates a dry-fire lockout link coupled to the workpiece contact assembly of FIG. 1 when there are the predetermined number of fasteners within the magazine.

The dry-fire lockout member 1488 is movable between a first, non-blocking or bypass position (e.g., FIGS. 32-33), and a second, blocking position (FIG. 34). When the dry-fire lockout member 1488 does not extend through the opening 1468 of the magazine 1014, the dry-fire lockout member 1488 is in the bypass position such that the dry-fire lockout link 1640 and the workpiece contact assembly 1540 can move from the extended position toward the retracted position (FIGS. 32-33). That is, in the bypass position, the dry-fire lockout link 1640 is configured to slide into the opening 1468 (and depending on the number of fasteners remining, the dry-fire lockout member 1488) in response to movement toward the retracted position. Also, when the dry-fire lockout member 1488 is in the bypass position, the pusher assembly 1480 is in the first state such that the pusher body 1484 and the dry-fire lockout member 1488 move together in unison. When the dry-fire lockout member 1488 is in the blocking position, at least a portion of the dry-fire lockout member 1488 (FIG. 34) protrudes into the opening 1468 of the magazine 1014 where it interferes with retraction of dry-fire lockout link 1640 and therefore inhibits movement of the workpiece contact assembly 1540 from the extended position toward the retracted position.

In operation, as shown in FIG. 32, with more than the predetermined number of fasteners in the magazine 1014, the pusher body 1484 and the dry-fire lockout member 1488 of the pusher assembly 1480 move in unison, biased by the spring assembly 1734, in the direction of arrow 1496 the magazine 1014 in an incremental manner as consecutive fasteners from the collated fastener strip are discharged from the nosepiece assembly 1400. At this time, the opening 1468 remains open and the dry-fire lockout member 1488 remains in the bypass position.

In a scenario when the predetermined number of fasteners remaining in the magazine 1014 is reached, the dry-fire lockout member 1488 is in the blocking position and therefore engages the dry-fire lockout link 1640, as shown in FIG. 34. Upon reaching the blocking position, the dry-fire lockout member 1488 blocks the dry-fire lockout link 1640 of the workpiece contact assembly 1540, and retraction of the workpiece contact assembly 1540 is inhibited to prevent further activation of the powered fastener driver 1010. In this scenario, movement of the pusher assembly 1480 may remain in the first state (i.e., with the pusher body 1484 and the dry-fire lockout member 1488 moving together in unison) up until the dry-fire lockout member 1488 is moved to the blocking position.

However, in a scenario in which fasteners of specific sizes (e.g., fasteners having a specific shank length or diameter) are placed in the magazine 1014, when the predetermined number of fasteners remaining in the magazine 1014 is reached, the skewed collated fastener strip within the fastener channel may only permit the dry-fire lockout member 1488 to partially move toward the blocking position. That is, as shown in FIG. 33, the dry-fire lockout member 1488 may be in an intermediate position between the bypass position and the blocking position, in which the dry-fire lockout member 1488 only slightly blocks the dry-fire lockout link 1640 and the workpiece contact assembly 1540. In addition, other tolerances associated with the specific sized fasteners used, and/or associated with the driver 1010 as a whole, may cause the dry-fire lockout member 1488 to move to the intermediate position. In this case, for example, when the number of fasteners remaining is one greater than the predetermined number of fasteners, the dry-fire lockout member 1488 is in the intermediate position. With the dry-fire lockout member 1488 in the intermediate position, it is possible for the workpiece contact assembly 1540 (and specifically, the dry-fire lockout link 1640) to nominally engage the dry-fire lockout member 1488 during retraction and move the dry-fire lockout member 1488 toward the bypass position, permitting continued retraction of the workpiece contact assembly 1540 to enable a final fastener firing cycle. When the dry-fire lockout member 1488 is moved from the intermediate position to the bypass position, the pusher assembly 1480 transitions from the first state to the second state, in which relative movement between the pusher body 1484 and the dry-fire lockout member 1488 has occurred.

That is, the dry-fire lockout link 1640 can nominally engage the dry-fire lockout member 1488 during retraction to move the dry-fire lockout member 1488 toward the bypass position against the bias of the spring second spring 1500 and therefore slide past the dry-fire lockout member 1488 to the retracted position to enable the final firing cycle. In this scenario, movement of the pusher assembly 1480 transitions from the first state to the second state (i.e., the dry-fire lockout member 1488 having moved relative to the pusher body 1484 against the bias of the second spring 1500) after the final fastener firing cycle. Once the final fastener firing cycle is complete and the number of predetermined fasteners remain, the dry-fire lockout member 1488 protrudes into the opening 468 and blocks the dry-fire lockout link 1640, and therefore the workpiece contact assembly 1540, from moving into the retracted position to prevent a "dry-fire" cycle in which a driver blade 1026 is driven from the TDC position to the BDC position without a fastener in the firing channel 1522.

When the predetermined number of fasteners remain and the dry-fire lockout member 1488 is located in the blocking position, the dry-fire lockout member 488 cannot transition from the first state to the second state. Accordingly, when the predetermined number of nails remain, the dry-fire lockout member 1488 is positioned so that there is sufficient engagement between the dry-fire lockout member 1488 and the dry-fire lockout link 1640, and therefore the workpiece contact assembly 1540 to prevent a "dry-fire" cycle.

Although the invention has been described in detail with reference to certain preferred embodiments, variations and modifications exist within the scope and spirit of one or more independent aspects of the invention as described.

What is claimed is:

1. A powered fastener driver comprising:

a housing defining a cylinder support portion, a drive unit support portion, and a handle portion that is spaced apart from the drive unit support portion, the handle portion configured to removably couple a battery pack thereto;

a cylinder within the cylinder support portion;

a piston movable within the cylinder from a top-dead-center (TDC) position to a driven or bottom-dead-center (BDC) position;

a driver blade attached to the piston for movement therewith along a driving axis from the TDC position toward the BDC position for driving a fastener into a workpiece;

a lifter operable to move the piston and driver blade, in unison, from the BDC position toward the TDC position;

a drive unit supported by the drive unit support portion and operably coupled to the lifter, the drive unit including a brushless direct current (BLDC) motor;

a user interface supported by the housing; and a printed circuit board positioned within the housing and positioned between the drive unit support portion and the handle portion, the printed circuit board receiving electrical current from the battery pack and including a plurality of power switches for commutating the motor and an electronic processor for controlling the user interface and receiving inputs therefrom.

2. The powered fastener driver of claim 1, wherein the power switches are selectively closed in response to control signals received from the electronic processor to direct electrical current from the battery pack to the motor.

3. The powered fastener driver of claim 1, wherein the printed circuit board is a first printed circuit board, wherein the powered fastener driver further comprises a second printed circuit board positioned in the drive unit support portion of the housing adjacent the motor, and wherein the second printed circuit board includes a rotational speed sensor that provides a motor rotational speed output signal to the electronic processor.

4. The powered fastener driver of claim 1, wherein the housing further includes a connection portion extending between the drive unit support portion and the handle portion, wherein the connection portion is spaced apart from the cylinder support portion, and wherein the printed circuit board is at least partially positioned within the connection portion.

5. The powered fastener driver of claim 4, wherein the user interface is supported by the connection portion.

6. The powered fastener driver of claim 5, wherein the user interface includes a display unit including a button for selecting an operational mode of the powered fastener driver, and wherein the printed circuit board includes a switch that is actuated by the button in response to the button being pressed.

7. The powered fastener driver of claim 1, further comprising a vibration attenuating damper positioned between the printed circuit board and the housing and configured to support the printed circuit board within the housing.

* * * * *